United States Patent [19]
Gabriel et al.

[11] Patent Number: 6,005,582
[45] Date of Patent: *Dec. 21, 1999

[54] METHOD AND SYSTEM FOR TEXTURE MAPPING IMAGES WITH ANISOTROPIC FILTERING

[75] Inventors: Steven A. Gabriel, Redmond; Kent E. Griffin, Bellevue, both of Wash.

[73] Assignee: Microsoft Corporation, Redmond, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/672,347

[22] Filed: Jun. 27, 1996

Related U.S. Application Data

[63] Continuation-in-part of application No. 08/560,114, Nov. 17, 1995, abandoned, which is a continuation of application No. 08/511,553, Aug. 4, 1995, abandoned.

[51] Int. Cl.[6] .................................................. G06F 15/00
[52] U.S. Cl. ............................................................ 345/430
[58] Field of Search ...................... 345/418–20, 430–31, 345/433–37, 501–85

[56] References Cited

U.S. PATENT DOCUMENTS

| | | | |
|---|---|---|---|
| 5,586,234 | 12/1996 | Sakuraba et al. | 345/430 |
| 5,630,043 | 5/1997 | Uhlin | 345/425 |
| 5,651,104 | 7/1997 | Cosman | 345/428 |

OTHER PUBLICATIONS

Foley, James D., et al, "Computer Graphics: Principles and Practices", *Addison–Wesley Publishing Co., 2nd ed. pp. 806–813, 855–921, 1990*.

Collaborative work, "Pixel–Planes", *Pixel Planes Home Page, url—http://www.cs.unc.edu/˜pxpl/, University of North Carolina, pp. 1–25, update, Sep. 26, 1995*.

Oak Technology WARP5 Press Releases, "Oak Technology Sets New Standard for 3D Realism with Breakthrough WARP 5 Chip Architecture", *Atlanta, GA, Jun. 19, 1997*.

Bergman, et al "Image Rendering by Adaptive Refinement", *ACM Siggraph '86, vol. 20, No. 4, pp. 29–37, Aug. 18–22, 1986*.

Chen, Chein–Liang, et al, "A Raster Engine for Computer Graphics and Image Compositing", *Abstract, APCCAS '94, IEEE, pp. 103–108, Dec. 5–8, 1994*.

Yoo, Terry S., et al, "Direct Visualization of vol. Data", *IEEE Computer Graphics and Applications Magazine, Volume 12, No. 4, pp. 63–71, Jul. 92*.

Bove, Jr., V. Michael, et al, "Real–Time Decoding and Display of Structured Video", *IEEE Multimedia, 1994 international Conference, pp. 456–462, 1994*.

Heb, Andreas, et al, "Three Dimensional Reconstruction of Brains from 2–Deoxyglucose Serial Section Autoradiographs", *Image Processing, 1994 International Conference, vol. 3, pp. 290–294, 1994*.

(List continued on next page.)

*Primary Examiner*—Phu K. Nguyen
*Attorney, Agent, or Firm*—Klarquist Sparkman Campbell Leigh & Whinston LLP

[57] ABSTRACT

A method for texture mapping an image includes passing an interpolating filter along a line of anisotropy in a texture map and computing a weighted sum of the outputs of the interpolating filter to compute pixel intensity values. The weighting of these output values can be computed using a one dimensional digital filter. The line of anisotropy is derived from the inverse transform, which describes the mapping of a point on the surface of a geometric primitive to a point in the texture map. A system supporting anisotropic filtering includes texture memory, a set-up processor, and a texture filter engine. The set-up processor parses a command stream and retrieves texture data into the texture memory. The texture filter engine determines the line of anisotropy for a pixel and computes a weighted sum of interpolated values sampled along the line of anisotropy.

24 Claims, 36 Drawing Sheets

OTHER PUBLICATIONS

Hu, Lincoln, "Computer Graphics in Visual Effects", *Compcon Spring '92, IEEE Computer Society International Conference, pp. 472–474, 1992.*

Runyon, Kenneth R., "Advanced Graphics Processor", *Digital Avionics Systems, 1993 Conference, pp. 394–399, 1993.*

Crawfis, Roger A., et al, "A Scientific Visualization Synthesizer", *Visualization, 1991 Conference, pp. 262–267, 1991.*

Haeberli, Paul, et al, "The Accumulation Buffer: Hardware Support for High–Quality Rendering", *ACM Computer Graphics, vol. 24, No. 4, pp. 309–318, Aug. 1990.*

Slater, Mel, "An Algorithm to support 3D Interaction on Relatively Low Performance Graphics Systems", *Comput. & Graphics, vol. 16, No. 3, pp. 311–315, 1992.*

Slater, Mel, "Segments on Bit–mapped Graphics Displays", *Software—Practice and Experience, vol. 16(II), pp. 965–980, Nov. 1986.*

Chrysanthou, Y and Slater, M, "Computing Dynamic Changes to BSP Trees", *Computer graphics Forum, vol. II, No. 3, Conference Issue, pp. C–321 to C–342, Sep. 7–11, 1992.*

Slater, Mel, et al, "Liberation from Rectangle: A Tiling Method for Dynamic Modification of Objects on Raster Displays", *Eurographics '88, Conference date, Sep. 12–16, 1988, pp. 381–392, 1988.*

Slater, Mel, et al, "Liberation from Flatland: 3D Interaction Based on the Desktop Bat", *Eurographics '91, pp. 209–221, 1991.*

Deering, "Explorations of Display Interfaces for Virtual Reality", *IEEE Virtual Reality, 1993 International Symposium, pp. 141–147, 1993.*

Reichlen, "Sparcchair: A One Hundred Million Pixel Display", *IEEE Virtual Reality, 1993 International Symposium, pp. 300–307, May 28, 1993.*

Regan, Matthew and Ronald Pose, "Priority Rendering with a Virtual Reality Address Recalculation Pipeline", *ACM Siggraph, '94, Computer Graphics Proceedings, Annual Conference Series, pp. 155–162, 1994.*

Regan, Matthew and Ronald Pose, "Low Latency Virtual Reality Display System", *Technical report No. 92/166, Monash University, Victoria, Australia, pp. 1–13, Sep. 1992.*

Regan, Matthew and Ronald Pose, "A Interactive Graphics Display Architecture", *IEEE Virtual Reality, 1993 International Symposium, pp. 293–299, 1993.*

Torborg, Jay, et al, "Talisman: Commodity Realtime 3D Graphics for the PC", ACM Siggraph, Conference Proceedings, pp. 353–363, Aug. 4–9, 1996.

Deering, Michael, et al, "Leo: A System for Cost Effective 3D Shaded Graphics", *ACM Siggraph, Conference Proceedings, pp. 101–108, Aug. 1–6, 1993.*

Akerly, Kurt, "RealityEngine Graphics", *ACM Siggraph, Conference Proceedings, pp. 109–116, Aug. 1–6, 1993.*

Mcmillan, Leonard, et al, "Plenoptic Modeling: An Image–Based Rendering System", *ACM Siggraph, Conference Proceedings, pp. 39–46, Aug. 6–11, 1995.*

Tan, Wee–Chiew, et al, "Low–Power polygon Renderer for Computer Graphics", *Application Specific Array Processors, 1993 International Conference, pp. 200–213, 1993.*

Bae, Seong–Ok, et al, "Patch Rendering: A New Parallel Hardware Architecture for Fast Polygon Rendering", *Circuits and Systems, 1991 IEEE International Symposium, pp. 3070–3073, 1991.*

"The Accumulation Buffer: Hardware Support for High–Quality Rendering", by P. Haeberli and K. Akeley, *Computer Graphics*, vol. 24, No. 4, Aug. 1990, pp. 309–318.

*Computer Graphics: Principles and Practice*, Foley, van Dam, Feiner, Hughes, Section 16.3, pp. 741–745, (Nov., 1991).

FIG. 21
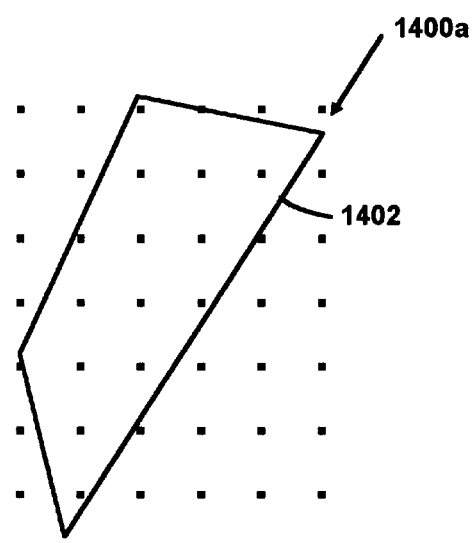
FIG. 21A
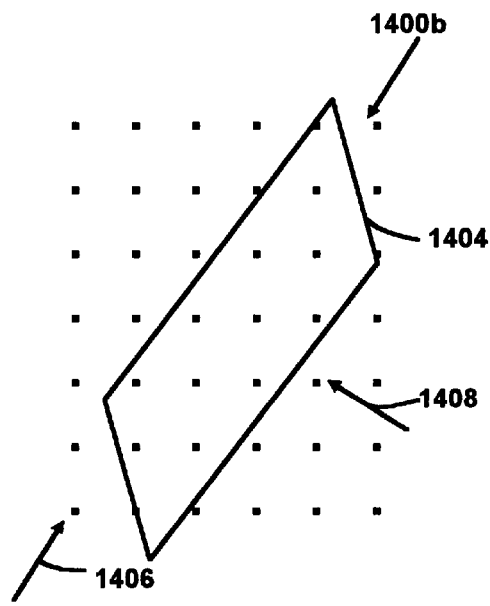
FIG. 21B
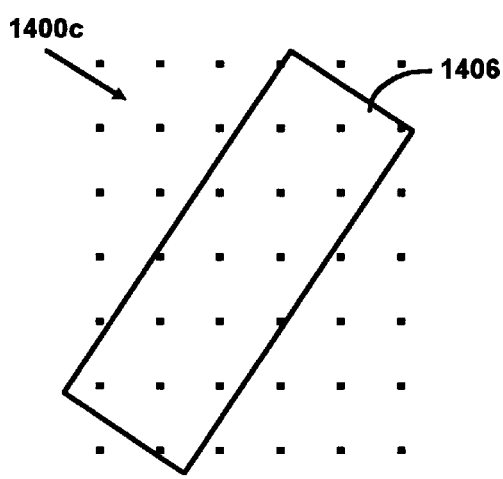
FIG. 21C
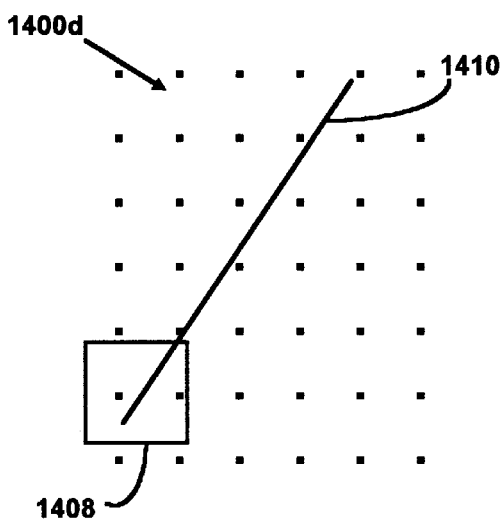
FIG. 21D

METHOD AND SYSTEM FOR TEXTURE MAPPING IMAGES WITH ANISOTROPIC FILTERING

REFERENCE TO PRIOR APPLICATIONS

This is a continuation-in-part of application Ser. No. 08/560,114, filed Nov. 17, 1995, which is now abandoned. Application Ser. No. 08/560,114 is a continuation of application Ser. No. 08/511,553, filed Aug. 4, 1995, which is now abandoned.

TECHNICAL FIELD

The invention generally relates to graphics rendering systems and more specifically relates to methods and systems for texture mapping a source image to a surface using anisotropic filtering.

BACKGROUND

Texture mapping is a process for mapping an image onto a surface of a graphical object to enhance the visual realism of a generated image. Intricate detail at the surface of an object is very difficult to model using polygons or other geometric primitives, and doing so can greatly increase the computational cost of the object texture mapping is a more efficient way to represent fine detail on the surface of an object. A "texture map" is a digital image, which we will also refer to as the "source image." The texture map is typically rectangular in shape and has its own (u, v) coordinate space. Individual elements of the texture map are referred to as "texels." In a texture mapping operation, a texture or "source image" is mapped to the surface of a graphical model as the model is rendered to create a target image.

As digital images, the source and the target images are sampled at discrete points, usually on a grid of points with integer coordinates. In the source image, texels are located at integer coordinates in the (u,v) coordinate system. Similarly, in the target image, pixels are located at integer coordinates in the (x,y) coordinate system.

The process of texture mapping generally includes sampling data from the source image to compute an intensity value for a pixel in the destination image. The texels to be sampled for a given pixel are typically identified by mapping a point in the destination image into the source image. Texels neighboring the mapped point in the source image are then sampled, weighted and summed to compute the intensity value for a pixel. This process is then repeated for additional pixels in the destination image.

While texture mapping is an effective technique for generating images with surface detail, present approaches often produce unacceptable amounts of distortion. Distortion results because, in practice, several approximations are made in computing pixel intensities. In real time graphics systems, the problem is particularly acute because each pixel value must be computed quickly so that the entire image can be generated within a fixed time period. Because of these rigorous timing constraints, real time systems either do not support texture mapping or make additional approximations that reduce image quality.

To simplify texture mapping operations, some systems make approximations in determining the shape of a sampling region in the source image. The sampling region is the area in the source image that defines which texels to sample in computing a pixel intensity, and is sometimes referred to as the filter footprint. The footprint will have a different shape in the source for each target point. Since the footprint can vary for each point, it is difficult to find the correct shape of the footprint and the weighting factors to apply to the points inside the footprint. Some systems make the approximation of using the same shape for the filter at every point, although they may allow the size of the filter to vary. This approach often leads to artifacts in the final image that degrade image quality.

Filters that produce either square or circular footprints of variable size are referred to as isotropic filters. A circle is truly isotropic since it has the same length in all directions. A square is essentially isotropic, since it has equal dimension horizontally and vertically.

Isotropic filtering can produce distortion because the same filter shape is used regardless of the extent to which the mapping is non-linear from destination to source image. In areas of the source image where the actual footprint is highly elongated, an essentially isotropic shape such as a square or a circle is a poor substitute for the footprint, even if the size is adjustable. Since an isotropic filter only has one shape, it can not accurately capture texels in an elongated footprint. For example, a square filter cannot accurately sample texel values from a quadrilateral footprint elongated in one direction. Sampling texels outside the actual footprint can cause blurring. Not sampling texels in the footprint, on the other hand, can cause the final image to sparkle due to aliasing.

In one approach called MIP (multum in parvo—many things in a small place) mapping, a number of texture maps are stored at different resolutions. For example, if the one texture is at 512×512 texels, textures at 256×256, 128×128, 64×64, etc. can also be stored. This "pyramid" of texture maps at varying resolution can be used to find the best fit for an isotropic filter on the footprint of the pixel mapped into the texture. The process begins by finding the two textures where the footprint is closest in size to the size of the filter. It then performs interpolation for the two textures that fit the footprint most closely to compute two intermediate values. Finally, it interpolates between the two intermediate values to find a value for the pixel.

While MIP mapping can provide improved results for isotropic filters, it produces artifacts where the filter footprint in the source image is contracted or elongated in one direction. This contraction or elongation can produce a high degree of anisotropy of a filter. For instance, if the transformation contracts the image in one direction much more than in another direction, then the inverse transformation will expand or elongate the footprint in the source along the direction of maximum contraction in the target. This can occur when viewing a planar surface from a perspective close to the edge. Using an isotropic filter, the final image appears distorted in this example because the filter cannot properly sample texel values in the elongated footprint.

SUMMARY OF THE INVENTION

The invention provides a method and system for texture mapping images using anisotropic filtering. One embodiment of the method includes first determining a line of anisotropy of the filter footprint. The line of anisotropy is in the direction of maximum elongation of filter footprint and passes through point in the source image mapped from the center of a pixel in the destination image. The method further includes sampling texel values from the source image along the line of anisotropy and then summing these values to compute pixel intensity values.

There are a number of possible variations on this method. In one specific embodiment, texel values are sampled with an interpolating filter at discrete locations along the line of anisotropy. The outputs of the interpolating filter are then applied to a one dimensional digital filter so that the interpolated values can be weighted. The outputs of the one dimensional digital filter are then summed to compute pixel intensity values.

The size of both the interpolating filter and the one-dimensional digital filter can be adjusted. In one embodiment, the control parameters for the interpolating and digital filters are derived from the Jacobian matrix of the inverse transform at a point mapped into the source image. The appropriate size of the interpolating or digital filters can be derived from vectors in the Jacobian matrix. MIP mapping can be used to adjust the size of the interpolating filter. Parameters for the one-dimensional filter can be selected based on the vectors of the Jacobian matrix as well.

One embodiment of a system for performing texture mapping using anisotropic filtering includes texture memory, a set-up processor, and a texture filter engine. Texture memory stores texture samples. The set-up processor computes inverse transform data, such as the Jacobian matrix of the inverse transform at point, and also computes texture addresses for the texture data to be used in the texture mapping operation. The texture filter engine computes the anisotropic filter and applies this filter to texture samples in texture memory. More specifically, the texture filter engine computes the line of anisotropy and applies an interpolating filter along this line. It passes the output of the interpolating filter to a digital filter and sums the outputs to compute pixel intensity values.

The approach summarized here provides a number of advantages over conventional texture mapping techniques. It produces an image with much less aliasing and blurring without the expense of calculating the true footprint at each point, which may be the result of a highly non-linear mapping. The anisotropic filter achieves a much better fit to the actual footprint than an isotropic filter. Another advantage is that the invention can provide anisotropic filtering in a real time graphics rendering system. Anisotropic filtering according to our approach can be implemented in hardware for increased speed of execution.

Further advantages and features of the invention will become apparent with reference to the following detailed description and accompanying drawings.

BRIEF DESCRIPTION OF THE DRAWINGS

FIGS. 21A–D are diagrams illustrating a method for anisotropic filtering in an embodiment.

DETAILED DESCRIPTION

System Overview

In the following detailed description, we describe several embodiments with reference to an image processing system.

The image processing system supports real time image rendering and generation for both graphics and video processing. Due to the novel architecture and image processing techniques employed in the system, it can produce sophisticated real time 3-D animation at a significant cost savings over present graphics systems. In addition to graphics processing, the system supports video processing such as video editing applications, and can also combine video and graphics. For instance, the system can be used to apply video to graphical objects, or conversely, can be used to add graphical objects to video data.

The system supports a wide range of interactive applications. Its ability to support advanced real time animation makes it well-suited for games, educational applications, and a host of interactive applications. The system supports sophisticated user interfaces including 3-D graphics or combined graphics and video. Improving upon the limited graphics capabilities of today's windowing environments for personal computers, the system can support improved 3-D graphical user interfaces for /applications ranging from office information processing on desktop computers to interactive television applications in a set-top box. The system makes very efficient use of memory and processor time and therefore can provide impressive image processing and display without unduly hindering performance of the application or responsiveness of the user interface to user actions.

Figure 1:
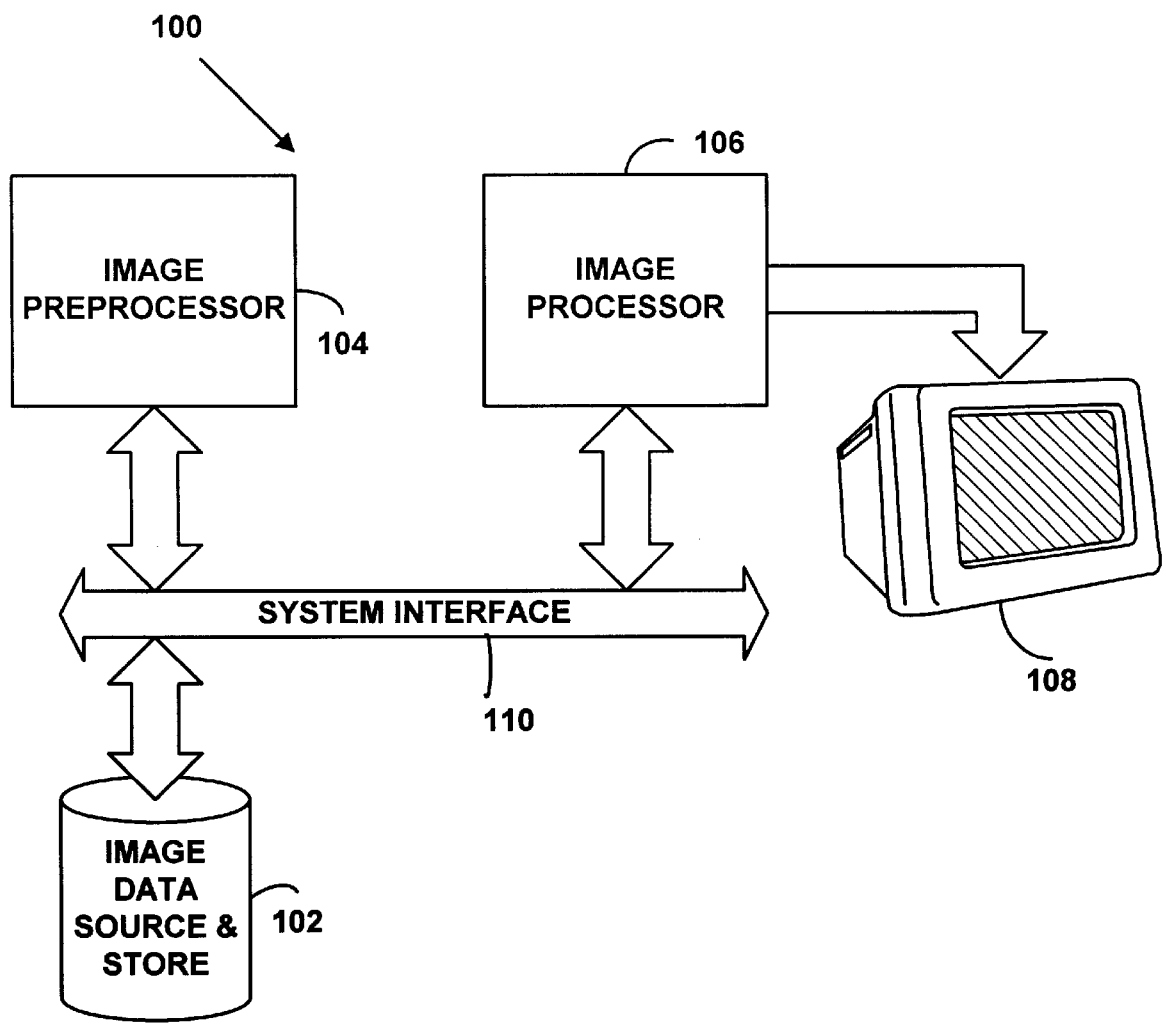
FIG. 1 is a block diagram of an image processing system.

FIG. 1 is a block diagram of the image processing system 100. The image processing system comprises an image data source and store 102, an image preprocessor 104, an image processor 106, and a display device 108, if immediate display of rendered images is desired. The elements in the system communicate through a system interface 110. The image data source and store 102 supplies image data to the system, and stores image data and commands. The image preprocessor 104 is responsible for manipulating the image data to prepare it for rendering. Examples of preprocessing functions include: defining objects in terms of geometric models, defining lighting and shadowing models, determining object locations, determining the location of a viewpoint and light sources, and geometry processing.

The image processor 106 renders the images, and generates a display image to be displayed on the display device 108. Rendering refers to the process of creating images from models and includes such functions as geometry processing (note that geometry processing can also be a preprocessing function), visible-surface determination, scan conversion, and lighting, to name a few. After rendering an image or parts of an image, the image processor 106 transfers rendered image data to the display device for display.

Below, we describe several features of the image processing system 100 in detail with reference to specific hardware and software architectures. However, it is important to note that the image processing described below can be implemented in a variety of alternative architectures.

The image processing system 100 achieves a vast price-performance improvement over existing high quality 3-D graphics systems known to the inventors. A number of advances in computer graphics contribute to this improvement. These advances include: composited image layers, image compression, chunking, and multi-pass rendering. We introduce these advances here, and describe these and other advances in more detail below.

Composited Image Layers (Gsprites)

In our system, multiple independent image layers may be composited together at video rates to create the output video signal. These image layers, which we refer to as generalized gsprites, or gsprites, can be rendered into and manipulated independently. The system will generally use an independent gsprite for each non-interpenetrating object in the scene. This allows each object to be updated independently, so that object update rate can be optimized based on scene priorities. For example, an object that is moving in the distant background may not need to be updated as often, or with as much accuracy, as a foreground object.

Gsprites can be of arbitrary size and shape. In one implementation, we use rectangular gsprites. Pixels in the gsprite have color and alpha (opacity) information associated with them, so that multiple gsprites can be composited together to create the overall scene.

Several different operations may be performed on gsprites at video rates, including scaling, rotation, subpixel positioning, and transformations to mimic motion, such as affine warps. So, while gsprite update rates are variable, gsprite transformations (motion, etc.) may occur at full video rates, resulting in much more fluid dynamics than could be achieved by a conventional 3-D graphics system that has no update rate guarantees.

Many 3-D transformations can be simulated by 2-D imaging operations. For example, a receding object can be simulated by scaling the size of the gsprite. By utilizing 2-D transformations on previously rendered images for intermediate frames, overall processing requirements are significantly reduced, and 3-D rendering power can be applied where it is needed to yield the highest quality results. This is a form of temporal level of detail management.

By using gsprite scaling, the level of spatial detail can also be adjusted to match scene priorities. For example, background objects, cloudy sky, etc., can be rendered into a small gsprite (low resolution) which is then scaled to the appropriate size for display. By utilizing high quality filtering, the typical low resolution artifacts are not as noticeable.

A typical 3-D graphics application (particularly an interactive game) trades off geometric level of detail to achieve higher animation rates. Gsprites allow the system to utilize two additional scene parameters—temporal level of detail and spatial level of detail- to optimize the effective performance as seen by the user. The spatial resolution at which the image of an object is rendered does not have to match the screen resolution at which it will be rendered. Further, the system can manage these trade-offs automatically without requiring application support.

Image Compression

Perhaps the most significant factor in determining system cost and performance is memory. A traditional high-end 3-D graphics system, for example, has over 30 Mbytes of memory, including frame buffers (double buffered), a depth buffer, a texture buffer, and an anti-aliasing buffer. And most of this is specialized memory which is significantly more expensive than DRAM. Memory bandwidth is always a critical bottleneck. The cost of high performance systems are often driven by the need to provide numerous banks of interleaved memory to provide adequate bandwidth for pixel and texture data accesses.

The system broadly applies image compression technology to solve these problems. Image compression has traditionally not been used in graphics systems because of the computational complexity required for high quality, and because it does not easily fit into a conventional graphics architecture. By using a concept we call chunking (described below), we are able to effectively apply compression to images and textures, achieving a significant improvement in price-performance.

In one respect, graphics systems have employed compression to frame buffer memory. High end systems utilize eight bits for each of three color components, and often also include an eight bit alpha value. Low end systems compress these 32 bits per pixel to as few as four bits by discarding information and/or using a color palette to reduce the number of simultaneously displayable colors. This compression results in very noticeable artifacts, does not achieve a significant reduction in data requirements, and forces applications and/or drivers to deal with a broad range of pixel formats.

The compression used in our system can achieve very high image quality yet still provide compression ratios of 10:1 or better. Another benefit of our approach is that a single high quality image format can be used for all applications, as distinguished from the standard PC graphics architecture which requires a trade-off between spatial resolution and color depth.

Chunking

Another significant advance in our system is referred to as chunking. A traditional 3-D graphics system (or any frame buffer for that matter), can be (and is) accessed randomly. Arbitrary pixels on the screen can be accessed in random order. Since compression algorithms rely on having access to a fairly large number of neighboring pixels (in order to take advantage of spatial coherence), compression can only be applied after all pixel updates have been made, due to the random access patterns utilized by graphics algorithms. This makes the application of compression technology to display buffers impractical.

This random access pattern also means that per-pixel hidden surface removal and anti-aliasing algorithms must maintain additional information for every pixel on the screen. This dramatically increases the memory size requirements, and adds another performance bottleneck.

Our system takes a different approach. A scene, or portions of a scene, can be divided into pixel regions (32×32 pixels in one specific implementation), called chunks. In one implementation, the system divides the geometry assigned to gsprites into chunks, but an alternative implementation could perform chunking without gsprites. The geometry is presorted into bins based on which chunk the geometry will be rendered into. This process is referred to as chunking. Geometry that overlaps a chunk boundary is preferably referenced in each chunk it is visible in. As the scene is animated, the data structure is modified to adjust for geometry that moves from one chunk to another.

Chunking provides several significant advantages. The use of chunking provides an effective form of compression. Since all the geometry in one chunk is rendered before proceeding to the next, the depth buffer need only be as large as a single chunk. By using a relatively small chunk size such as 32×32 pixels, the depth buffer can be implemented directly on the graphics rendering chip. This eliminates a considerable amount of memory, and also allows the depth buffer to be implemented using a specialized memory architecture which can be accessed with very high bandwidth and cleared during double buffer operations, eliminating the traditional frame buffer memory clearing overhead between frames.

Anti-aliasing is also considerably easier since each chunk can be dealt with independently. Most high-end Z-buffered graphics systems which implement anti-aliasing utilize a great deal of additional memory, and still perform relatively simplistic filtering. With chunking however, the amount of data required is considerably reduced (by a factor of 1000), allowing practical implementation of a much more sophisticated anti-aliasing algorithm.

In addition to Z-buffering and anti-aliasing, the system can also simultaneously support translucency in a correct and seamless manner. While a chunk is being built, the system can perform both anti-aliasing and translucency computations on another chunk. In other words, in the time required to build a chunk, the system can perform anti-aliasing and translucency processing on another chunk. The system can "ping-pong" between chunks, and thus perform sophisticated processing without adding delay in processing an image for real time applications.

Yet another advantage is that chunking enables block oriented image compression. Once a chunk has been rendered (and anti-aliased), it can then be compressed with a block transform based compression algorithm. Therefore, in addition to the compression achieved from rendering chunks separately, chunking supports more sophisticated and adaptable compression schemes.

Multi-Pass Rendering

Another advantage of the architecture of our system is the opportunity for 3-D interactive applications to break out of the late 1970's look of CAD graphics systems: boring lambertian Gouraud-shaded polygons with Phong highlights. Texture mapping of color improves this look but imposes another characteristic appearance on applications. In the 1980's, the idea of programmable shaders and procedural texture maps opened a new versatility to the rendering process. These ideas swept the off-line rendering world to create the high-quality images that we see today in film special effects.

The rigid rendering pipelines and fixed rendering modes of today's typical high-end 3-D graphics workstations make it impossible to implement such effects without drastic reductions in real-time performance. As a result, users who require real-time display must put up with the limited rendering flexibility.

By reducing the bandwidth requirements using the techniques outlined above, the system of the present invention can use a single shared memory system for all memory requirements including compressed texture storage and compressed gsprite storage. This architecture allows data created by the rendering process to be fed back through the texture processor to use as data in the rendering of a new gsprite. Because of this support for feedback, the system can perform efficient multi-pass rendering.

By coupling efficient multi-pass rendering with a variety of compositing modes and a flexible shading language, the system can provide a variety of rendering effects in real-time that have previously been the domain of off-line software renderers. This includes support of functions such as shadows (including shadows from multiple light sources), environment mapped reflective objects, spot lights, ground fog, realistic underwater simulation, etc.

In one embodiment, the image processing system (100) includes a combination of software and hardware. In the following section, we describe the system environment below with reference to a hardware and software architecture. Where possible, we describe alternative architectures. However, the software and hardware architectures can vary, and therefore are not limited to the specific examples provided below.

The image processing system, or portions of it, can be implemented in a number of different platforms including desktop computers, set-top boxes, and game systems.

Figure 2:
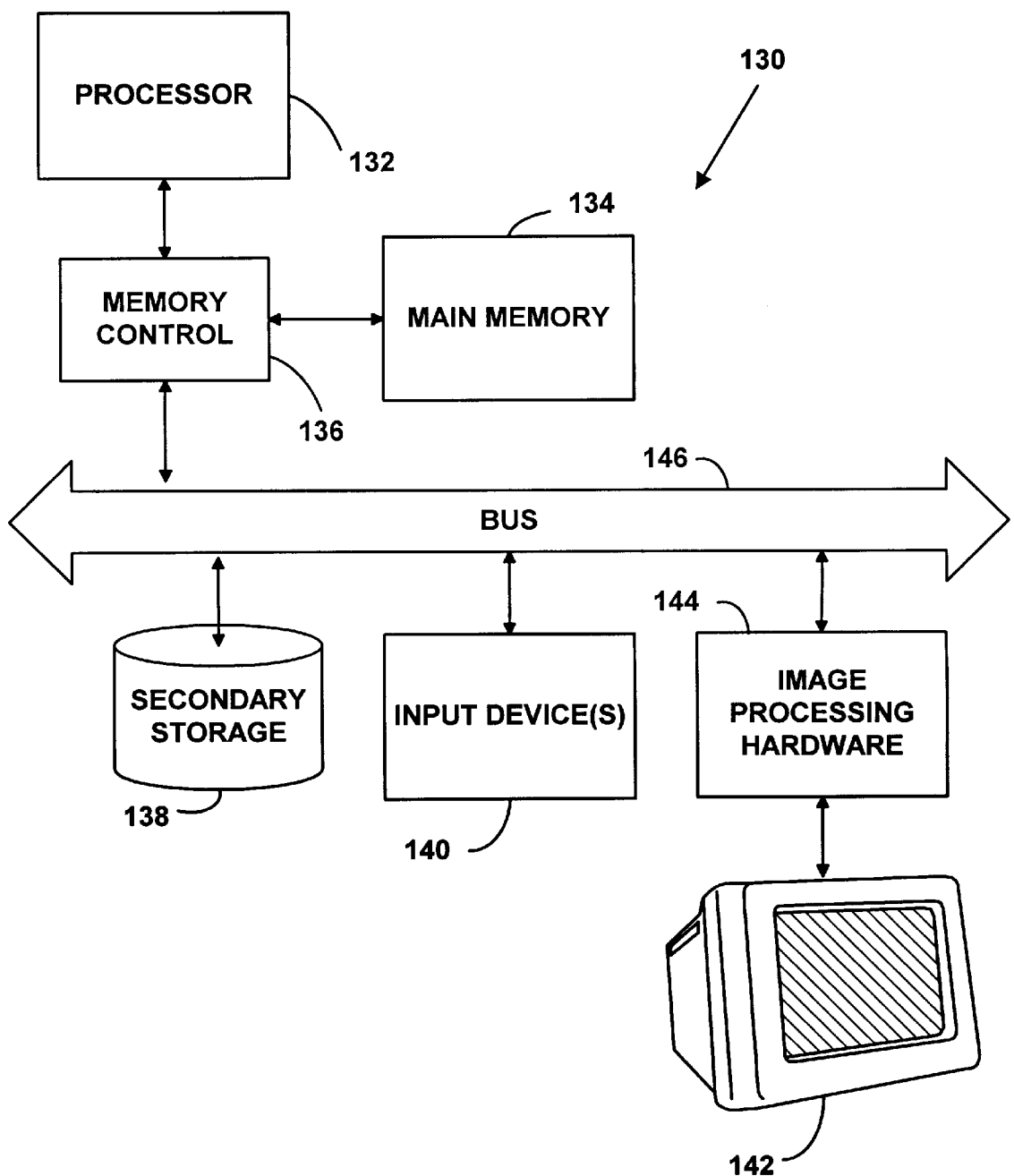
FIG. 2 is a block diagram of the system environment for an embodiment of the invention.

FIG. 2 is a block diagram of a computer system 130 in which the image processing system can be implemented. The computer system 130 includes a processor 132, main memory 134, memory control 136, secondary storage 138, input device(s) 140, display device 142, and image processing hardware 144. Memory control 136 serves as an interface between the processor 132 and main memory 134; it also acts as an interface for the processor 132 and main memory 134 to the bus 146.

A variety of computer systems have the same or similar architecture as illustrated in FIG. 2. The processor within such systems can vary. In addition, some computer systems include more than one processing unit. To name a few, the processor can be a Pentium or Pentium Pro processor from Intel Corporation, a microprocessor from the MIPS family from Silicon Graphics, Inc., or the PowerPC from Motorola.

Main memory 134 is high speed memory, and in most conventional computer systems is implemented with random access memory (RAM). Main memory can interface with the processor and bus in any of variety of known techniques. Main memory stores 134 programs such as a computer's operating system and currently running application programs. Below we describe aspects of an embodiment with reference to symbolic representations of instructions that are performed by the computer system. These instructions are sometimes referred to as being computer-executed. These aspects of the embodiment can be implemented in a program or programs, comprising a series of instructions stored on a computer-readable medium. The computer-readable medium can be any of the devices, or a combination of the devices described herein, in connection with main memory or secondary storage.

The bus 146 interconnects the memory control 136, secondary storage 138, and the image processing hardware 144. In one implementation for example, the bus is a PCI bus. The PCI standard is well-known, and several computer system boards are designed to support this standard. Computer systems having other bus architectures can also support the image processing system. Examples include an ISA bus, EISA bus, VESA local bus, and the NuBus.

The display device 142 is a color display, with continuous refresh to display an image. The display device in one embodiment is a cathode ray tube (CRT) device, but it can also be a liquid crystal display (LCD) device, or some other form of display device.

The secondary storage device 138 can include a variety of storage media. For example, the secondary storage device can include floppy disks, hard disks, tape, CD-ROM, etc. and other devices that use electrical, magnetic, optical or other recording material.

The input device(s) 140 can include a keyboard, cursor positioning device such as a mouse, joysticks, as well as a variety of other commercially available input devices.

In one implementation detailed below, the image processing hardware 144 is implemented on a board that couples with the computer system through a PCI bus. In an alternative implementation, the image processing hardware can be located on a system board along with a processor or other image processing hardware and memory. For example, in a game system, image processing hardware is typically located on the mother board. Similarly, image processing hardware in a set-top box can also be located on the mother board.

While we have outlined the architecture of a computer system, we do not intend to limit our invention to the system architecture illustrated in FIG. 2. Our image processing system can be implemented in game systems, set-top boxes, video editing devices, etc. Below we describe an embodiment of an image processing system in the environment of the system architecture shown in FIG. 2. We describe alternative implementations throughout the following description, but we do not intend our description of alternatives to be a complete listing of other possible implementations. Based on our detailed description below, those having ordinary skill in the art can implement the image processing system, or aspects of it, on alternative platforms.

Figure 3:
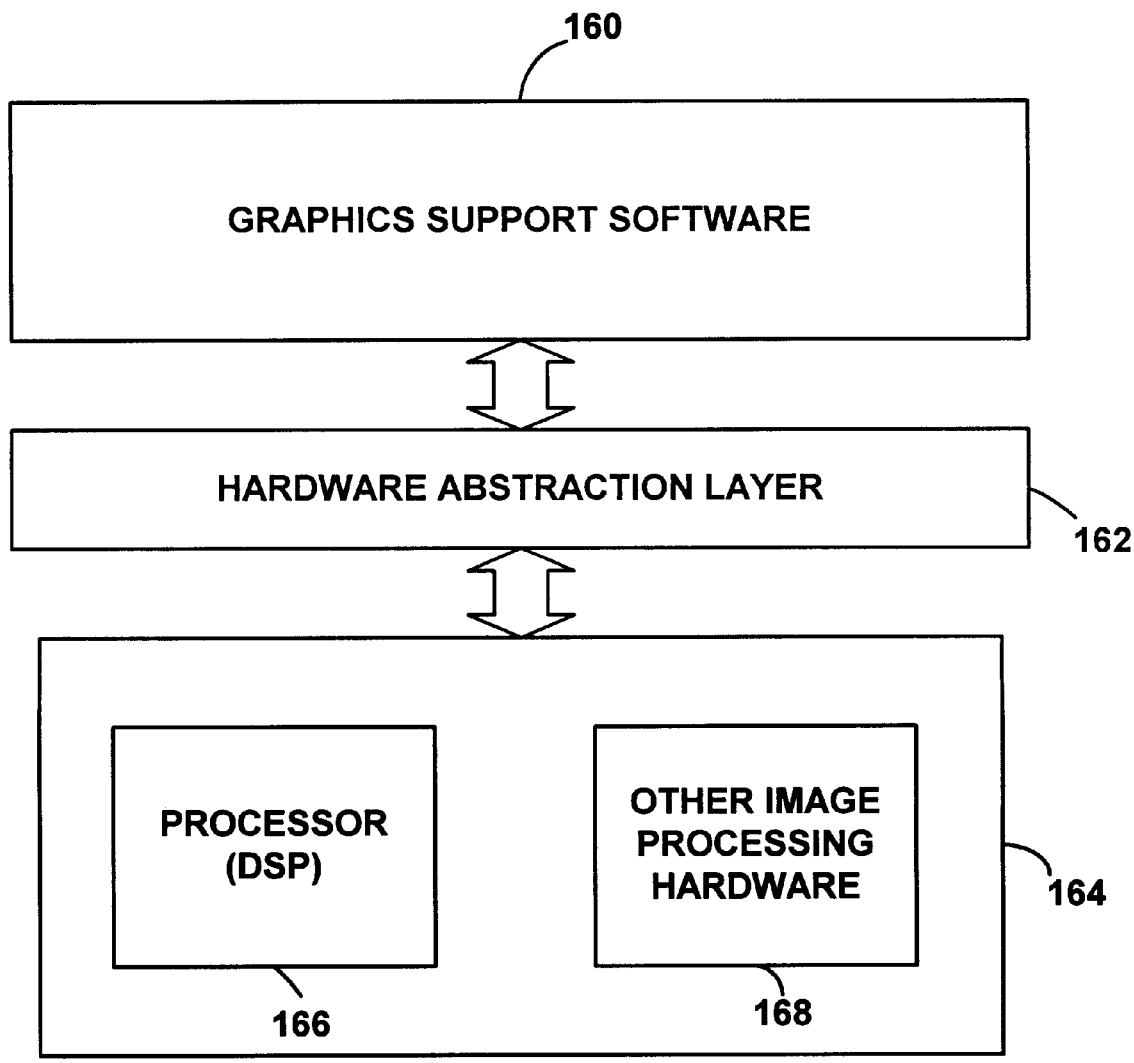
FIG. 3 is a block diagram of system architecture for an embodiment.

FIG. 3 is a block diagram illustrating the relationship between the software and hardware in one embodiment. In this embodiment, the image processing system is implemented using processing resources of the processor of the host computer and the image processing hardware 144. The image processing hardware 144 is implemented on an expansion board 164 which includes a processor (e.g. a Digital Signal Processor) 166 and image processing circuitry 168. The processors of the host computer 130 and the image processing board 164 share image processing tasks. Below we outline generally the functions performed by the host computer 130 and the image processing board 174.

Graphics support software 160 executes on the host computer system 130 and communicates with the image processing board 164 through the hardware abstraction layer (HAL) 162. The image processing board 164 includes a programmable digital signal processor called the DSP 166 and additional image processing hardware 168 detailed below.

The graphics support software 160 can include functions to support memory management, view volume culling, depth sorting, chunking, as well as gsprite allocation, transformation, and level of detail. The graphics support software can include a library of graphics functions, accessible by graphics applications, to perform the functions enumerated here.

The graphics support software 160 includes functions that support the gsprite paradigm introduced above. As indicated above, gsprites are rendered independently, and do not need to be rendered on every frame. Instead, changes in position of a gsprite can be approximated with affine or other transformations. The graphics support software 160 provides functions to help assign an object or objects to a gsprite and to track motion data describing the position and motion of the gsprite. The graphics support software also provides functions to determine when a rendered gsprite needs to be updated. The need to update a gsprite can vary depending on object movement, viewpoint movement, lighting changes, and object collisions.

We provide further detail with respect to the functions of the graphic support software below. The image processing board 164 performs low level geometry processing, including transforms, lighting and shading, texturing, anti-aliasing, translucency, etc. In one embodiment, the DSP 166 is responsible for front end geometry processing and lighting computations, but a number of these functions can be performed by the processor 132 of the host.

Overview of the Image Processing Board

Figure 4A:
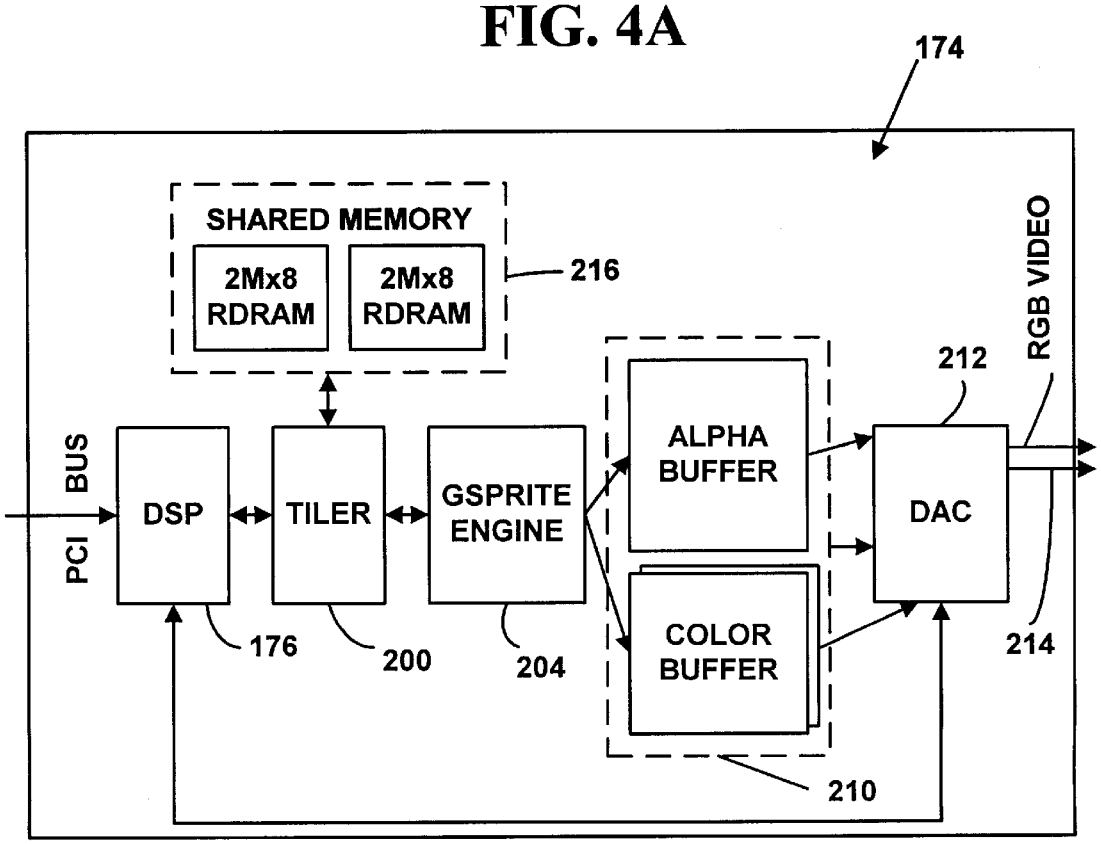
FIG. 4A is a block diagram of image processing hardware for an embodiment.

FIG. 4A is a block diagram illustrating the image processing board 174. The image processing board 174 communicates with the host computer through the bus 146. It includes a DSP 176, tiler 200, shared memory 216, the gsprite engine 204, compositing buffer 210, and a digital-to-analog converter (DAC) 212. The bus 146 (FIG. 2) transfers commands and data between the host and the DSP 176. In response to commands from the host, the image processing board 174 renders images and transfers display images to a display device 142 (FIG. 2) through the DAC 212.

In the embodiment illustrated in FIGS. 2–4A, the host processor and the DSP share the functions of the image preprocessor of FIG. 1. The image processor comprises the tiler 200, gsprite engine 204, compositing buffer 210, and DAC 212. Below, we provide more detail regarding these elements. It should be kept in mind, however, that the implementation of the image processing system can vary.

The shared memory 202 stores image data and image processing commands on the image processing board 174. In one embodiment, the shared memory is used to store gsprite and texture data in compressed form, DSP code and data, and various buffers used to transfer data between processing subsystems.

The DSP 176 is responsible for video compression/decompression and front-end graphics processing (transformations, lighting, etc.). Preferably, the DSP should support floating point and integer computations greater than 1000 MFLOPS/MOPS.

The tiler 200 is a VLSI chip which performs scan-conversion, shading, texturing, hidden-surface removal, anti-aliasing, translucency, shadowing, and blending for multi-pass rendering. The resulting rendered gsprite chunks are then compressed and stored in compressed form in the shared memory. The tiler additionally performs decompression and recompression of gsprite data in support of video and windowing operations.

The gsprite engine 204 operates at video rates to address and decompress the gsprite chunk data and perform the necessary image processing for general affine transformations (which include scaling, translation with subpixel accuracy, rotation, reflection and shearing). After filtering, the resulting pixels (with alpha) are sent to the compositing buffers where display pixel data is calculated.

Gsprite chunk data is processed a number of scan lines at a time for display. In one implementation, chunk data is processed 32 scan lines at a time. The compositing buffer (210) includes two 32 scan line color buffers which are toggled between display and compositing activities. The compositing buffer also includes a 32 scan line alpha buffer which is used to accumulate alpha for each pixel.

The DAC 212 includes a R G B video DAC and corresponding video port 214, to video editing devices. Individual components can be used to implement the functionality of the DAC.

System Operation

Figure 5A:
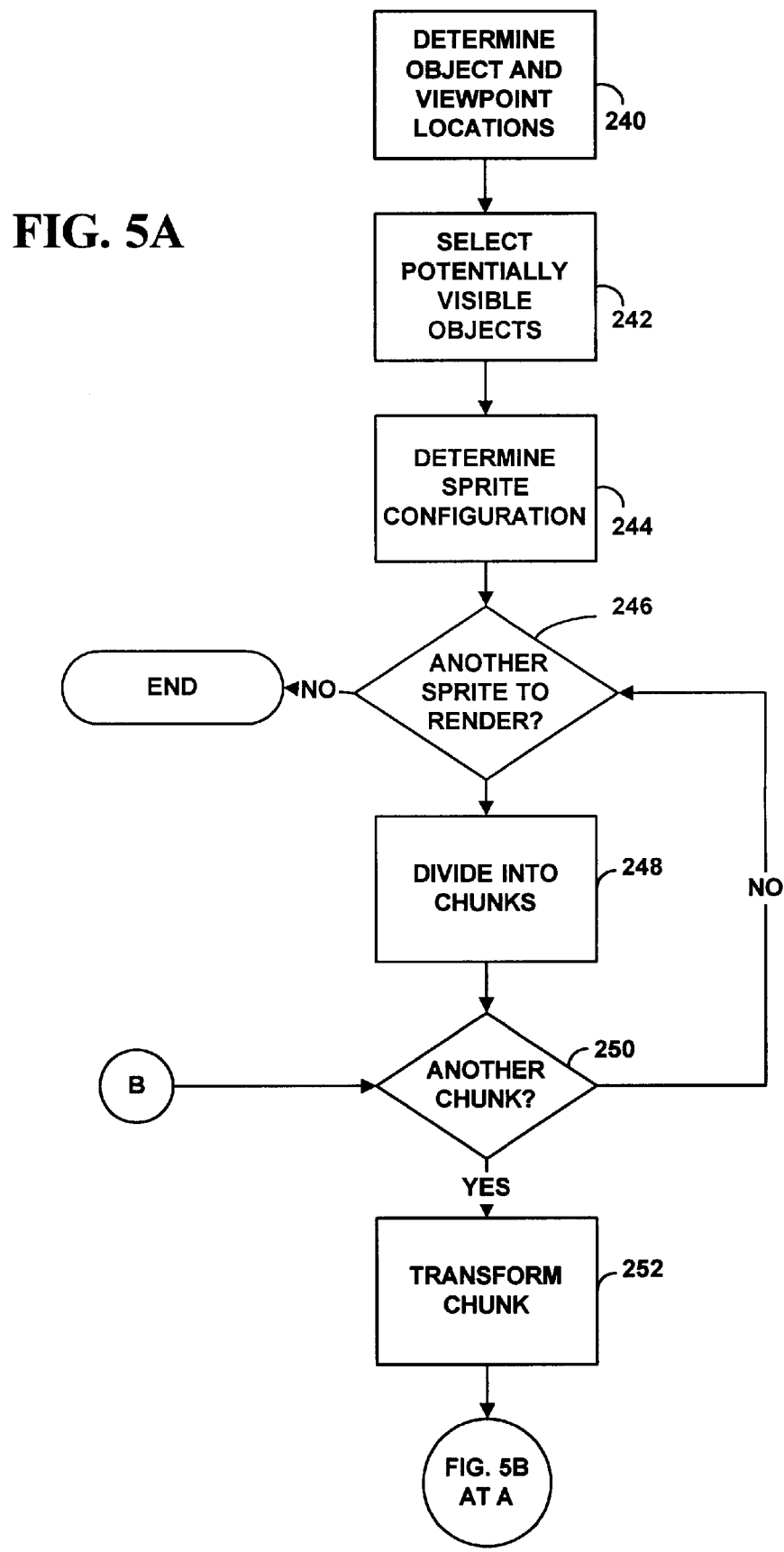
FIGS. 5A and 5B are flow diagrams illustrating an overview of the rendering process in an embodiment.
Figure 5B:
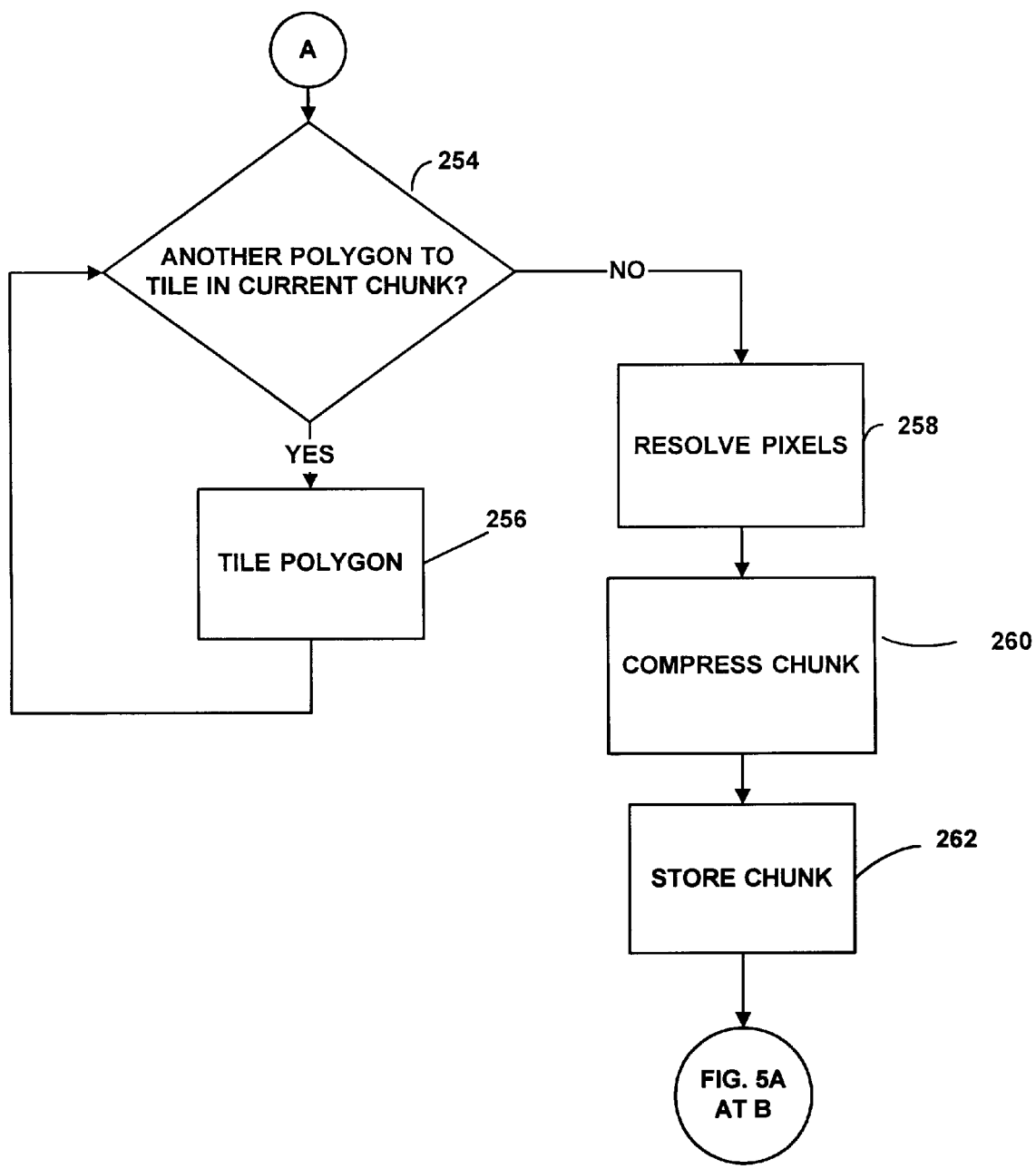

FIGS. 5A and 5B are flow diagrams illustrating steps in rendering an image in the image processing system. Before the image processor 106 begins rendering an image for the view space, the image preprocessor 104 determines object and viewpoint locations (240). In the embodiment illustrated in FIGS. 2 and 3, the graphics support software 160, running in the host computer system 132, determines the object and viewpoint locations from data provided by a graphics application. The graphics application, running on the host processor, defines models representing the relevant objects, and supplies a modeling transform, which is used to place the object with other objects in "world" coordinates.

Next, the image preprocessor 104 selects potentially visible objects (242). It determines potentially visible objects based on the view volume. The view volume is a three-dimensional space in world coordinates that provides the boundaries for a scene. The preprocessor selects potentially visible objects by traversing objects and determining whether their boundaries intersect the view volume. Objects that intersect the view volume are potentially visible in the geometric or spatial sense.

In some cases, it is useful to determine "temporally" potentially visible objects outside the current view volume, to account for future changes in the scene. This enables the system to adjust for rapid changes in the view volume. In typical 3-D graphics systems, the only way to respond to this rapid change is to completely generate a new scene based on the changed input, interposing significant transport delay. Such a long delay has negative effects on the user, creating problems such as over-control and nausea. To reduce this delay, the image preprocessor of the present invention can calculate the location of objects positioned in an extended range outside the visible range, and the image processor can render and store images within this extended range. Using the affine transform capability of the system, viewpoint input for a subsequent frame can be used to reposition the gsprites from this extended range reducing system transport delay to less than 2 computational frames. Such a short transport delay is unachievable with current 3-D graphics hardware systems known to the inventors, and will enable much higher quality simulations with much better user immersion.

The image preprocessor determines the configuration of gsprites for the image (244). This step involves finding how to map potentially visible objects to gsprites. As part of this process, the image preprocessor 104 allocates gsprites, which includes creating a gsprite data structure to store image data corresponding to one or more potentially visible objects. If processing resources allow, each non-interpenetrating object in the scene is assigned to an independent gsprite. Interpenetrating or selfoccluding objects may be processed as a single gsprite.

The image preprocessor 104 can aggregate gsprites when the image processor does not have the capacity to composite the gsprites at the desired computational frame rate or there is insufficient system memory to store the gsprites. Rendering to separate gsprites will always be more computationally efficient, so if the system has the memory and compositing capacity, non-intersecting objects should be rendered into separate gsprites. If the system is incapable of storing or generating a display image based on a current assignment of gsprites, some gsprites can be aggregated to alleviate this problem.

After an object or objects are assigned to gsprites, the image processor divides the gsprites into image regions called "chunks" (248). The image preprocessor loops on gsprites and divides the gsprites into chunks (246, 248). In one embodiment, this process includes transforming bounding volumes of objects to the view space and finding rectangular image regions that enclose the transformed bounding volumes. These image regions define the dimensions of the gsprite in terms of the two-dimensional space to which the gsprite's object or objects are rendered. The gsprite is divided into chunks by dividing the rectangular image region into chunks and associating these chunks with the gsprite data structure.

As an optimization, the transformed bounding volume can be scaled and/or rotated so that the number of chunks required to render the gsprite is minimized. Because of this added transformation (scaling or rotating), the space to which the objects assigned to the gsprite are rendered is not necessarily screen space. This space is referred to as gsprite space. In the process of generating a display image, the gsprite should be transformed back to screen space.

The next step is to determine how to divide the object geometry among the chunks (250). The image preprocessor determines how the geometric primitives (e.g. polygons) should be divided among the chunks by transforming the polygons to 2-D space (252) and determining which chunk or chunks the polygons project into. Due to the expense of clipping polygons, the preferred approach is to not clip the polygons lying at the edge of a chunk. Instead, a chunk includes polygons that overlap its edge. If a polygon extends over the border of two chunks, for example, in this approach the vertices of the polygon are included in each chunk.

The image preprocessor then queues the chunk data for tiling. Tiling refers to the process of determining pixel values such as color and alpha for pixel locations covered or partially covered by one or more polygons.

Decision step (254) (FIG. 5B) and the step (256) following it represents the process of tiling the polygons within the chunk. While the image processor has included polygons that overlap the boundaries of the current chunk, it only produces pixels that lie within the chunk. The produced pixels include information for anti-aliasing (fragment records), which are stored until all pixels have been generated.

After completing the tiling of polygons in a chunk, the image processor resolves the anti-aliasing data (such as fragment records) for the pixels (258). In one embodiment, the tiler 200 uses double buffering to resolve a previous chunk while the next is tiled. Alternatively, the tiler can use a common buffer with a free list. The free list represents free memory in the common buffer that is allocated as new fragment records are generated and added to when fragment records are resolved. A combination of double buffering and common memory can be used as well.

The image processor compresses the resolved chunk using a compression scheme described further below (260). As the image processor resolves a block of pixels, it can compress another block. The image processor stores the compressed chunk in shared memory (262).

Figure 6:
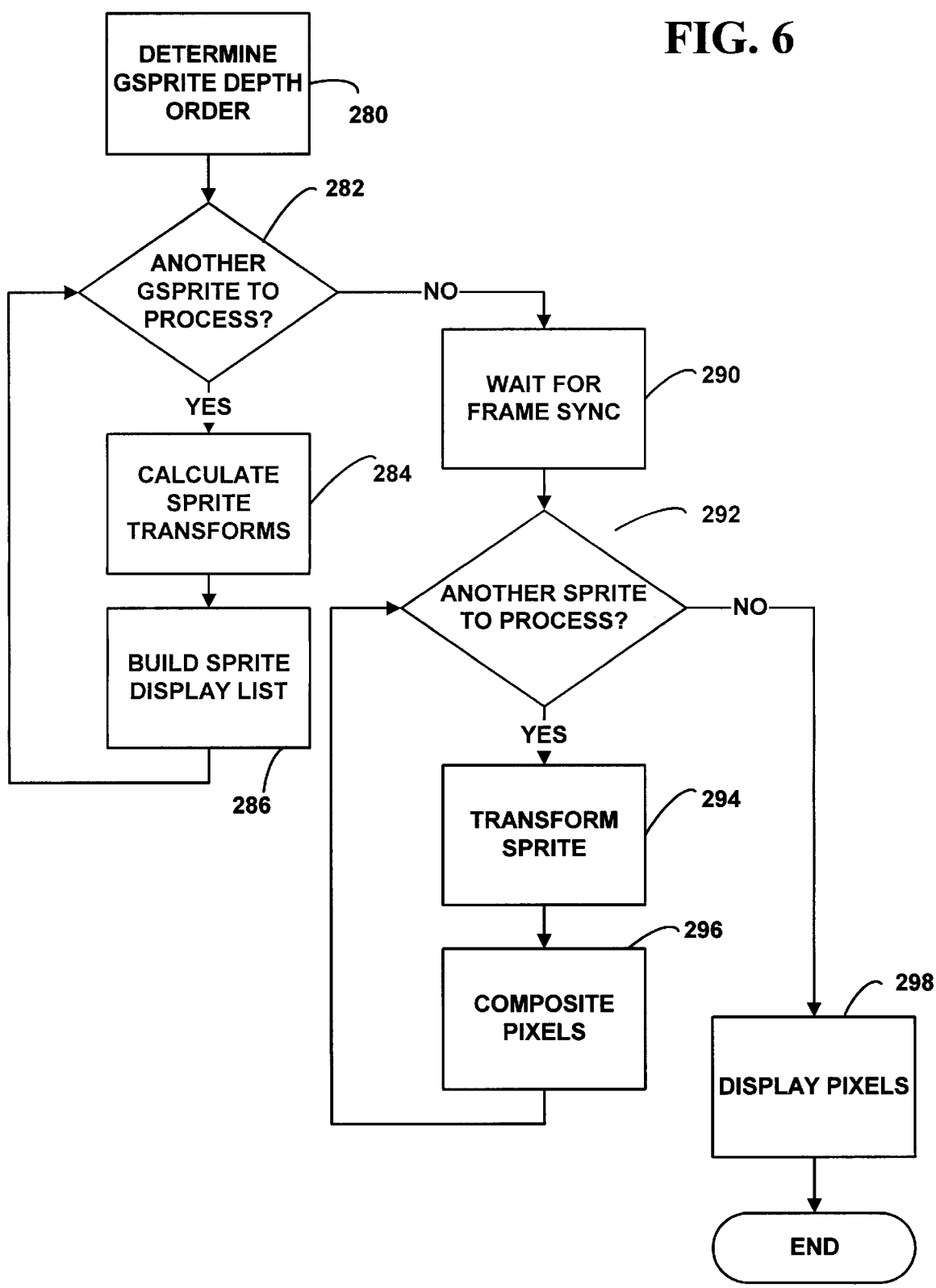
FIG. 6 is a flow diagram illustrating an overview of the display generation process of an embodiment.

FIG. 6 is a flow diagram illustrating the steps executed to display an image. On the image processing board 174 described above, images are read from shared memory 216, transformed to physical output device coordinates by the gsprite engine 204, composited in the compositing buffer 210, transferred to the DAC 212, and then transferred to an output device.

During the display process, the image processor accesses a list of gsprites to be displayed for the current frame. In the process of determining the gsprite configuration, the image preprocessor determines the depth order of gsprites (280). As noted above, one object is preferably assigned to a gsprite. However, the image preprocessor can assign more than one object to a gsprite, for example, to accommodate processing constraints of a particular image processor being used in the system. The image preprocessor sorts objects in Z-order, i.e. in distance from the viewpoint. In addition to sorting objects, it sorts gsprites in depth order as well and stores this depth data in the gsprite data structures.

The decision step (282) in FIG. 6 represents a loop on gsprites in the display process. The steps within this loop can include 1) calculating a transform for a rendered gsprite; and 2) building a gsprite display list to control how gsprites are displayed. These steps are described below.

For gsprites in the potentially visible range, the image processor calculates gsprite transforms. A gsprite transform refers to a transformation on a rendered 2-D gsprite. In one embodiment, the image processor can perform a transformation on a gsprite to reduce rendering overhead. Rather than rendering each object for every frame, the image processor reduces rendering overhead by re-using a rendered gsprite.

It is not necessary to compute a gsprite transform for every frame of image data. For instance, if a gsprite is rendered for the current frame of image data, it may not need to be transformed, unless e.g. the gsprite has been transformed to better match the bounding box for the object. In addition, some gsprites may not need to be re-rendered or transformed because the object or objects assigned to them have not changed and are not moving. As such, the step of transforming a gsprite is optional.

The gsprite may be multiplied by the unity matrix in cases where the position of the gsprite has not changed. This may apply, for example, in cases where the image processor has rendered the gsprite for the current frame, or where the gsprite position has not changed since it was originally rendered.

To specify how gsprites are to be displayed, the image processor creates a gsprite display list. The display list refers to a list or lists that define which gsprites are to be displayed on the display screen. This concept of display list can also apply to other output devices for presenting a frame of image data. The image processor uses the display list in mapping and compositing rendered gsprites to the physical device coordinates. While the step of building the display list is illustrated as part of a loop on gsprites, it is not necessary that the list or lists be generated specifically within this loop.

The display list can refer to a list of gsprites or a list of gsprites per band. A "band" is a horizontal scanline region of a display screen. For instance, in one embodiment a band is 32 scanlines high by 1344 pixels wide. The display list can include a separate list of gsprites for each band, in which case the band lists describe the gsprites impinging on the respective bands. Alternatively, the display list can be comprised of a single list implemented by tagging gsprites to identify which bands the gsprites impinge upon.

The display list in the illustrated embodiment is double-buffered. Double buffering enables the system to generate one display list while it reads another. As the system calculates the gsprite transforms and build the display list for one frame, it reads the display list for another frame and displays the image data in this list.

Because of the double buffering, the steps shown in FIG. 6 are over-lapped: the image preprocessor performs steps (280–286) for one frame while the image processor performs steps (290–298) for another frame.

Figure 7:
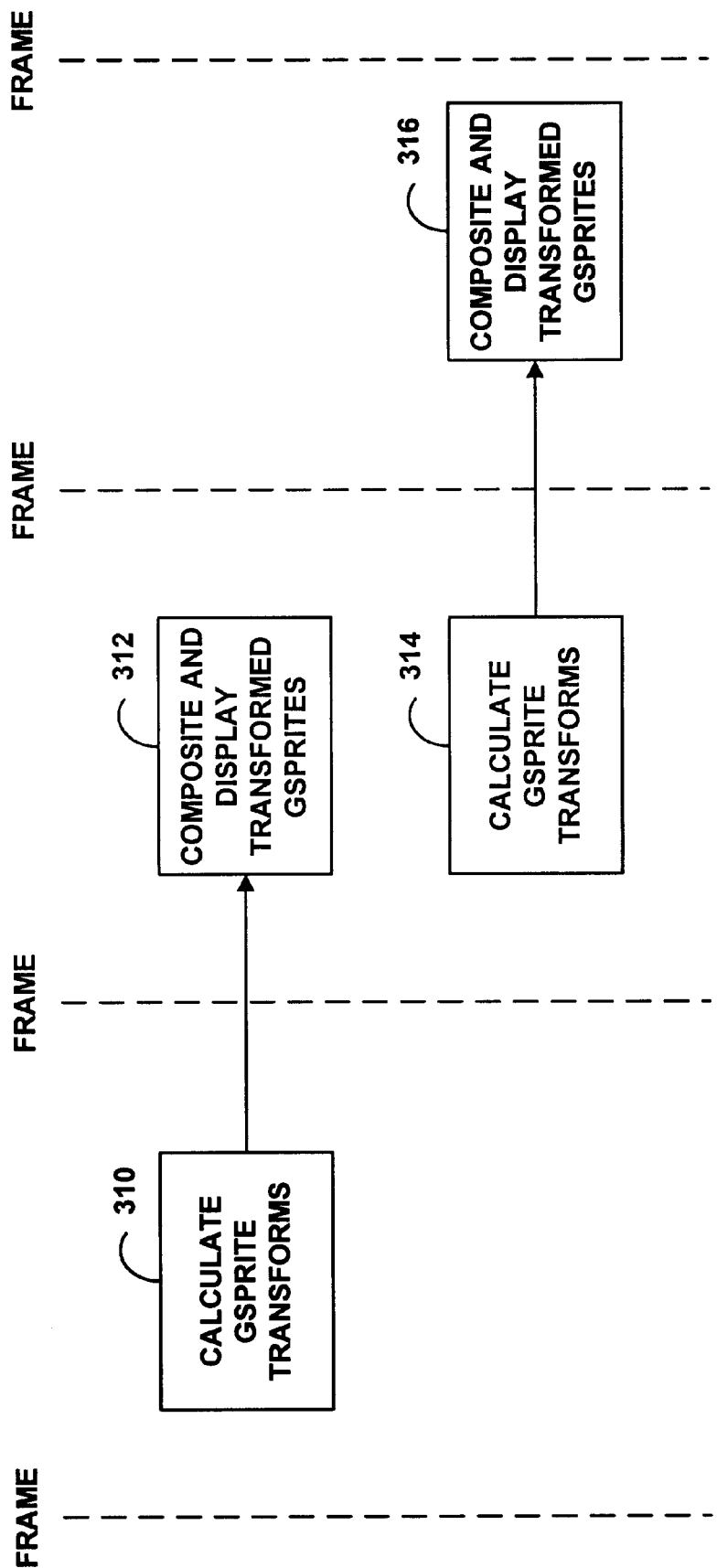
FIG. 7 is a diagram illustrating one aspect of display generation in terms of frame periods in an embodiment.

FIG. 7 is a block diagram illustrating the timing of these steps. After the system completes steps (280–286) (FIG. 6) for a frame 310, it waits for a frame sync signal (vertical retrace) and then performs the buffer swap. The display list it has just created is then used to determine the gsprites to be displayed in the current frame 312. While that display list is processed 312, gsprite transforms are computed and a display list is constructed for a next frame 314. In the next frame, the gsprite transforms and display list that were generated in the previous frame 314 are then used to generate the display image 316.

The image processor converts gsprites to output device coordinates based on the list of gsprites in the display list. The image processor reads gsprite data from shared memory, including color, alpha, and data identifying the gsprite's position. Based on this data, the image processor determines the color and alpha for pixels covered by the gsprite.

In one embodiment, the image processor loops on each band, transforming gsprites that impinge upon that band according to the gsprite display list. We will describe this display process in more detail below.

After transforming gsprite data, the image processor composites the resulting pixel data. This includes computing the color and alpha for pixels in output device coordinates based on the gsprite transforms. The image processor transforms the pixel data for gsprites in the display list and then composites the transformed pixel data. The process involves determining the color and alpha at a pixel location based on the contribution of one or more pixel values from gsprites that cover that pixel location.

In one embodiment, the image processor loops on bands and composites pixel data for each band. The image processor double buffers pixel data: it transforms and composites gsprite data for a band in one buffer while it displays composited pixel data for another band.

After compositing pixel data, the image processor then transfers composited pixel data to an output device. The most typical output device used in connection with this system is, of course, a display. To display the pixel data, it is converted to a format compatible with the display.

Having described system operation of an embodiment, we now provide more detail regarding the image processing board.

The Image Processing Board

In the one embodiment, the shared memory 216 comprises 4 Mbytes of RAM. It is implemented using two 8-bit Ram bus channels. The amount and type of memory can vary, however.

Figure 8:
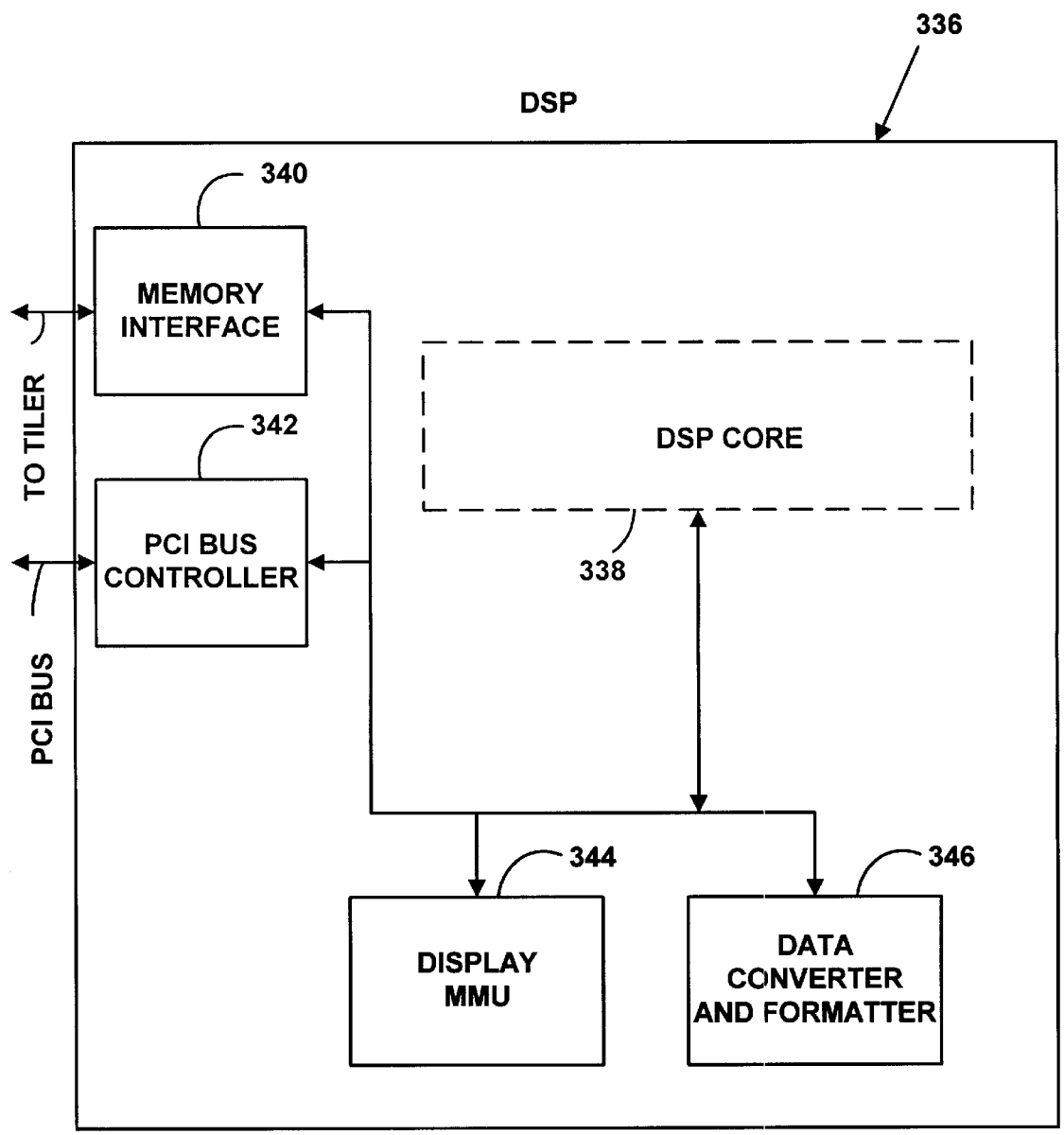
FIG. 8 is a block diagram of a Digital Signal Processor (DSP) in an embodiment.

FIG. 8 is a block diagram illustrating the DSP 336 on the image processing board 174. The DSP 336 is responsible for parsing the command stream from the host processor and performing some video processing, and front end geometry processing. The DSP performs front end geometry and lighting calculations used for 3-D graphics. This includes model and viewing transformations, clipping, and lighting. Portions of the gsprite animation management are also handled in the DSP such as gsprite motion extrapolation.

Rendering commands are stored in main memory buffers and DMAed to the image processing board 174 over the PCI bus and through the PCI bus controller 342. These commands are then buffered in the shared memory 216 on the board until needed by the DSP 336 (FIG. 8).

The DSP core 338 includes a processor for performing the image processing computations described above. In addition the DSP core performs scheduling, and resource management.

The Memory interface 340 supports high speed data transfers, e.g. 64 bits at 80 MHz. It is designed to interface with conventional DRAM and SDRAM devices. The tiler 200 is designed to directly connect to this bus, simulating the memory timing required by the DSP.

The data formatter and converter 346 in the DSP formats rendering instructions for the tiler. This block converts floating point color components into integer and packs them into the tiler specific data structures. It also buffers up a complete command and DMAs it directly to a memory buffer in shared memory. These rendering instructions are later read by the tiler when it is ready to perform the operations.

Among its formatting tasks, the data formatter and converter 346 formats triangle command data for the tiler. R G B (alpha) data which is calculated by the DSP (336) in floating point is converted to 8 bit integer. Coordinate information is converted from floating point to 12.4 fixed point. The data is packed into 64 bit words and transferred in a contiguous block to the shared memory to optimize bandwidth.

The display memory management unit (MMU) 344 is used for desktop display memory. It traps PCI accesses within a linear address range that is allocated as the desktop display memory. It then maps these accesses to image blocks stored in shared memory.

The architecture of the image processing board (FIG. 4A, 174) is relatively independent of the specific DSP. However, the DSP should preferably have significant floating point performance. Suitable DSPs include the MSP-1 from Samsung Semiconductor and TriMedia from Phillips Semiconductor. These specific DSPs are two examples of DSPs that provide sufficient floating point performance.

Figure 9A:
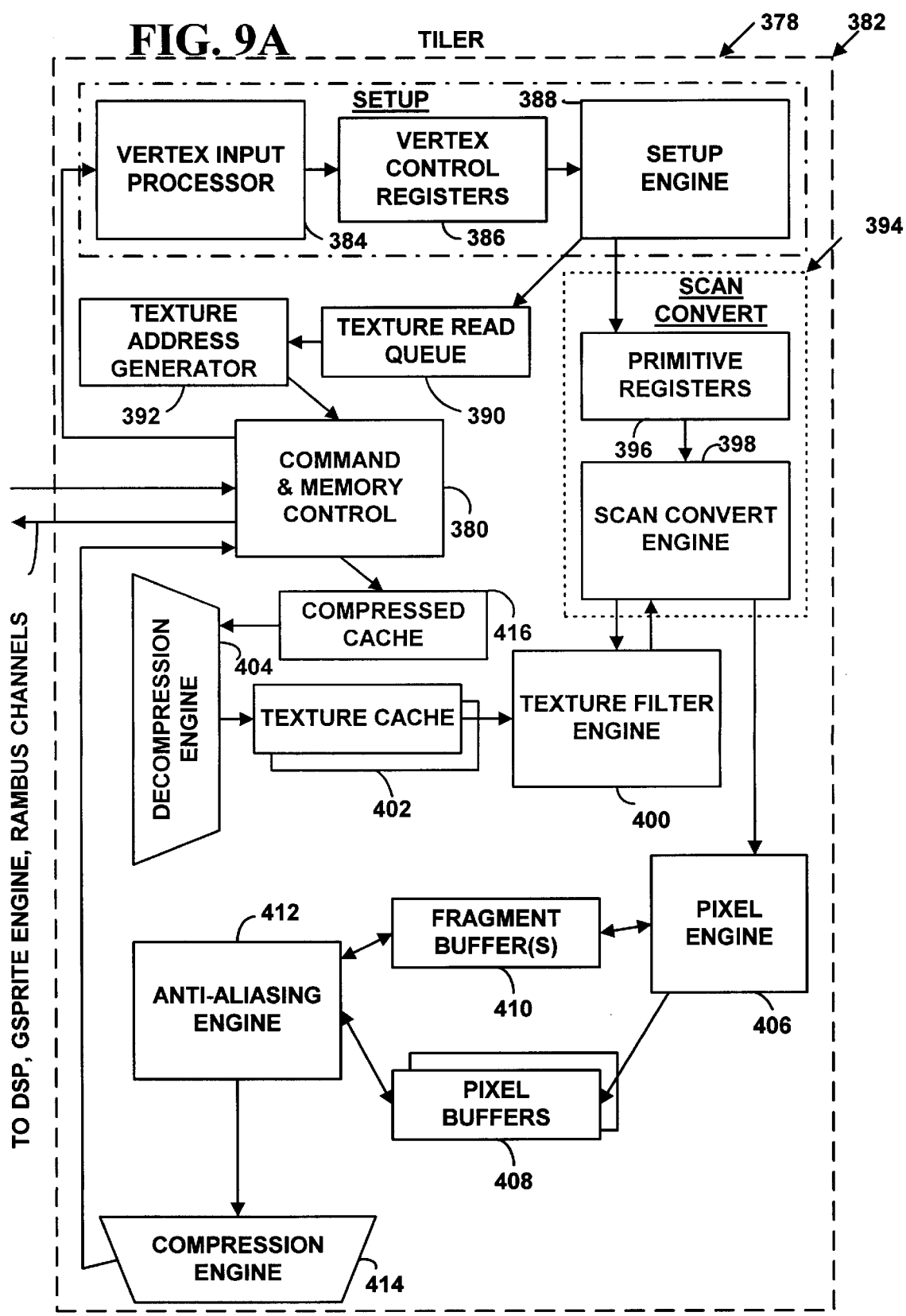
FIGS. 9A–C are block diagrams illustrating alternative embodiments of a tiler.

FIG. 9A is a block diagram of the tiler 200 on the image processing board 174. The tiler is responsible for 2-D and 3-D graphics acceleration, and for shared memory control. As shown in the block diagram of the image procession board, the tiler connects directly to the DSP (176, FIG. 4), the gsprite engine 204, and the shared memory system 216.

The functional blocks shown in the block diagram above are described in this section.

The tiler 378 includes a number of components for primitive rendering. The command and memory control 380 includes an interface to shared memory 216, the gsprite engine 204, and the DSP 176. Accesses to memory from the tiler, DSP, and gsprite engine are arbitrated by this block. A queue is provided to buffer read accesses.

The setup block 382 calculates the linear equations which determine the edge, color, and texture coordinate interpolation across the surface of the triangle. These equations are also used to determine which texture blocks will be required to render the triangle. The edge equations are also passed to the scan conversion block 394 and are stored in the primitive registers 396 until required by the scan convert engine 398.

The setup block 382 includes three components: the vertex input processor 384, vertex and control registers 386, and the setup engine 388. The vertex input processor 384 parses the command stream from the DSP. The vertex and control registers 386 store the information necessary for processing polygons or other geometric primitives. Triangle processing is used in this specific embodiment, and the tiler 200 includes registers for six vertices (three for each triangle) to allow double buffering of triangle processing. The setup engine 388 calculates the differentials for color, depth, edges, and texture coordinate interpolation across the surface of the triangle. These equations are also used to determine which texture blocks are used to render the triangle. The setup engine also pre-fetches texture chunks so that they are available when needed by the scan convert engine 398.

The setup engine 388 also communicates with the texture read queue 390, and a texture address generator 392. The texture read queue 390 buffers read requests for texture blocks from shared memory. While we use the term "texture" in referring to the portions of the tiler used to retrieve image data blocks from memory, it should be understood that this term can refer to texture maps, shadow maps, and other image data used in multi-pass rendering operations. The texture address generator 392 determines the address in memory of the requested chunks and sends texture read requests to the command and memory control 380. The texture address generator 392 includes a memory management unit that controls the writing of image data to the texture cache.

The scan convert block 394 receives differentials and other vertex data from the setup block and generates pixel data. The scan convert block 394 includes primitive registers 396, and the scan convert engine 398. The primitive registers 396 store the equation parameters for each triangle parameter. The primitive registers include registers to store multiple sets of equations so that the scan convert engine does not stall waiting for texture data.

The scan convert engine 398 scan converts polygons, which in this case are triangles. The scan convert block 394 includes the interpolators for walking edges and evaluating colors, depths, etc. The pixel address along with color and depth, and anti-aliasing coverage information is passed to the pixel engine for processing.

The scan convert engine 398 passes texture addresses to the texture filter engine 400, which calculates the texture data. The texture filter engine 400 calculates pixel color and alpha data for polygons that are being rendered. The illustrated texture filter engine computes a filter kernel based on the Z-slope and orientation of the triangle being rendered, and on the center of the texture request (the S and T coordinates of a point mapped into the texture). Filtering is performed in two passes in a pipelined fashion so that a new pixel is generated every cycle. The filter kernel can be an anisotropic filter or an isotropic filter. Where anisotropy is not required, the filter kernel can use negative lobes allowing much sharper textures than is possible with tri-linear interpolation. The texture filter engine 400 also handles Z-comparison operations for computing effects on shadows.

The texture cache 402 stores blocks of decompressed image data. In one implementation, the texture cache 402 stores texture data for sixteen 8×8 pixel blocks. The data is organized so that 16 texture elements can be accessed every clock cycle.

The decompression engine 404 decompresses texture data and transfers it to the texture cache 402. In this embodiment, the decompression engine includes two decompressors, one which implements a discrete cosine transformation (DCT) based algorithm for continuous tone images such as textures, and the other which implements a lossless algorithm for desktop pixel data. The DCT based algorithm is implemented by two parallel decompression blocks, each of which can generate eight pixel elements (i.e. two pixels) per clock cycle.

The compressed cache 416 can be used to buffer compressed data before the decompression engine 404 decompresses and transfers it to the texture cache 402.

The scan convert engine 398 transfers pixel data to the pixel engine 406. The pixel engine 406 performs pixel level calculations including blending, and depth buffering. The pixel engine also handles Z-comparison operations required for shadows. To achieve optimal performance, the pixel engine should preferably operate at one pixel per clock cycle.

The pixel engine 406 controls transfers of pixel data to a rasterization buffer. The rasterization buffer includes pixel buffers 408, and fragment buffers 410 in the illustrated embodiment. The pixel buffers 408 include two buffers to support double buffering. In this implementation of the pixel buffers, each pixel entry stores eight bits per color component (R G B), eight bits for the alpha component, 24 bits for the Z-buffer, 8 bits for the stencil buffer, and a nine bit pointer into the fragment buffer. This is a total of 73 bits per pixel. One pixel buffer is used by the pixel engine 406 while the other is used by the anti-aliasing engine 412. The buffers are then swapped.

The fragment buffers 410 store fragments for partially covered pixels called pixel fragments, which result from pixels of polygons whose edges cross a given pixel, or are translucent. The fragment buffer is single buffered in the implementation shown in FIG. 9A. A free list of fragments is maintained, such that as fragments are resolved, they are added to the free list, and as fragments are generated, they use entries from the free list. Alternatively, the fragment buffer could be double buffered, so that one fragment buffer could be resolved by the anti-aliasing engine while the other was filled by the pixel engine in parallel.

In one embodiment, a fragment record includes the same data as in the pixel buffer entries plus a 4×4 mask. The nine bit pointer is used to form a linked list of entries, with a reserved value indicating the end of the list. In this embodiment, the fragment buffers 410 includes a total of 512 entries, but the size can vary.

The anti-aliasing engine 412 calculates the color and alpha component for pixels which are affected by more than one polygon, which occurs when polygons only partially cover the pixel area (i.e. the polygon edges cross the pixel) or when polygons have translucency. The anti-aliasing engine 412 transfers resolved pixel data to the compression engine 414. In this embodiment, the compression engine 414 includes two compressors, one DCT based for continuous tone images, and one lossless for desktop pixel data. The DCT based algorithm is implemented using a compressor capable of compressing eight pixel elements per clock cycle. The compression engine 414 compresses the resulting rendered gsprites and sends the compressed data to the command memory and control 380 for storage in shared memory 216 (FIG. 4). The tiler also has a compressed cache 416 for caching compressed data.

Figure 10:
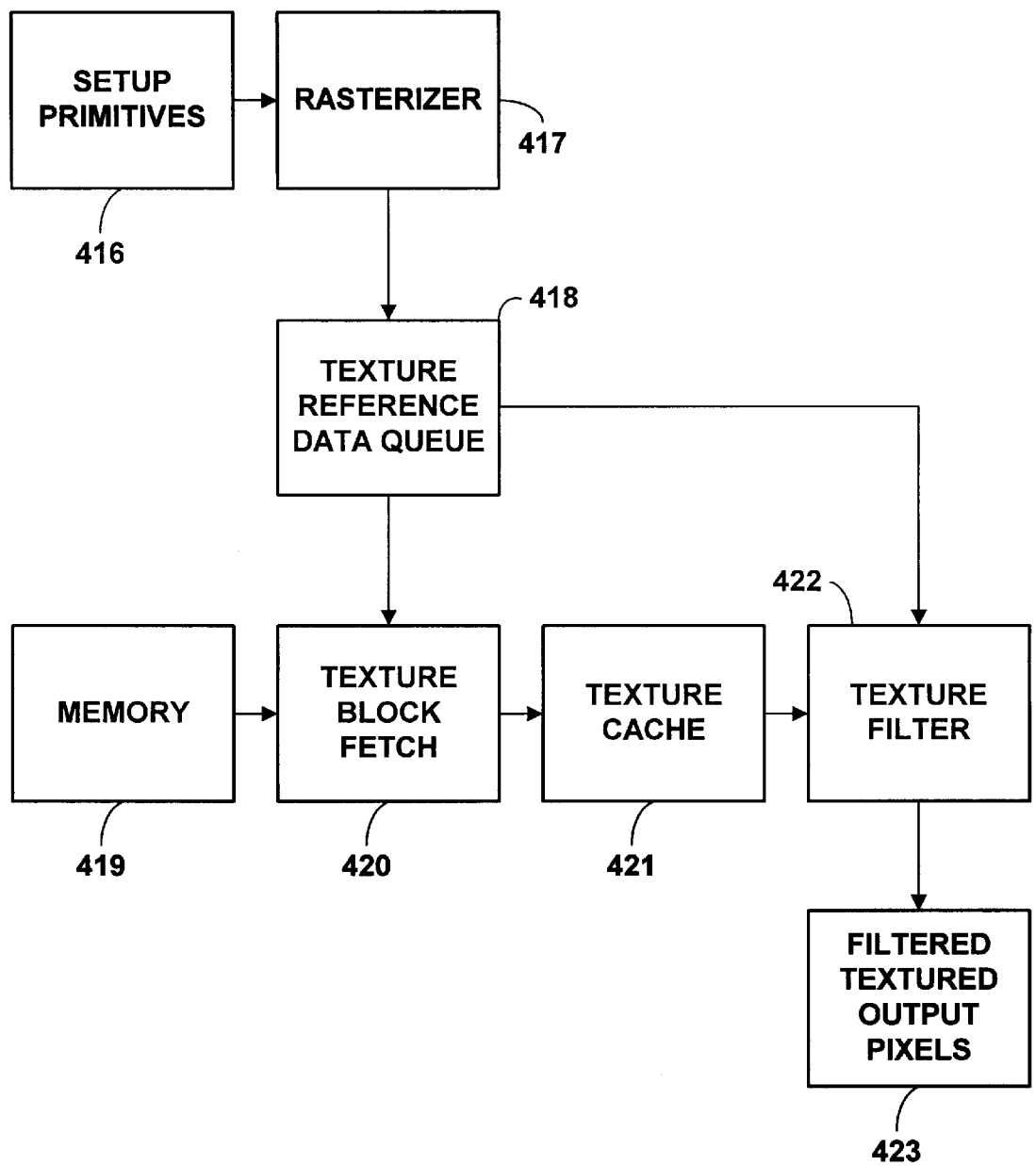
FIG. 10 is a block diagram illustrating a system for accessing texture data from memory.
Figure 11:
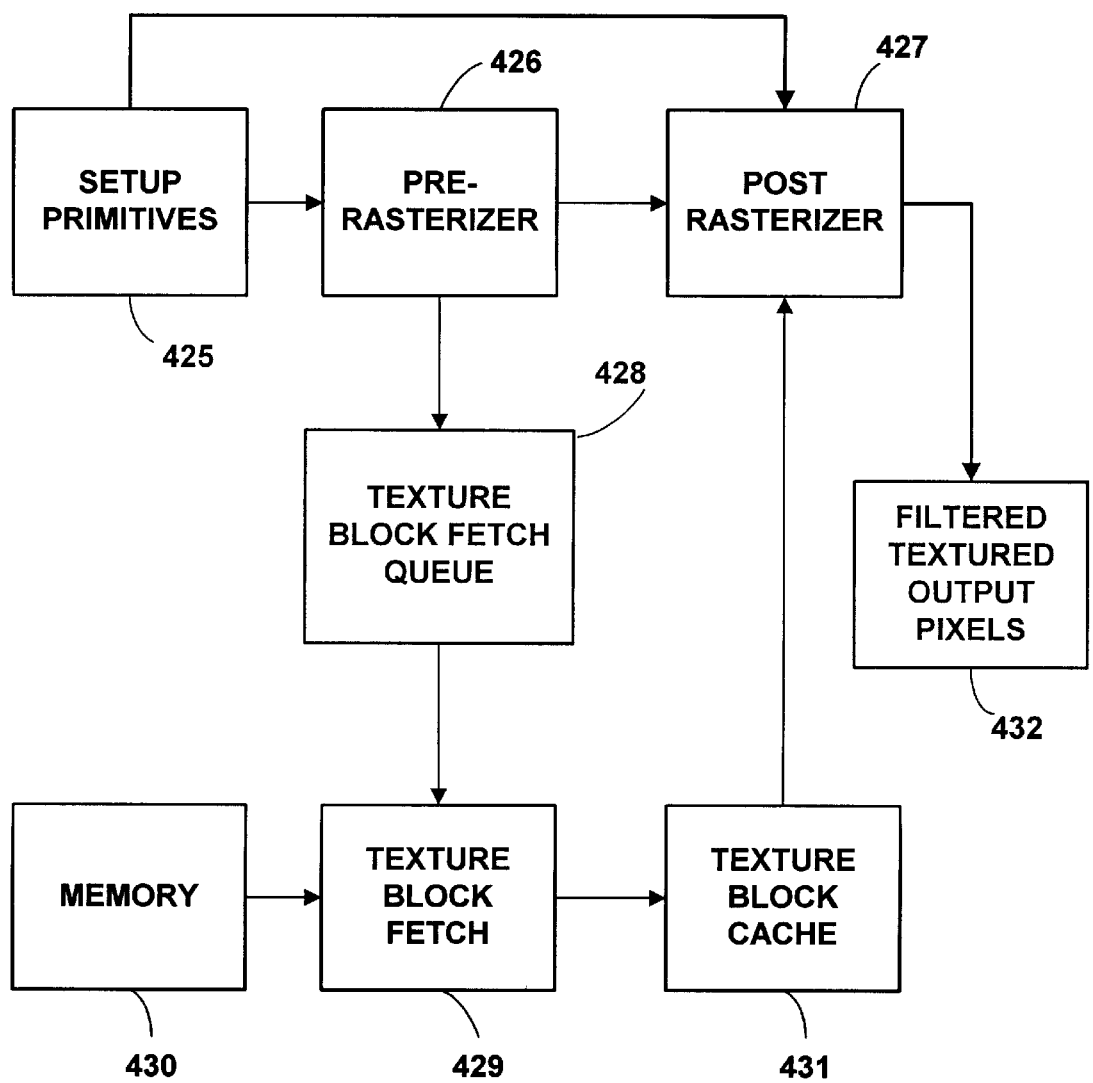
FIG. 11 is a block diagram illustrating a system for accessing texture data from memory.

FIGS. 10 and 11 illustrate two alternative implementations for accessing image data from memory during the pixel generation process. There are a number of instances when image data has to be accessed from memory during pixel generation. These include for example, accessing a texture map during a texture mapping operation, accessing a shadow map during a shadowing operation, and accessing color and/or alpha data during multi-pass blending operations. For simplicity, we refer to the image data in memory as "textures" or "texture data". However, it should be understood that the methods and systems described here can also be applied to other types of image data accessed from memory during pixel generation.

The implementations illustrated in FIGS. 10 and 11 provide alternative approaches to efficiently load and utilize a texture cache on the tiler. A significant advantage of these approaches is that texture data can be stored in memories with high latency and even in a compressed format without unduly hampering performance. As a result, less specialized and lower cost memory can be used to implement high performance rendering hardware.

Texture data from the memory is accessed and cached in units called "blocks" which are typically a small rectangular region appropriate for efficient fetching and catching. A typical block size is about 8×8 samples in size. For instance, for texture maps, a typical block is 8×8 texels.

FIG. 10 is a functional block diagram illustrating one embodiment for accessing these blocks of texture data. This embodiment solves the latency problem by buffering pixel data from the rasterizer 417, including texture data requests, in a texture reference data queue 418. The queue includes enough entries to absorb the latency which would otherwise be incurred in accessing (and possibly decompressing) a texture block so that the rendering process can run at full speed. For example, if it takes 100 cycles to fetch a texture block, and the tiler is capable of producing one pixel per clock cycle, then the texture reference data queue includes at least 100 entries.

Data flow in the system illustrated in FIG. 10 proceeds as follows. First, geometric primitives are set-up for rasterization as shown in block 416. Set-up processing includes, for example, reading vertices for a geometric primitive such as a triangle, and calculating the differentials for color, depth, and edges across the surface of the triangle. The parameters resulting from these computations are then fed to the rasterizer 417.

The rasterizer 417 reads the equation parameter data for each primitive and generates pixel data. The rasterizer generates pixel data, including texture coordinates and filter data, and buffers this data in the texture reference data queue 418. The texture fetch block 420 reads texture reference data stored in the queue 418 and fetches the appropriate texture blocks from memory 419.

The pixel data stored in the texture reference data queue 418 in this implementation includes: an address of destination for the pixel (X, Y) being computed; depth data (Z), a coverage mask; color and translucency data; the coordinates of the center for the texture request (S, T); and texture filter data. The depth and coverage data is only needed in the texture reference data queue if high-quality anti-aliasing of pixels is desired. Alternatively, hidden surface removal and anti-aliasing can be performed in the rasterizer 417. If hidden surface removal and anti-aliasing are performed in the rasterizer, depth data and coverage data does not need to be stored in the data queue 418. The texture filter data may include a level of detail parameter for MIP-mapping, for example, or may include anisotropic filter data for higher quality texture filtering.

The texture block fetch 420 reads the texture reference data buffered in the data queue and retrieves the corresponding texture data from memory 419. In the case of texture map accesses, the texture block fetch unit converts the (S, T) center of the texture request and the texture filter data into the addresses of the blocks required to satisfy the texture filtering operation. The blocks identified in this process are then fetched into the cache, replacing other blocks as needed. Image data blocks can be fetched using a least recently used (LRU) or other suitable cache replacement algorithm. To reduce memory accesses, the texture block fetch unit keeps track of the texture blocks already stored in the texture cache 421 and avoids requesting the same block more than once. This capability significantly reduces the memory bandwidth required to perform high quality texture filtering because the latency in retrieving a texture block is incurred only once in computing an image.

The texture block fetch unit includes a hold-off mechanism to prevent from overwriting texture blocks still needed in the texture filter unit in the tiler. One way to implement such a hold-off mechanism is to associate a reference count with each texture block to keep track of whether the texture filter has used a particular texture block. This reference count is incremented on receipt of a texture request to a block by the texture fetch unit, and decremented in response to its use by the texture filter unit. The texture block fetch unit then only replaces blocks that have a corresponding reference count of zero.

An alternative way to implement the hold-off mechanism is to allocate a buffer for temporary storage of texture blocks output by the texture fetch unit. In this approach, the image block is first written to temporary storage buffer. After the texture fetch unit has completed writing the image block to the temporary storage buffer, it can then be transferred to the texture cache. Image blocks are swapped to the texture cache when first needed by the texture filter unit 422.

In the case of texture mapping operations, the texture filter block 422 reads texture samples from the texture cache 421 and the pixel data stored in the texture reference data queue 418, and computes pixel color and possibly alpha values from the texture sample data.

In addition to texture mapping operations, this approach can also be applied to shadowing and multi-pass blending operations as well. For instance, texture reference data queue can be used to retrieve a shadow depth map residing in memory. Alternatively, the texture reference data queue can be used to retrieve color and/or alpha data used in multi-pass lighting and shading operations. More detail regarding texture mapping, shadowing, and multi-pass operations is provided below.

There are a number of advantages to buffering pixel data in the manner described above. One significant advantage is that the image data can be stored in less specialized memory (with higher access time), which reduces the cost of the overall system. In addition, image data including textures can be stored in compressed format and can still be accessed at fast enough rates to perform sophisticated pixel operation such as texture filtering. As a result, the system is able to achieve improved performance at a lower cost relative to known methods for accessing texture data.

Another advantage to this approach is that the texture reference data queue is able to predict accurately which image blocks need to be accessed from memory. As a result, the system incurs latency for memory accesses no more than necessary. Once the image data blocks are in the texture cache, the texture filter unit can run at the full speed of the rasterizer, as long as there is sufficient memory bandwidth and texture fetch throughput to write the requested image blocks to the texture cache.

Queuing texture references with the texture request center and filtering the data allows the queue to be much smaller than if texels with their corresponding texture filter weights were queued.

FIG. 11 is a functional block diagram illustrating an alternative embodiment for accessing image data from memory. In this approach, geometric primitives are queued and then processed in a pre-rasterizer to hide the latency of the texture block fetch during the pixel generation process. An example will help illustrate the concept. If an average primitive takes 25 cycles to rasterize, and it requires 100 clock cycles to fetch a texture block from memory, the primitive queue should be at least four primitives long. A simplified version of the post-rasterizer, the pre-rasterizer includes circuitry to determine the image data blocks that need to be accessed from memory. Once the texture data is fetched, the post-rasterizer can generate pixel data using texture data without being exposed to the delay involved in fetching blocks from memory.

The data flow through this implementation occurs as follows. As in the implementation described above, geometric primitives are processed in a set-up block 425 for rasterization. In this particular implementation, however, the set-up block 425 includes a larger primitive queue to buffer more primitives. The pre-rasterizer 426 quickly converts the primitives into a list of texture blocks needed to satisfy the texture filtering needs for all of the pixels covered by the primitive in the order that the blocks will be needed by the post-rasterizer 427. The pre-rasterizer is a simplified version of the post-rasterizer 427, or the rasterizer 417 in the alternative implementation. In this approach, the pre-rasterizer only needs to compute texture data addresses and determine texture requests.

The pre-rasterizer also keeps a model of the texture block cache and performs the cache replacement algorithm, such as least recently used (LRU) to keep from exceeding the size of the texture block cache. As part of the cache replacement algorithm, the pre-rasterizer compresses repetitive requests to a single texture block to only one request to the texture block fetch unit 429.

The texture block fetch queue 428 includes entries for storing texture block requests. The texture block fetch unit 429 reads texture requests from the texture block fetch queue and retrieves the appropriate blocks from memory 430.

The post-rasterizer rasterizes primitives queued in the set-up block 425 to generate pixel data for a pixel location. If image data needs to be accessed from memory during the pixel generation process, the post-rasterizer rasterizes the primitives as quickly as the necessary texture blocks can be transferred to the texture block cache 431. When the post-rasterizer completes rasterizing a primitive queued in the set-up block, the primitive is removed and replaced with another primitive from the input data stream. The set-up block is responsible for keeping the queue filled with primitives so that the pre-rasterizer and post-rasterizer are not stalled in the pixel generation process.

Like the alternative embodiment described above, the texture block fetch should preferably include a hold-off mechanism to prevent it from overriding the texture blocks that are still needed by the post-rasterizer. The two hold-off mechanisms described above can also be used in this implementation. Specifically, a reference count can be used to keep track of when an image block has been requested and then used. In this case, the reference account would be incremented on receipt of a texture request for a block by the pre-rasterizer, and decremented upon use by the post-rasterizer. The texture block fetch unit then only replaces blocks in the texture cache when their corresponding reference count is zero.

Alternatively, a buffer can be allocated for temporary storage of texture blocks output by the texture fetch block. When the texture fetch block has completed writing a block to this temporary buffer, it can then be transferred to the texture block cache 431 when requested by the post-rasterizer 427. When the post-rasterizer 427 first request data in a texture block in the temporary buffer, the block is then transferred to the texture block cache 431.

There are a number of advantages to this approach. First, texture data can be stored in less specialized memory and can still be accessed at rates required to support sophisticated texture filtering. An important related advantage is that texture data can be stored in a compressed format and then decompressed for use in the pixel generation process.

Another advantage of this approach is that requests to memory can be predicted so that the latency for memory access is incurred only once for each texture block to render a scene. Once the initial texture blocks are in the texture cache, the post-rasterizer can run at full speed, as long as there is memory bandwidth and texture fetch throughput to keep the cache current.

Figure 9B:
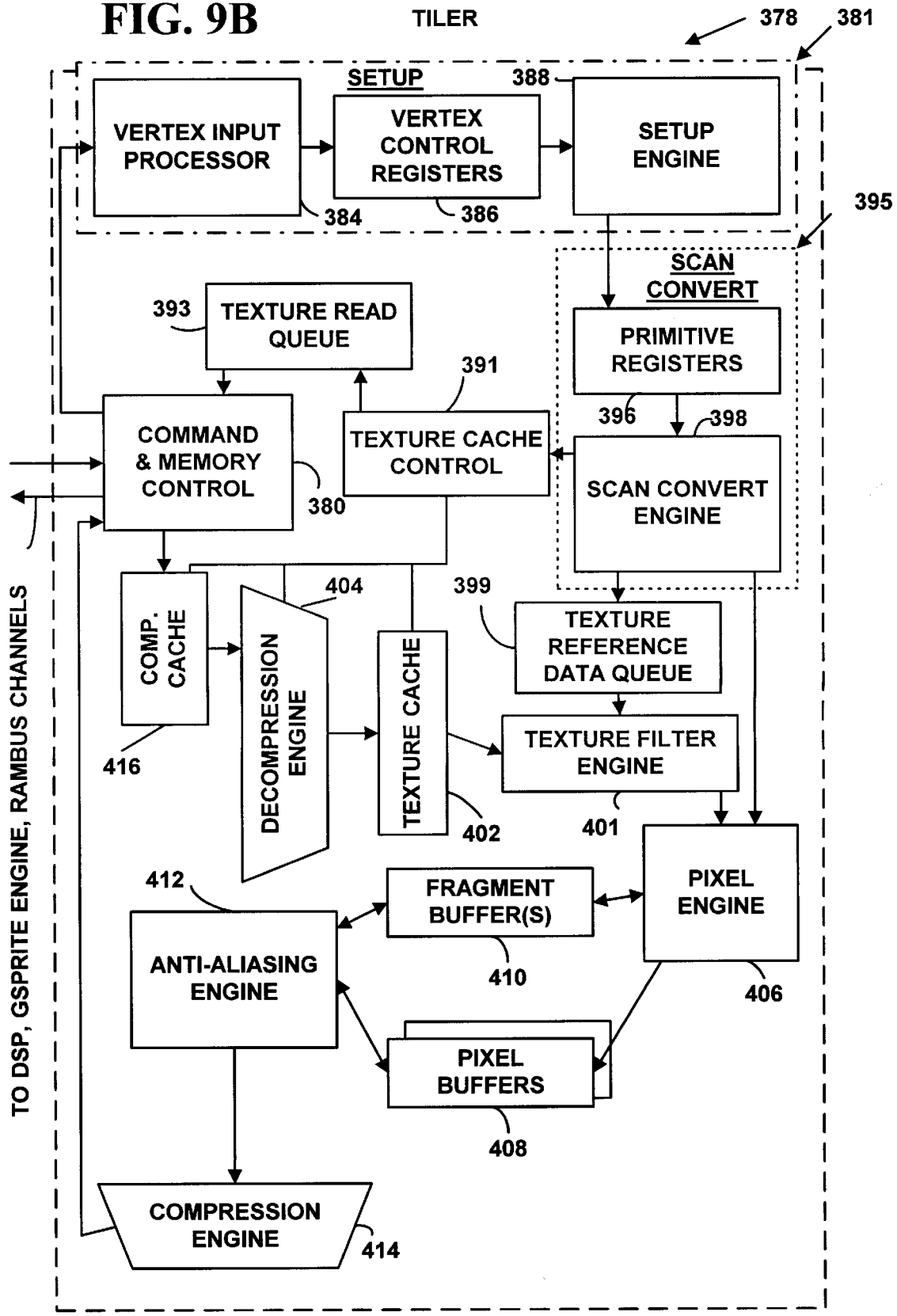

FIG. 9B illustrates a more detailed implementation of the system illustrated in FIG. 10. The set-up block 381 in FIG. 9B corresponds to the set-up block 416 in FIG. 10. Unlike the set-up block 382 of FIG. 9A, the set-up block 381 in this alternative implementation does not generate texture read requests. Instead, the scan convert block 395 generates pixel data, including texture reference data, which is buffered in the texture reference data queue 399.

The scan convert block 395 of FIG. 9B is a specific implementation of the rasterizer 417 in FIG. 10. It computes a Z-value, a coverage mask, color and translucency data, and the center of the texture request in texture coordinates. For some texture mapping operations, it also computes level detail data or anisotropic filter data. The texture filter engine 401 reads the texture request and possibly texture filter data buffered in the texture reference data queue 399 and accesses the appropriate texture samples in the texture cache. From this texture data, the texture filter engine computes the contribution of the texture to the pixel color and alpha values. The texture filter engine combines the color and alpha in the texture reference data queue 399 with the contribution from the texture to generate pixel values sent to the pixel engine 406.

The texture cache control 391, texture read queue 393, command and memory control 380 are specific implementations of the texture block fetch 420 in FIG. 10. In addition, for compressed texture blocks, the compressed cache 416 and the decompression engine 404 are also part of the texture block fetch 420.

Figure 9C:
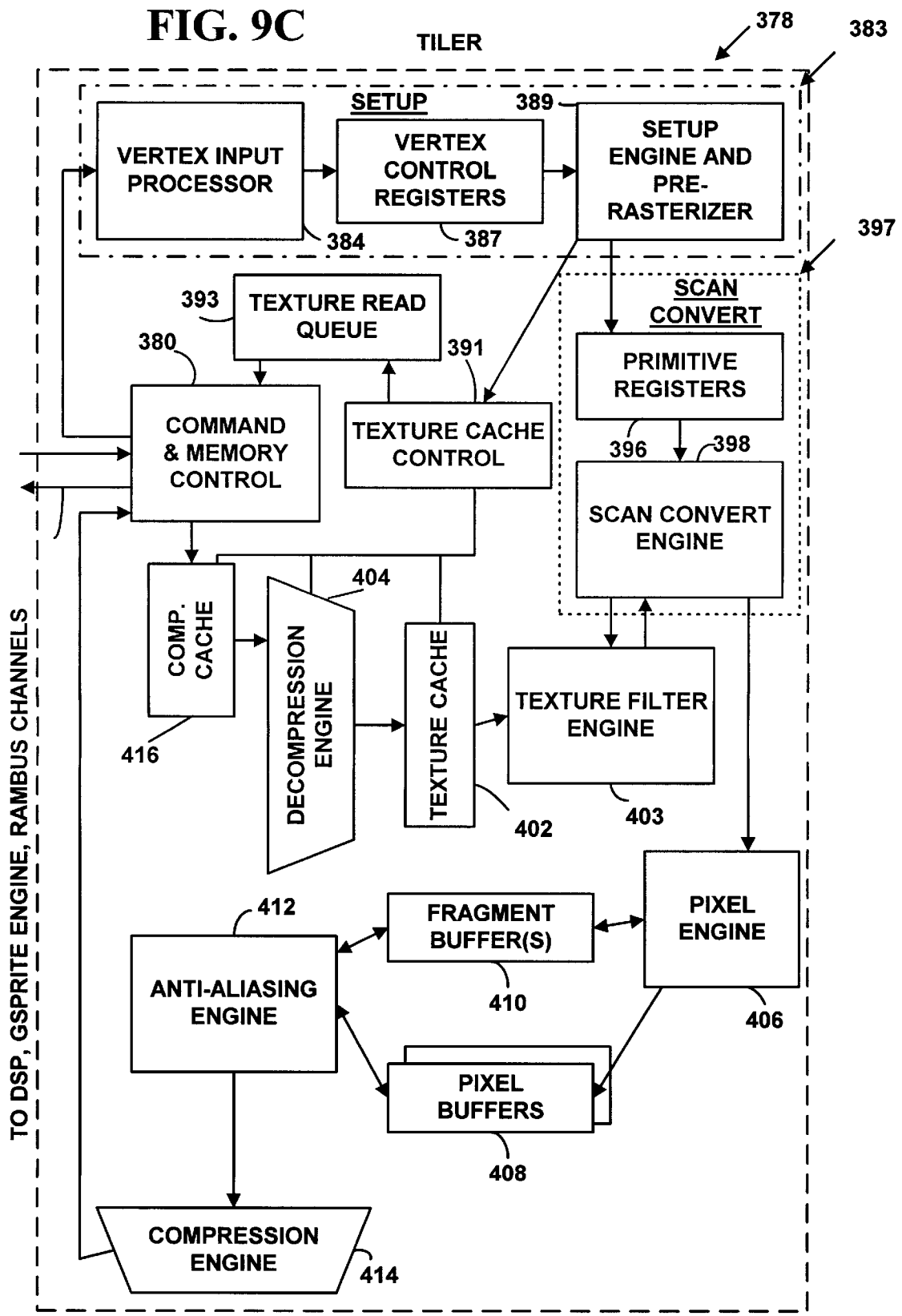

FIG. 9C illustrates a more detailed implementation of the system illustrated in FIG. 11. In this implementation, the functionality described in connection with blocks 425 and 426 of FIG. 11 is implemented within the set-up block 383. Specifically, the set-up block 383 includes the pre-rasterizer 426. The set-up block 383 also includes additional vertex control registers 387 to buffer additional primitives so that the prerasterizer can quickly convert the primitives to initiate texture data requests. The setup engine and pre-rasterizer 383 sends requests for texture blocks to the texture cache control 391 shown in FIG. 9C.

The texture cache control 391 ensures that the required texture blocks will be in the texture cache 402 when needed. The texture read queue buffers read requests for texture data blocks to the shared memory system. The command and memory control 380 arbitrates access to the shared memory system, and it includes a buffer for buffering data from memory. The texture cache control 391, texture read queue 393, and the command and memory control 380 are specific implementations of the texture block fetch 429 in FIG. 11. For compressed texture blocks, the compressed cache 416 and the decompression engine 404 are also part of the texture block fetch 429. The texture cache control 391 manages the flow of texture blocks from the compressed cache 416, through the decompression engine 404, into the texture cache 402.

The scan convert block 397 and the texture filter engine 403 are a specific implementation of the post-rasterizer 427 in FIG. 11. The scan-convert block 397 and the texture filter engine.403 operate similarly to their counterparts illustrated in FIG. 9A and described above.

Texture Cache Control

Above, we described two approaches for rasterizing in environments with high latency for texture fetch operations. We now describe aspects of the texture cache control in more detail.

The texture cache control scheme allows a rasterizer to function at full speed during texture mapping in spite of a high latency for texture map fetch operations. In the tiler, this latency is the result of the time required to read uncompressed texture data from shared memory (e.g., RAMBUS) plus the time required to decompress blocks of the texture map. The scheme also applies to the gsprite engine, which fetches gsprite blocks from shared memory, possibly decompresses them, and converts pixel data in gsprite space to view space (or more specifically, to screen coordinates).

The basic premise of the texture cache control scheme is to produce two identical streams of texel (or gsprite pixel) requests which are offset in time. The first (earlier) stream is a pre-fetch request for which no texture data is returned, while the second (later) stream is an actual request which does return texel data. The time difference between these two streams is used to hide the latency of reading and decompressing texture data.

Two approaches for generating these time-separated requests described above are: (1) duplicate rasterizers which both read from a single primitive FIFO (FIG. 11 and 9C); and (2) a single rasterizer followed by a pixel FIFO (FIG. 10 and 9B).

In approach (1), the first rasterizer peeks at primitives from positions at or near the input side of the primitive FIFO and rasterizes the primitives, making texture requests but not receiving any texels back and not producing any pixels. The second rasterizer removes primitives from the FIFO output and makes the identical requests at a later time, receives the texels from the texture cache controller, and produces the pixels. The depth of the primitive queue combined with the number of pixels per primitive determines the potential time difference between the two request streams.

In approach (2), the single rasterizer processes primitives and makes texture requests and outputs partially complete pixel data into a pixel FIFO. This partial pixel data includes all data that is necessary to finish computing the pixel once the texture requests are honored. At the output side of the pixel FIFO, the partial pixel is completed, which produces the identical stream of texture requests, receives the texels, and produces completed pixels. The depth of the pixel queue determines the potential time difference between the two request streams.

The Texture Cache Control

The texture cache control has two conceptual caches: the virtual cache, and the physical cache. The virtual cache is associated with the first (pre-fetch) request stream, and has no data directly accompanying the cache entries (requests to this cache do not return any data). The physical cache is associated with the second (actual) request stream, and has real texture data accompanying each cache entry (and thus returns data to the requester). These caches have the same number of entries.

The virtual cache controls and tracks the future contents of the physical cache, thus at any position in its request stream it has a set of cache key and entry associations which the physical cache will have at the same relative position in its request stream (at a future time).

Upon receiving a request (a new 'key'), the virtual cache performs the comparison against its current set of keys. If the requested key is not in the virtual cache, then a cache replacement operation is performed. The virtual cache replacement includes 1) selecting an entry for replacement (via LRU or some other algorithm), 2) replacing the key for that entry, and 3) invoking the (memory and) decompression subsystem to begin the process of fetching and decompressing the data associated with that key. The particular implementations shown in FIGS. 9B and 9C, the decompression subsystem includes the command and memory control 380, compressed cache 416, and decompression engine 404.

The output of the decompression subsystem is a block of texture data which is then placed into an entry in the physical cache (the texture cache 402, for example). In the tiler shown in FIGS. 9B and C, processing performed by the decompression subsystem is performed in a multi-entry pipeline in which serial order is maintained.

Note that if the requested key was already in the virtual cache, then no action is required because the associated data will be in the physical cache at the time it is requested from the second request stream.

Requests to the physical cache result in a similar key comparison to see if the requested data is already in the cache. If a matching key is found, then the associated data is returned. If a match is not found, then the next data output by the decompression subsystem is guaranteed to be the desired data. Note that the physical cache does not perform any replacement entry selection processing—the entry in the physical cache replaced by this new data is dictated by the virtual cache via a cache entry 'target' index computed by the virtual cache controller and passed through the decompression subsystem with the requested data.

Correct functioning of the scheme requires that flow control be applied to the interface between the decompression subsystem and the physical cache. If decompressed data is allowed to overwrite its targeted entry in the physical cache immediately upon being available, it is possible that all of the references to the previous contents of that cache entry may not have been completed. (Note that the physical cache controller also may have to wait for data to be output by the decompression subsystem.)

This flow control is accomplished by waiting until the new entry is requested before overwriting the previous entry's contents. Placing new data into the texture cache is thus always deferred until the last moment until it is needed.

Since this replacement is deferred until it is needed, any time required to place the data into the physical cache can introduce latency into the process driving the second request stream. Two schemes for alleviating this latency are as follows.

The first scheme is to double buffer data in the physical cache. This allows the decompression subsystem to immediately write each entry's data into its side of the double buffer, and the physical cache controller can do a (presumably fast) buffer swap to map the data into its side of the cache. The decompression subsystem only has to wait if the entry to be filled is already full and has not been swapped yet. Note that the cache replacement algorithm used by the virtual cache controller will tend to not repeatedly overwrite the same entry, thus 'spreading out' the writes to the cache entries.

The second scheme is for the physical cache to have one or more 'extra' entries in addition to the number of 'keyed' entries. The number of keyed entries is the number for which cache keys exist, and matches the number of entries in the virtual cache. The number of extra entries represents the number of entries which are unmapped (i.e. not currently keyed). The sum of these is the total number of data entries in the physical cache.

In the second scheme, all cache entries can transition between unmapped to mapped (associated with a key). The set of unmapped entries forms a FIFO of entries into which the decompression subsystem writes completed blocks of data. A separate FIFO structure is maintained for the target indices associated with these unmapped entries. When a request to the physical cache is made for which a matching key is not present, the first entry in the queue of unmapped of entries is mapped in to the targeted index and associated with that key. The replaced entry is unmapped and placed (empty) at the end of the unmapped queue.

Cache Key Generation

The basic premise of the scheme is that two identical streams of requests are generated. It is not a requirement, however, that the specific keys which are associated with these requests be identical.

The cache keys which form the first (early) stream of requests are used to control the reading and subsequent decompression of texture data. These keys must have some direct relevance to the requested data (such as a memory address).

The cache keys which form the second (later) stream of requests do not need to precisely match the content of the first stream—it is only a requirement that there be a unique one-to-one mapping between the two. This is due to the fact that the keys for the second stream are used only for matching existing cache entries, not for any data fetching operation. The critical fact here is that the association between the physical cache's key and a cache entry is made when the new data is mapped in to the physical cache, and the index of the associated entry is computed by the virtual cache and passed through the decompression subsystem.

This fact can be exploited to simplify the controls for the process which is generating the keys for the second request stream, since the keys for the stream need only be unique and not precisely 'correct'.

Figure 12A:
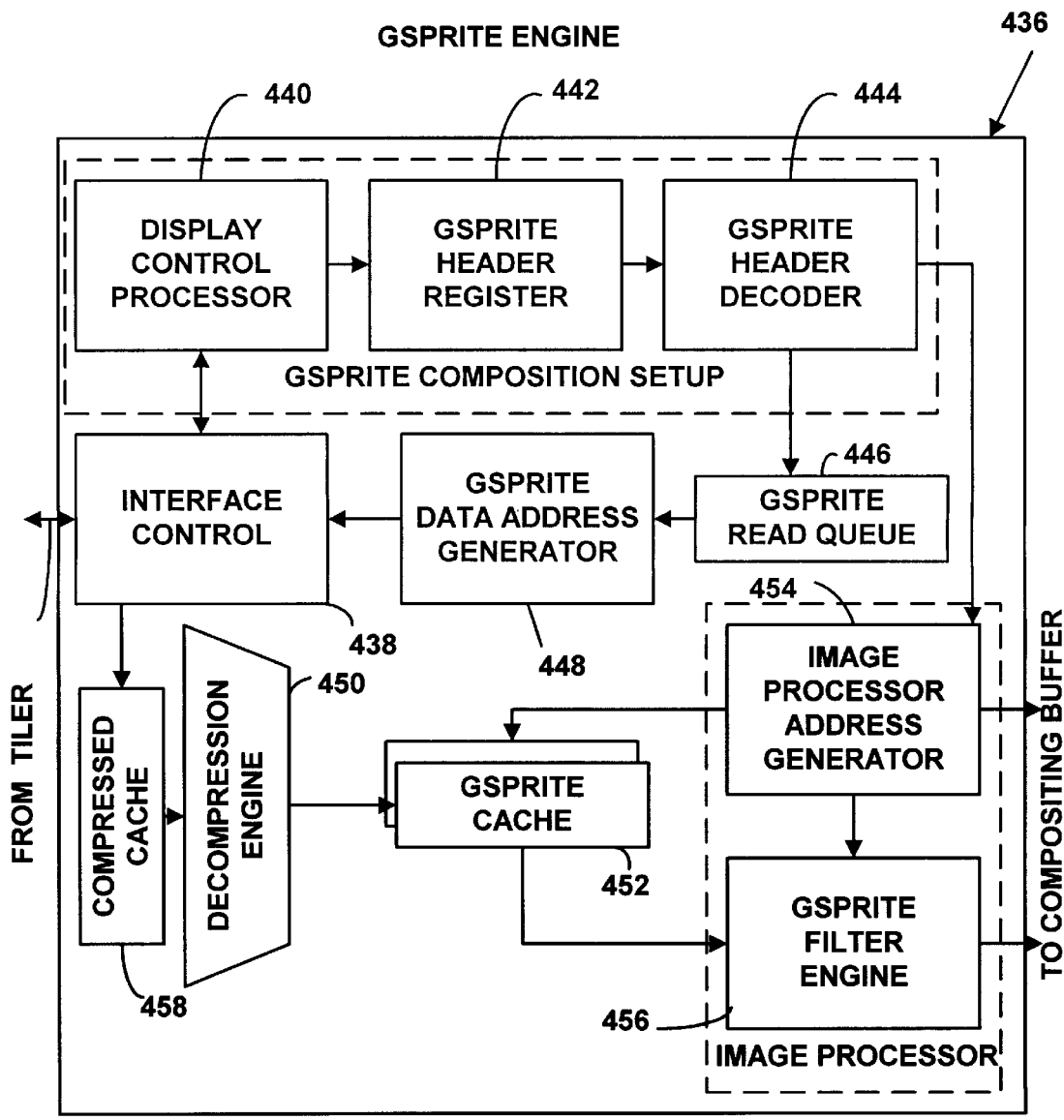
FIGS. 12A–B are block diagrams illustrating alternative implementations of a gsprite engine.

FIG. 12A is a block diagram illustrating the gsprite engine 436 on the image processing board 174. The gsprite engine 436 is responsible for generating the graphics output from a collection of gsprites. It interfaces with the tiler memory interface unit to access the gsprite data structures in shared memory. Gsprites are transformed (rotated, scaled, etc.) by the gsprite engine and passed to the compositing buffer where they are composited with pixels covered by other gsprites.

Interface control 438 is used to interface the gsprite engine with the shared memory system via the tiler. This block includes a FIFO to buffer accesses from the memory before they are distributed through the gsprite engine.

The display control 440 processor is used to control the video display updates. It includes a video timing generator which controls video display refresh, and generates the timing signals necessary to control gsprite accesses. This block also traverses the gsprite display data structures to determine which gsprites need to be read for any given 32-scanline band.

The gsprite header 442 registers store gsprite header data which is used by the image processor address generator 454 and gsprite filter engine 456 to determine the transformations on each gsprite. It is also used by the gsprite header decoder 444 to determine the blocks (in this case, the 8×8 compression blocks) required to render the gsprite in each band.

The gsprite header decoder 444 determines which blocks from each gsprite are visible in the 32-scanline band and generates block read requests which are transferred to the gsprite read queue 446. This block also clips the gsprite to the current band using the gsprite edge equation parameters. This process is described in more detail below.

The gsprite read queue 446 buffers read requests for gsprite blocks. This queue stores requests for sixteen blocks, in this embodiment.

The gsprite data address generator determines the address in memory of the requested gsprite blocks and sends gsprite read requests to the interface control block. The gsprite data address generator 448 includes a memory management unit.

Compressed data retrieved from shared memory 216 (FIG. 4A) can be temporarily stored in the compressed cache 458.

The decompression engine 450 includes two decompressors, one which implements a DCT based algorithm for continuous tone images such as 3-D gsprites and images, and the other which implements a lossless algorithm for desktop pixel data. The DCT based algorithm is implemented by two parallel decompression blocks, each of which can generate eight pixel elements (i.e. 2 pixels) per clock cycle.

The gsprite cache 452 stores decompressed, gsprite data (R G B ) for sixteen 8×8 blocks. The data is organized so that 16 gsprite pixels can be accessed every clock cycle.

The image processor address generator 454 is used to scan across each gsprite based on the specified affine transformation and calculate the filter parameters for each pixel. Gsprite cache addresses are generated to access gsprite data in the gsprite cache 452 and feed it to the gsprite filter engine 456. The image processor address generator 454 also controls the compositing buffer.

The gsprite filter engine 456 calculates the pixel color and alpha for pixel locations based on the filter parameters. This data is transferred to the compositing buffers for compositing. This block 456 computes a 4 or 16 pixel filter kernel based on the gsprite s and t coordinates at a pixel location. The filter may, for example, either be bilinear or a more sophisticated sum-of-cosines function. The 16 pixel filter kernel can have negative lobes allowing much sharper filtering than is possible with bi-linear interpolation. The gsprite filter engine 456 generates four new pixels to be composited every clock cycle. These pixels are aligned in a two by two pattern.

The gsprite engine 436 interfaces to the tiler 200 and the compositing buffer 210. Control signals control video timing and data transfer to the DAC 212.

Figure 12B:
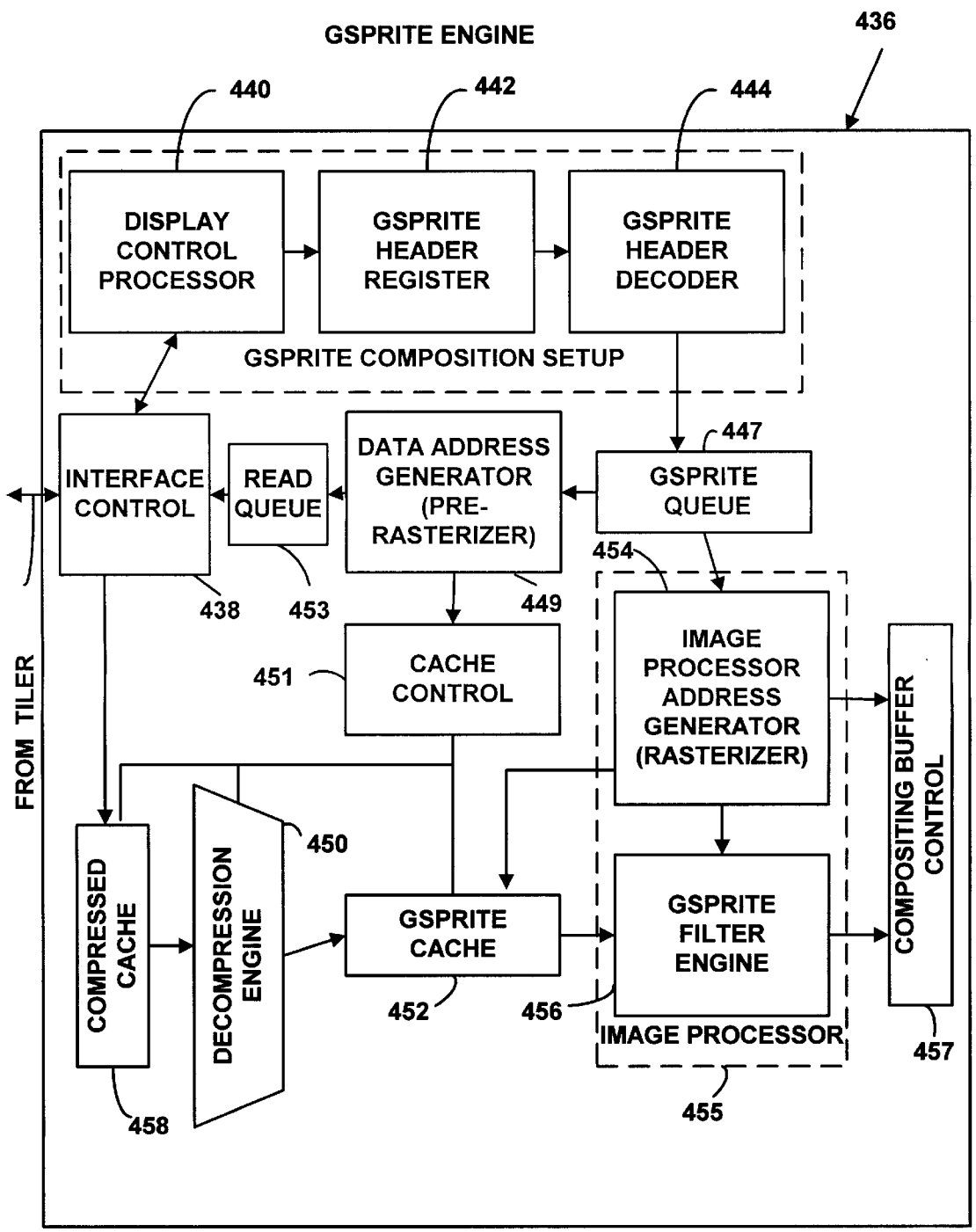

FIG. 12B is a block diagram of an alternative implementation of the gsprite engine 437. This particular implementation includes both a pre-rasterizer 449 and rasterizer 454 so that the gsprite engine can convert gsprite pixel data from gsprite space to screen space without incurring the latency in retrieving and decompressing blocks of gsprite pixel data. The dual rasterizer approach used in this implementation is described above in connection with FIGS. 11 and 9C.

The operation of the blocks in the gsprite engine 437 is generally the same as described above for FIG. 12A except that this implementation uses the dual rasterizer method for fetching blocks of texture data. In this implementation (FIG. 12B), the gsprite header decoder 444 reads the gsprite header register 442, clips the gsprite to the current display band, and places the gsprite in the gsprite queue 447 for rasterization. The data address generator or "pre-rasterizer" 449 scans each gsprite based on the specified affine transform in the gsprite header and generates read requests to the gsprite cache control 451. Using a method described above in connection with the texture cache control, the sprite cache control 451 ensures that the required gsprite data blocks are in the gsprite engine 437 and specifically in the gsprite cache 452 when the image processor block 455 needs them. It manages the flow of gsprite data blocks from the compressed cache 458, through the decompression engine 450, and into the gsprite cache 452. The read queue 453 buffers requests for gsprite data blocks to the shared memory system, and the interface control 438 reads the requests in the read queue 453, controls accesses to shared memory, and places blocks of gsprite data in the compressed cache 458.

The decompression subsystem in the gsprite engine includes the compressed cache 458 and decompression engine 450. The cache control 451 controls the flow of gsprite blocks through this decompression subsystem as described above in connection with the texture cache control.

The image processor address generator (rasterizer) 454 scans each gsprite based on the specified affine transform in the gsprite header and calculates the filter parameters for each pixel. It also generates gsprite cache addresses of gsprite data, which it sends to a cache address map in the gsprite cache for use by the gsprite filter engine 456. In one specific implementation of the cache, the cache address map selects which 14 pixel blocks are active and which two blocks are filled from the decompression engine.

The gsprite filter engine 456 maps color and alpha data at pixel locations in gsprite space to screen space. In this implementation, it applies either a 2 by 2 or 4 by 4 filter kernel to compute pixel values (color or both color and alpha) at pixel locations in screen space. The compositing buffer control 457 passes pixel values, in this case four pixels per clock cycle, to the compositing buffer. The compositing buffer control 457 monitors the ready line from the compositing buffer to ensure that the gsprite engine 437 does not overrun the compositing buffer. The rasterizer 454 controls the compositing buffer control 457.

Figure 13:
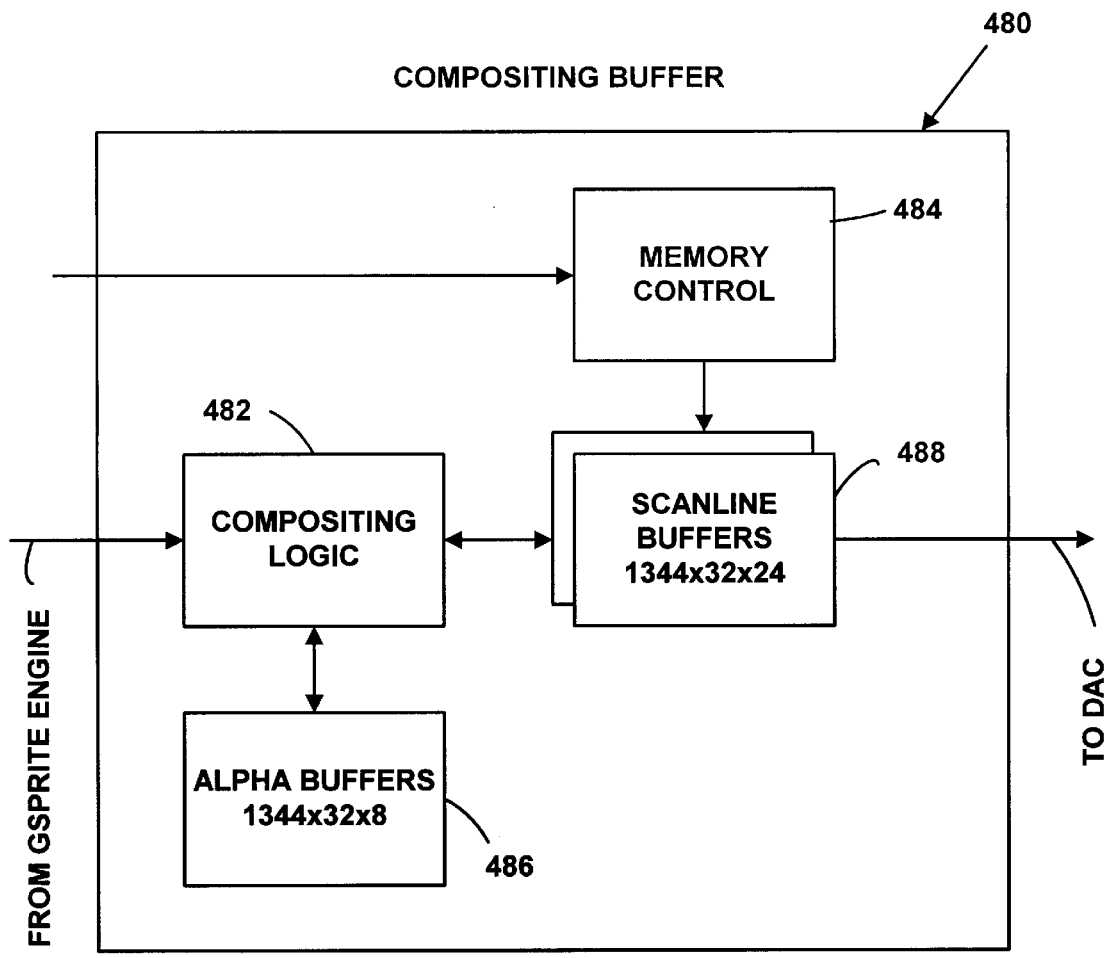
FIG. 13 is a block diagram of a compositing buffer in an embodiment.

FIG. 13 is a block diagram illustrating the compositing buffer 480 on the image processing board 174. The compositing buffer 480 is a specialized memory device that is used to composite gsprite data from the gsprite engine and generate digital video data to transfer to the DAC 212. The compositing buffer operates on 32 scanlines at a time—compositing gsprites for one 32 scanline band while the previous 32 scanlines are displayed.

The compositing logic 482 is responsible for calculating the pixel values as they are written into the scanline buffer. This is accomplished by performing a blending operation between the pixel value that is currently stored in the scanline buffer and the one that is being written to the compositing buffer. This operation is described in more detail below. In one implementation, the compositing logic performs four parallel pixel operations per clock cycle.

The memory control 484 is used to control the address and cycling of the memory banks. Address information is passed in a row column format as with normal DRAMs.

The alpha buffers 486 include an eight bit value for each of 1344×32 pixels. The memory is organized such that four contiguous pixels can be read and written each clock cycle. The alpha buffer also has a fast clear mechanism to quickly clear the buffer between 32-scanline band switching.

Two independent scanline buffers 488 are provided. The scanline buffers include three eight bit color values for each of 1344×32 pixels. The memory is organized such that four contiguous pixels can be read and written each clock cycle. One buffer is used to transfer the pixel data for a band to the DAC while the other is used to composite the pixels for the next band. Once the band has been completed, their functions swap.

A multiplexer is used to select data from one of the two scanline buffers 488 and sends the pixel display data to the DAC. The multiplexer switches between buffers every 32 scanlines.

The compositing buffer 480 interfaces to the gsprite engine 204, and transfers image data to the DAC 212.

Figure 14:
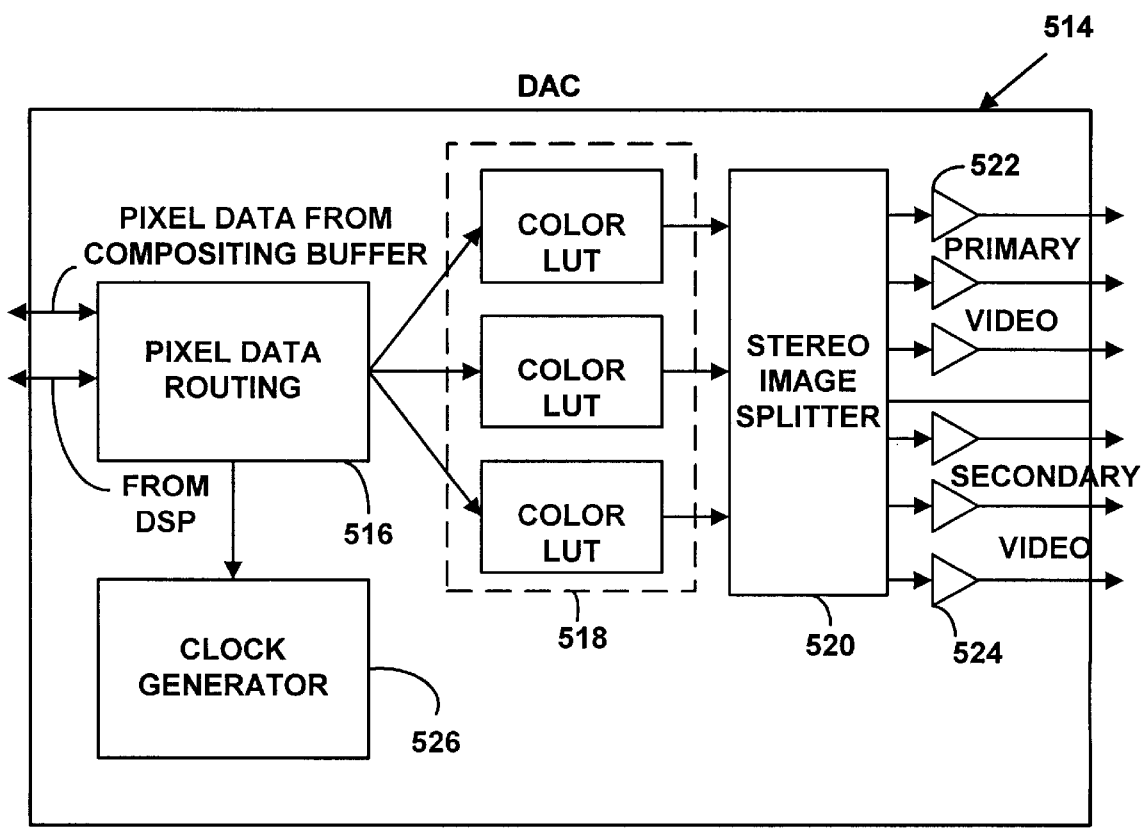
FIG. 14 is a block diagram of a Digital to Analog Converter (DAC) in an embodiment.

FIG. 14 is a block diagram illustrating the DAC 514 on the image processing board 174. The DAC 514 implements the basic functions that are common to most RAMDACs on the market today. The DAC includes logic for reading and writing internal control registers, and for pipelining the video control signals. Additional functional blocks are described below.

The pixel data routing block 516 is used to control the routing of pixel data from the compositing buffers. In the normal operating mode, this data is passed at pixel rates to the Color LUTs 518 for each of the three channels. This block also allows the data to be read back to the DSP for diagnostic purposes.

The stereo image splitter 520 supports two separate video signals for stereoscopic display using a head mounted display system. In this mode, the two video channels (522, 524) are interleaved from the compositing buffer, and must be split out by the DAC 514. The stereo image splitter 520 performs this function on the DAC 514. In the normal single channel mode, the LUT data is passed directly to the Primary DACs.

Alternatively, the DAC 514 can be designed to generate a single video output. With a single video output, the DAC can generate a stereoscopic display using a line interleaved format, where one scanline for one eye is followed by the scanline for the other eye. The resulting video stream has a format such as 640×960, for example, which represents two 640×480 images.

The clock generator 526 is used to generate the video and audio clocks. These clocks are generated by two phase locked clock generators to eliminate synchronization drift. The clock generator can also be slaved to a control signal from the Media Channel, allowing the image processing board to sync to an external sync source.

Tiling

As outlined above, the image processor (FIG. 1) performs scan-conversion, hidden surface removal, anti-aliasing, translucency computation, texturing, and shading. In this section we describe scan conversion, hidden surface removal, anti-aliasing and translucency computation in detail.

Figure 4B:
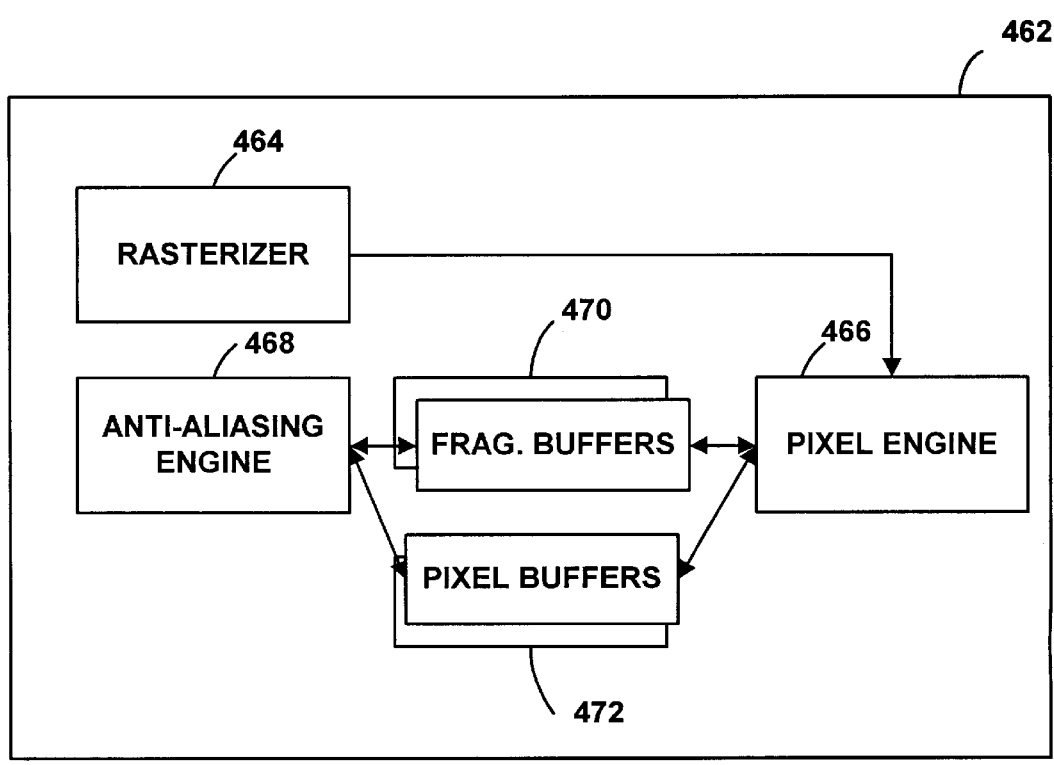
FIG. 4B is a block diagram illustrating portions of an image processor for rendering geometric primitives in an embodiment.

FIG. 4B is a block diagram illustrating portions of the image processor 462 for producing rendered image data from geometric primitives. The image processor includes a rasterizer 464, a pixel engine 466, an anti-aliasing engine 468, and a rasterization buffer, which includes pixel buffers 470, and a fragment buffer 472 in this embodiment. The "rasterizer" refers to the part of the image processor that determines pixel values from the geometric primitives, i.e. polygons. The rasterizer 464 reads primitive data and produces pixel data associated with a pixel location. This pixel data includes color, alpha, and depth (distance from the viewpoint). When a pixel is not entirely covered by a polygon, the rasterizer generates pixel fragment data.

As it scan converts a polygon, the rasterizer passes pixel data to the pixel engine for processing. The pixel engine 468 reads the pixel data from the rasterizer and determines which pixel data to store in the pixel and fragment buffers. The pixel buffers 472 are two-dimensional arrays, where the elements in the arrays correspond to pixel locations and include memory for storing color, alpha and depth data. The fragment buffer 470 stores fragment data to represent partial coverage of a pixel.

The pixel engine 466 performs hidden surface removal using depth values generated by the rasterizer and also maintains pixel fragments and translucent pixels for anti-aliasing and translucency processing. For a given pixel location, the pixel engine retains the nearest fully covered opaque pixel, if any. In this context, "fully covered" means that the pixel is entirely covered by a polygon that is being scan converted in the rasterizer. The pixel engine also retains pixels with translucency (alpha less than 1) and pixel fragments in front of the nearest opaque pixel. The pixel engine stores the nearest opaque pixel for a pixel location in the pixel buffer, and stores in the fragment buffer any fragments or translucent pixels at this pixel location that are in front of the nearest opaque pixel.

After the pixel engine generates pixel data, the anti-aliasing engine 468 resolves the pixel data in the pixel and fragment buffers. The design of the image processor illustrated in FIG. 4B supports double buffering of pixel data and single buffering of fragment data. The pixel engine generates pixel data in one of the pixel buffers, and adds fragment information into the fragment buffer while the anti-aliasing engine resolves the pixel data from the other pixel buffer and fragment data from the fragment buffer. As each fragment is resolved, the fragment entry is added to the fragment free list for use by new pixel data.

Having provided an overview of the process of generating and resolving pixel data, we now describe an embodiment in more detail. Below we describe an embodiment with reference to the tiler, shown generally in FIG. 4 and illustrated in more detail in FIGS. 9A–9C. We provide more detail regarding the tiler, including the components pertaining to scan conversion and anti-aliasing, as well as the components referring to textures. We will describe components used in multi-pass rendering, shading, and textures now, and will elaborate on these concepts later in our description.

The components of FIG. 4B can implemented on the tiler. The tiler reads primitive data and rendering instructions from the shared memory system 216 FIG. 4A), produces rendered image data, and stores compressed image data in shared memory. As described above, the basic 3-D graphics primitives in the system are triangles. Triangle rendering provides numerous simplifications in hardware used for graphics generation since the triangle is always planar and convex. However, alternatively n-sided polygons can also be used.

Above we explained the components of the tiler 200. Here we describe the data flow through the tiler in more detail.

Since the tiler receives inputs from the DSP, we begin with a recap of functions of the DSP 176 (FIG. 4). As described above, the DSP 176 can perform front end geometry and lighting calculations required for 3-D graphics. The DSP 176 calculates model and viewing transformations, clipping, lighting, etc. Rendering commands are stored in main memory buffers and DMAed (Direct Memory Accessed) to the image processing board over a PCI bus. The rendering commands are then buffered in the shared memory 216 (FIG. 4A) until needed by the DSP. The rendering commands are read by the tiler 200 (FIG. 4A) when it is ready to perform image processing operations.

Figure 15A:
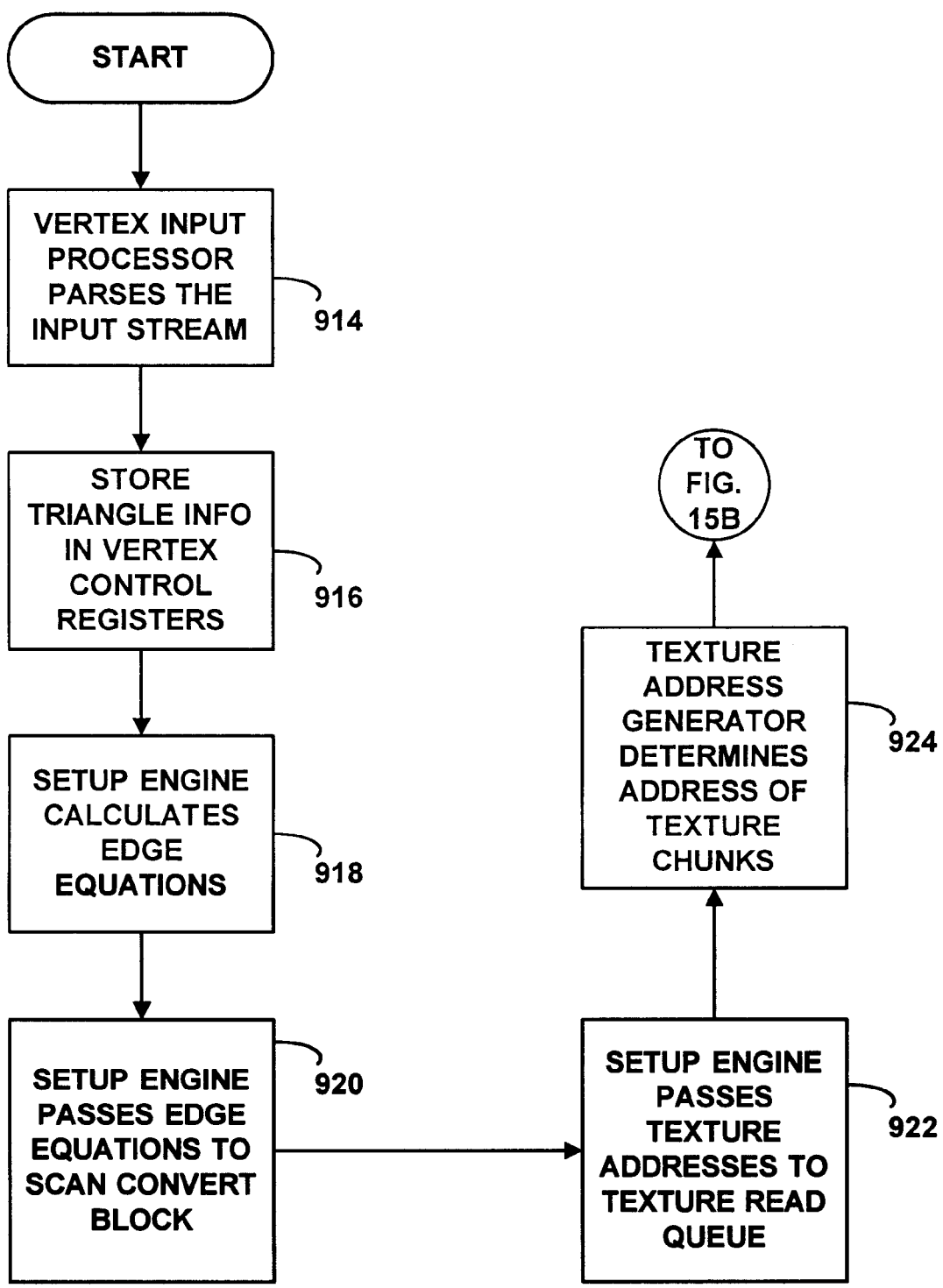
FIGS. 15A–F are a flow diagrams illustrating aspects of pixel and fragment generation in three alternative embodiments.
Figure 15B:
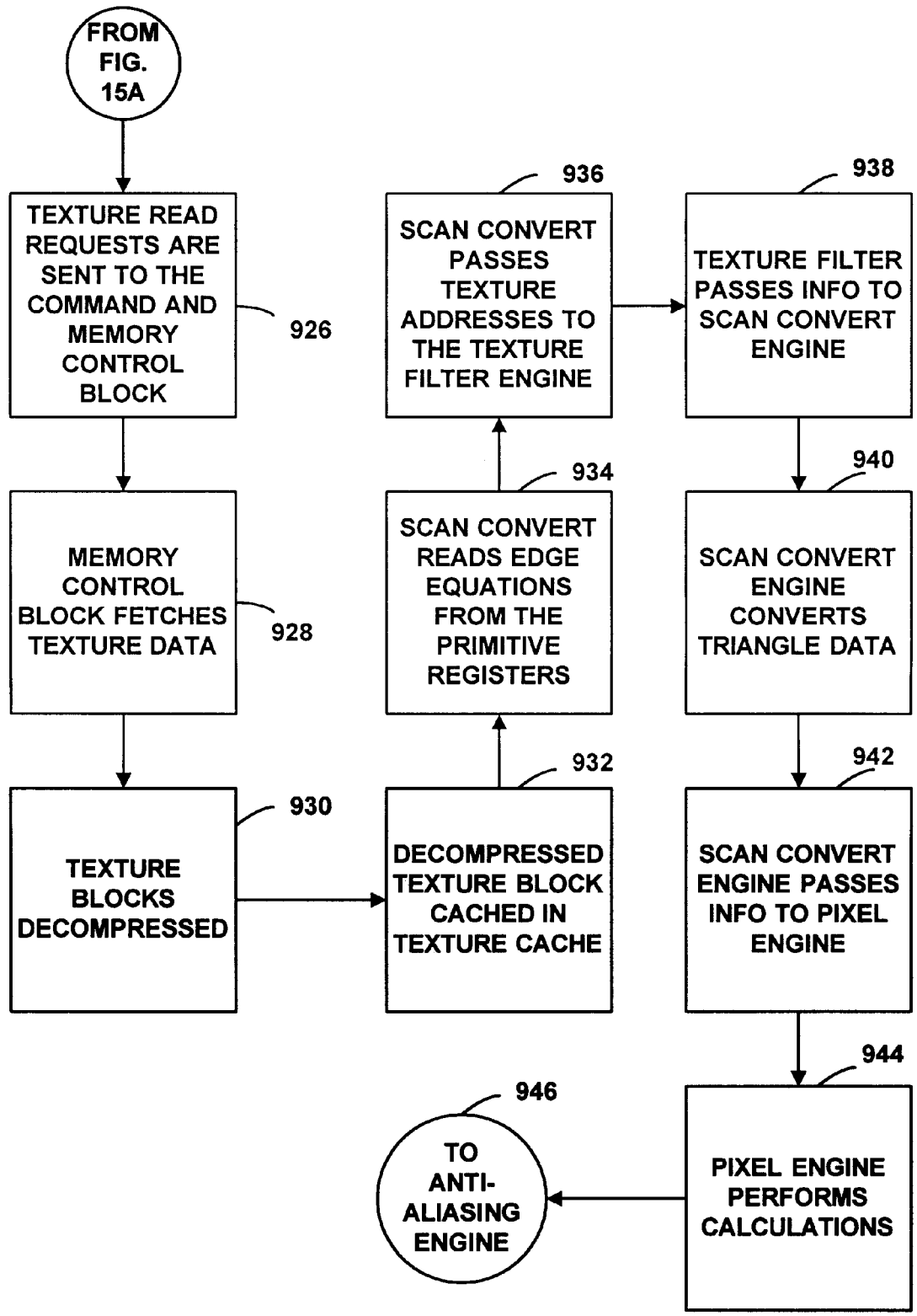

As is shown in the flowchart in FIGS. 15A and 15B, the setup block processes primitive rendering instructions read from the shared memory. The vertex input processor parses the input stream (914) (FIG. 15A), and stores the information necessary for primitive triangle processing in the vertex control registers (916).

The two vertex control registers store six vertices, three for each triangle in each register. The two vertex control registers allow for double buffering of triangle information to assure that the setup engine always has triangle information to process.

The setup engine then calculates the linear equations (918) which determine the edge, color, and texture coordinate interpolation across the surface of the triangle. These linear equations are used to determine which texture blocks will be required to render the triangle. The edge equations are also passed to the scan convert block (920) and are stored in the primitive registers within the scan convert block until required by the scan convert engine. The primitive registers are capable of storing multiple sets of edge equations.

The setup engine also passes texture addresses to the texture read queue (922), which buffers requests for texture chunks. The texture address generator then determines the address in memory of the requested texture chunks (924) and sends the texture read requests to the command and memory control block (926) (FIG. 15B), which will fetch the texture data (928) used by the scan convert block.

Texture data is stored in the shared memory (216) (FIG. 4A) in a compressed image format which may be the same format as the image data. The compression format is performed on individual 8×8 pixel blocks. The 8×8 blocks are grouped together in 32×32 blocks for memory management purposes to reduce memory management overhead.

As texture blocks are needed, they are fetched into the tiler, decompressed by the decompression engine (930), and cached in an on-chip texture cache (932). A total of 32 8×8 pixel blocks can be cached, although each block stores only one color component. The texture data is cached in an R G B and Alpha format.

The scan convert engine then reads the edge equations from the primitive registers (934) to scan convert the triangle edge information. The scan convert engine includes interpolators for walking the edges of the triangles, interpolating colors, depths, translucency, etc.

The scan convert engine passes texture addresses to the texture filter engine (936). The texture filter engine calculates texture data for the polygons that are being rendered. The texture filter engine computes a filter kernel based on the Z-slope and orientation of the triangle, and on the s and t coordinates. The texture cache attached to the texture filter engine store texture data for sixteen 8×8 pixel blocks. The texture cache is also in communication with the decompression engine which will decompress texture data (which is stored in a compressed format) for use by the texture filter engine.

When the texture filtering is completed, the texture filter engine passes the information back to the scan convert engine (938), so it can be used by the scan convert engine for further processing. Along with texture processing, the scan convert engine scan converts the triangle edge data (940) and the individual pixel addresses along with color and depth information are passed to the pixel engine for processing (942).

Figure 15C:
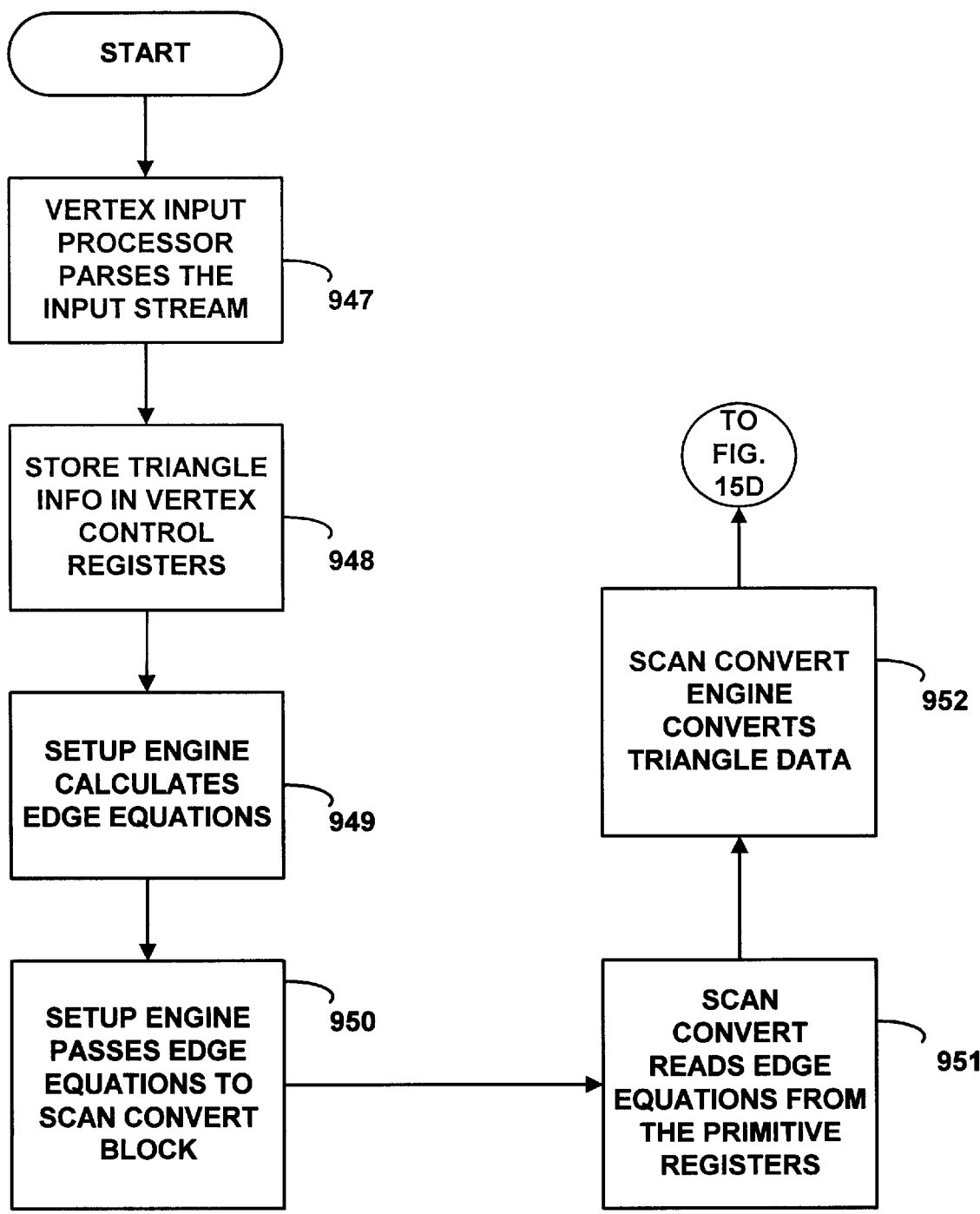
Figure 15D:
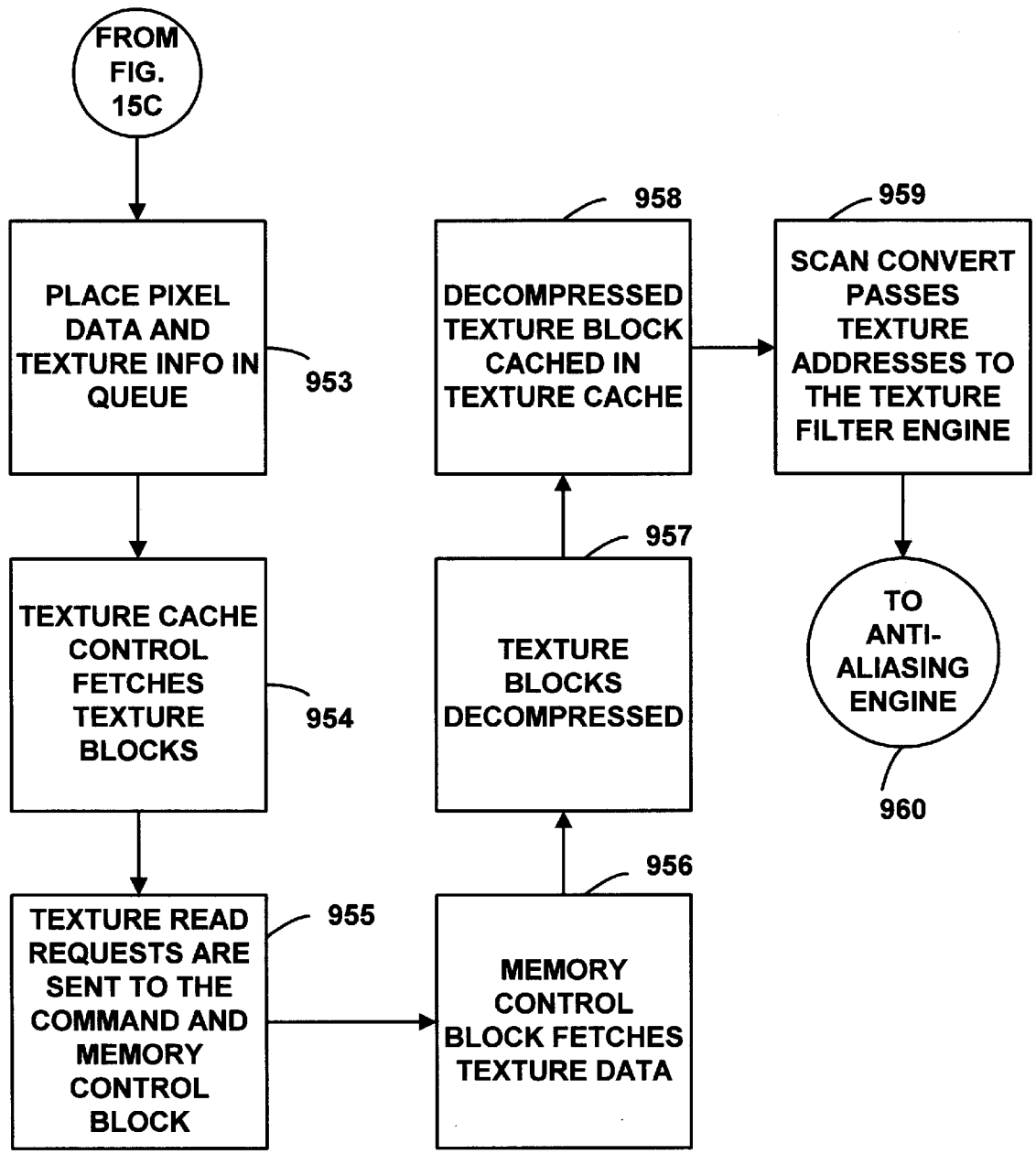
Figure 15E:
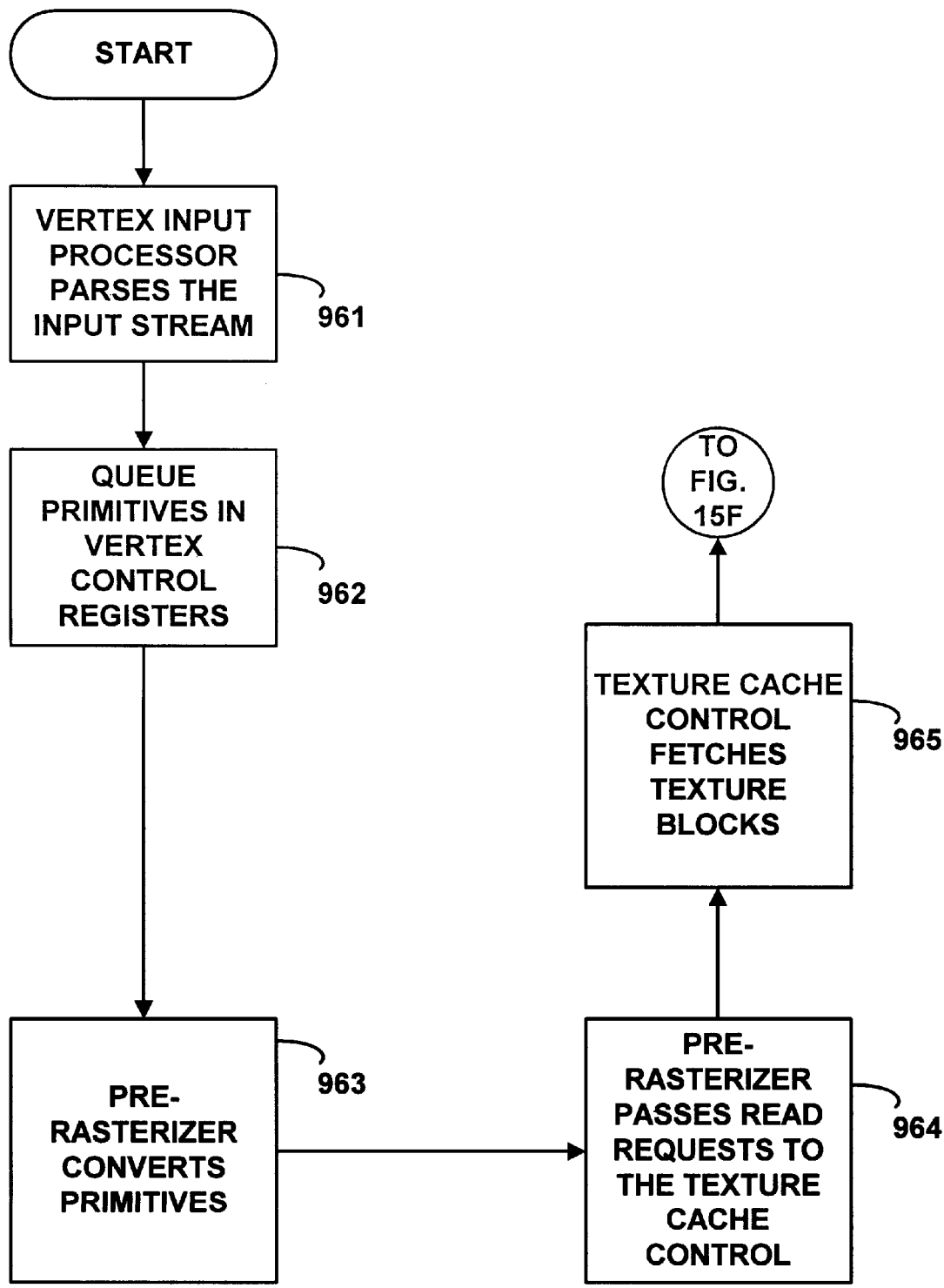
Figure 15F:
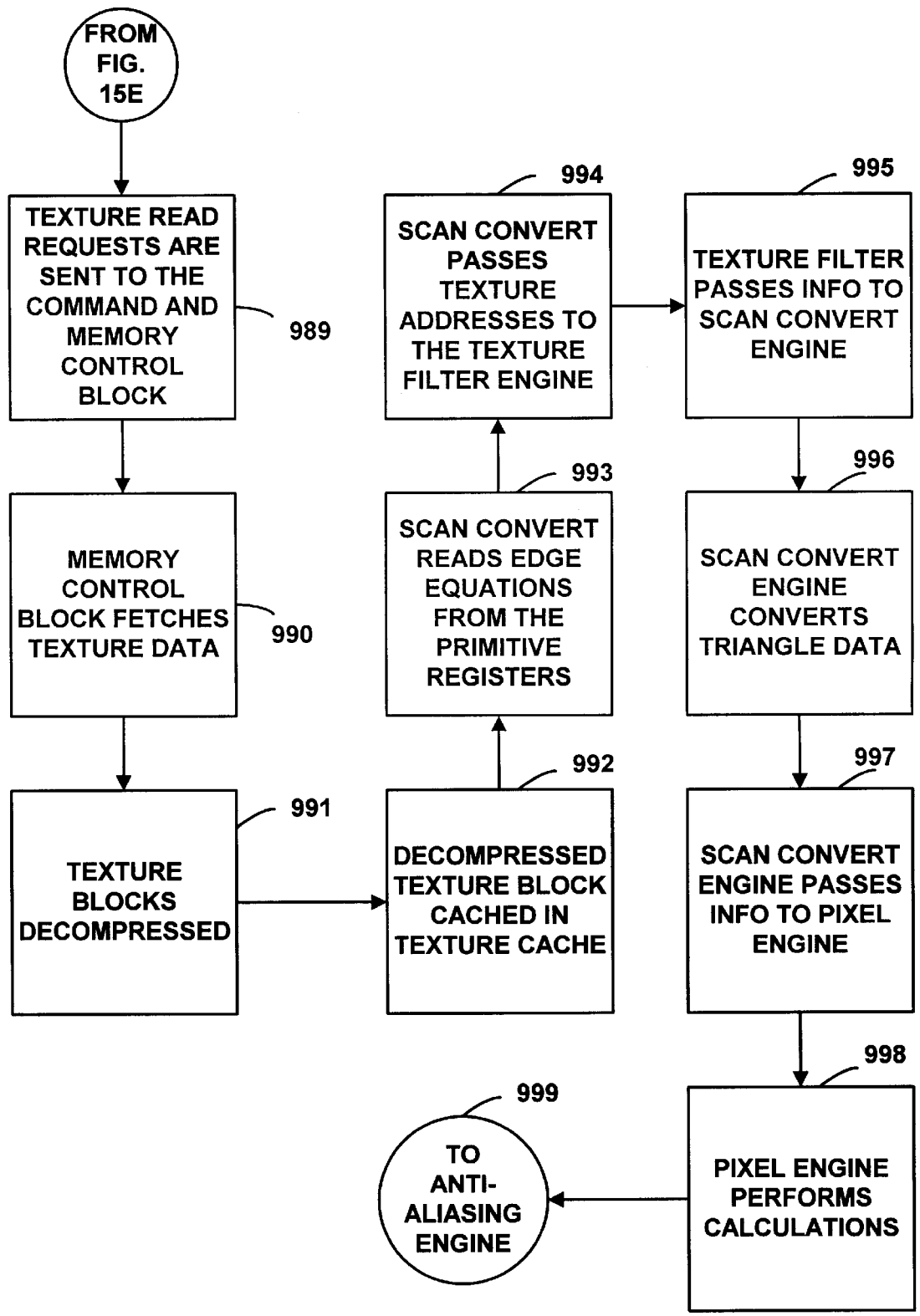

The method illustrated in FIGS. 15A and 15B varies for the alternative methods described in connection with FIGS. 10 and 11. FIGS. 15C and 15D illustrate a method for accessing image data corresponding to FIGS. 10 and 9B. Similarly, FIGS. 15E and 15F illustrate a method for accessing image data corresponding to FIGS. 11 and 9C.

Referring first to FIGS. 15C and 15D, this implementation of the method begins in the set-up block 381 in FIG. 9B. The vertex input processor 384 processes the input data stream (947). Next, the vertex control registers 386 buffer triangle data from the input data stream (948). The set-up engine 388 then calculates the edge equations (949) and passes them to the scan convert block 395 (950).

The scan convert block 395 reads edge equations stored in the primitive registers (951) and scan converts triangle data (952). The scan convert engine 398 then writes pixel data including the pixel address, color and alpha data, and coverage data to an entry in the texture reference data queue 399 (953) (FIG. 15D). In the case of texture mapping operations, this entry also includes texture reference data, namely, the coordinates of the texture centerpoint. The entry may also include texture filter data such as level detail or anisotropic filter control data.

From the texture reference data, the texture cache control 391 determines which texture blocks to fetch and causes the appropriate texture block or blocks to be fetched from memory (954).

The texture address cache control 391 sends texture read requests to the command and memory control block 380 (955). The texture read queue 393 buffers read requests for texture blocks to the shared memory system. The memory control 380 fetches the texture data from shared memory, and if it is compressed, places the compressed block or blocks in the compressed cache 416 (956). The decompression engine 404 decompresses compressed image data and places it in the texture cache 402 (957, 958). As described above in connection with FIG. 10, the replacement of blocks in the texture cache proceeds according to a cache replacement algorithm.

To carry out texture mapping or other pixel operations requiring image data in the texture cache, the texture filter engine 401 reads texture addresses from the texture reference data queue 399 (959). The texture filter engine 401 accesses the image data in the texture cache 402, computes the contribution from texture, and combines this contribution with the color and possibly alpha data from the texture reference data queue 399.

The texture filter engine 401 passes pixel data to the pixel engine 406, which then performs hidden surface removal and controls storage of the pixel data to a rasterization buffer.

FIGS. 15E and 15F illustrate a method for accessing image data blocks from memory corresponding to the approach in FIG. 11. In this alternative implementation, the method begins by queuing primitives in the set-up block 383. The vertex input processor 384 parses the input data stream and queues triangle data in the vertex control registers 387 (961, 962). When image data blocks need to be accessed from memory, as in the case of a texture mapping operation, the pre-rasterizer 389 scan converts primitives queued in the vertex control registers 386 to generate read requests for texture data blocks in shared memory (963).

As the pre-rasterizer scans a primitive queued in the set-up block, it passes texture read requests to the texture cache control 391 (964). The texture cache control 391 determines the appropriate texture blocks (965) and transfers read requests to the command and memory control block 380 (989) (FIG. 15F) via the texture read queue 393. The memory control block fetches the requested texture data, and if it is compressed, stores it in the compressed cache 416 (990). The decompression engine decompresses texture blocks in the compressed cache 416 and writes the decompressed image data to the texture cache 402 (991, 992). The texture cache control manages the flow of texture blocks from the compressed cache 416, through the decompression engine 404, and into the texture cache 402

The scan convert block 397 reads the geometric primitives queued in the set-up block. The scan convert block 397 performs pixel generation operations as soon as requested texture data is available in the texture cache 402. In the process of performing these pixel operations, the scan convert engine 398 reads edge equations from the primitive registers (993) and passes texture addresses to the texture filter engine 403 (994). The texture filter engine accesses the appropriate image data stored in the texture cache 402 and then returns filtered data to the scan convert block 397 (995). The scan convert block 397 converts the triangle data and computes output pixel data from converted triangle data and the filtered data (996). It then passes this output pixel data to the pixel engine 406.

The pixel engine 406 performs pixel level calculations including hidden surface removal and blending operations. To perform hidden surface removal, the pixel engine 406 compares depth values for incoming pixels (fully covered pixels or pixel fragments) with pixels at corresponding locations in the pixel or fragment buffers. For shadowing operations, the pixel engine provides a Z-value to the texture filter engine 400 where it is compared with Z-values in a shadow Z map (stored in the texture cache). After performing the pixel level calculations, the pixel engine stores the appropriate data in the pixel or fragment buffers.

The tiler implements a high quality anti-aliasing algorithm for dealing with non-opaque pixels. The pixel buffer stores the pixel data for the front-most nontransparent pixel for pixel locations in a chunk. The fragment buffer stores pixel fragments for translucent pixels and for partially covered pixels closer to the viewpoint than the pixels in the pixel buffer for corresponding pixel locations. More than one fragment for a pixel location can be stored using a fragment list structure. In a process referred to as resolving, the anti-aliasing engine processes the fragment lists to compute color and alpha values for pixel locations.

To reduce the number of fragments that are generated, the pixel engine implements a method for merging pixel fragments which compares the fragment that is being generated with fragment(s) currently stored in the fragment buffer. If the new and previous fragment's attributes (color and depth) are similar to within a preset tolerance, the fragments are combined on the fly and no additional fragment is generated.

If a combined fragment is found to be fully covered (with a full coverage mask and opaque alpha), then the fragment is written into the color buffer and that fragment location is freed up to use for subsequent polygons within the current chunk.

Once all the polygons for the chunk are rendered, the pixel buffers are swapped. While the anti-aliasing engine resolves the pixel data in the fragment buffer and one of the pixel buffers, the pixel engine writes pixel data for the next chunk in the other pixel buffer and the remaining free locations in the fragment buffer. In general, pixel resolution comprises computing a single color (and possibly alpha) value for a pixel location based on the pixel data in the pixel and fragment buffers corresponding to the location. We provide additional detail addressing these issues below.

In the implementations of the tiler shown in FIGS. 9A–9C the pixel engine and anti-aliasing engine have access to a single fragment buffer and a pair of pixel buffers. The two 32×32 pixel buffers are provided for double buffering between the pixel engine and the anti-aliasing engine. The pixel buffer entry includes the following data:

| R | G | B | α | Z | P |
|---|---|---|---|---|---| where R, G, B are the red, green, and blue color components respectively, α is the alpha component which represents the translucency of the pixel, and Z is the Z component which represents the depth of the pixel from the eye point. The x,y address is fixed and implicit in the pixel buffer addressing. Eight bits are used per color component (i.e. Red, Green, and Blue), eight bits are used for the a component, and twenty-six bits are used to store the Z-value, stencil value, and a priority value. Out of this 26 bits, up to 24 can be used as Z values, up to 3 can be used as stencil planes and up to three can be used as priority values. As described above with reference to FIG. 9, the buffer also includes a 9 bit fragment buffer pointer.

The priority value is fixed per primitive and is used to help resolve objects which are coplanar, such as roads on top of terrain, by using priority relationships which are used by the tiling engine to margin the incoming pixel Z-value, as compared to the stored Z-value, during the Z compare operation.

The fragment buffer is used to store information about pixel fragments for polygons whose edges cross a given pixel or for polygons with translucency. Each entry in the fragment buffer provides color, α, Z and coverage data associated with the surface.

Multiple fragment buffer entries can be associated with a single pixel (via a linked list mechanism) for cases in which multiple polygons have partial coverage for the same pixel location. The fragment buffer is dual ported so that it can be operated on by the anti-aliasing engine and the pixel engine in parallel. In one possible implementation the fragment buffer is a one-dimensional array of fragment records and includes a total of 512 fragment record entries. The memory management of the fragment buffer is performed using a linked list structure. Each fragment buffer entry includes the following data:

| R | G | B | α | Z | M | P | S |
|---|---|---|---|---|---|---|---| where R, G, B are the red, green, and blue color components respectively, ax is the alpha value which represents the translucency of the pixel, and Z is the Z-value which represents the depth of the pixel from the eye point, M is a 4×4 pixel coverage bitmask for each pixel which is partially covered, P is a pointer to the next fragment buffer entry, and S is used to represent a fragment stencil. Eight bits are used per color component (i.e. Red, Green, and Blue), eight bits are used for the α component, twenty-six bits are used to store the Z-value plus stencil and priority, and nine bits are used for the fragment pointer P.

The pixel coverage mask is computed by determining a coverage mask value for each edge and bitwise ANDing them together. The computation of the coverage mask is a two step process. The first step is to determine how many of the subpixel bits in the coverage mask are to be turned on, and the second step is to determine which specific bits are to be enabled.

The first step uses the area of the pixel which is covered by the edge to determine how many of the coverage mask bits are to be switched on. This area is computed by a table lookup indexed by the edge slope and distance from the pixel center. The second step uses the edge slope to determine the order in which the sample bits are to be switched on. The set of bit orders is stored in a pre-computed table called the 'Coverage Order' table. Each coverage order table entry consists of a specific ordering of the sample bits which is correct for a range of slope values. The edge slope is tested against the set of slope ranges, and the index associated with the range containing this slope value is used as the index into the coverage order table.

A method for computing the coverage mask is described in Schilling, A. "A New Simple and Efficient Anti-Aliasing with Subpixel Masks", Computer Graphics, Vol.25, No. 4, July 1991, pp. 133–141.

After the image processor generates fragment data for a pixel location, it then sorts and resolves this fragment data to compute color at that location. As described above, the image processor generates and maintain fragments for partially covered pixels. A pixel is partially covered by a polygon if one or more of the polygon's edges cross the pixel, or if the polygon has translucency. Maintaining fragment data to perform both anti-aliasing and translucency computations can require a significant amount of memory. As the number of rendered polygons increases, the amount of memory to store pixel data and fragments also increases.

In addition to the increased memory requirements, the amount of processing required to resolve fragments can be significant as well. In a Z-buffer approach, fragment data is depth sorted. In general, the primitive data is not sorted in depth order as it arrives for rendering. Since primitive data arrives in arbitrary depth order, the image processor has to sort the fragment data after generating it. The sorted data is then processed to determine the color and possibly the alpha at a pixel location. At each pixel location, several fragments can contribute to the color. If alpha is also computed the number of fragments and the complexity of processing increases as well.

For the reasons highlighted above, the memory and processing requirements to support advanced anti-aliasing and translucency can be substantial. There is a conflict between supporting sophisticated anti-aliasing and translucency computations on one hand, and reducing memory requirements on the other. To reduce the cost of the system, the use of memory should be minimized, yet advanced anti-aliasing and translucency features usually require more memory. It is even more difficult to support these advanced features in a real time system while still minimizing memory requirements.

In one embodiment, our system renders primitives one chunk at a time, which reduces memory and allows for fragment resolution in a post processing step. While pixel data is generated for one chunk, pixel data of another chunk can be resolved. A number of benefits impacting fragment sorting and pixel resolution follow from the chunking concept. Memory requirements are significantly reduced because much of the data generated during the rasterizing process does not have to be retained after the image processor has resolved the pixels in a chunk. The image processor only needs to retain the resolved color portion after resolving a chunk.

Another advantage to rendering chunks is that the pixel and fragment memory can be implemented to reduce the overhead of memory accesses. Typical graphics systems use external memories to implement color, depth and fragment buffers. It is very difficult to organize this external memory to satisfy the rigorous bandwidth requirements of real time image processing. The pixel and fragment memory needed to support rendering of a chunk, such as a 32×32 pixel region, does not have to be located in external memory. Instead, it can be implemented on the same hardware that performs rasterizing and anti-aliasing functions. For example, in the implementation described above, the fragment and pixel buffers can be implemented on a single chip.

The use of on-chip memories simplifies the bandwidth problems associated with external memory. On-chip memories enable efficient use of multiple memory banks. For example, one bank can be used for the pixel buffer, and another bank can be used for fragment records.

Another advantage of on-chip memory is that it is less expensive and easier to implement multi-port memories. The performance of the pixel and fragment buffers can be enhanced through the use of multi-port memories, which allow simultaneous reads and/or writes to achieve one clock per pixel processing rate. Since the fragment buffer is much smaller when chunks are rendered separately, it can be implemented on chip. Both the smaller size of the memory and its presence on-chip make it feasible and cost effective to use multi-port memory. External multi-port memories on the other hand, are expensive due to the higher per bit cost and connections between chips.

Another important advantage related to chunking is that pixels for one portion of a frame can be generated while pixels for another portion are resolved. Thus, instead of generating pixels for an entire frame and then resolving those pixels, our approach can overlap the processes of generating and resolving pixels, reducing system transport delay.

In one embodiment of our system, the image processor resolves fragments in a post processing step. While the pixel engine generates pixel data for part of an image, the anti-aliasing engine resolves fragments for another part of an image. As noted above, the pixel data is double buffered: the pixel engine can access one buffer while the anti-aliasing engine accesses the other. After the pixel engine has generated pixels for a chunk, the tiler performs a buffer swap. The pixel engine then generates pixels for the next chunk, and the anti-aliasing engine resolves the pixels for the previous chunk.

Although it could also be double buffered, in the preferred embodiment, the fragment buffer is dual ported so that the pixel engine and anti-aliasing engine can access it simultaneously. The pixel engine can then write fragment data to the fragment buffer through one port while the anti-aliasing engine accesses fragment data through another port.

In this embodiment, the double buffered and dual-ported memory systems enable the image processor to overlap pixel data generation and pixel resolution. There are a number of alternative ways to implement a double buffering scheme as well.

The image processor sorts the fragment data in depth order before completing the resolve process. In general, the image processor can sort pixel data as it generates pixels, and after it has generated pixels for a portion of an image to be rendered. For instance, the pixel engine can perform an insertion sort as it writes fragment data to the fragment buffer. In addition, the pixel engine can sort fragment data after it has completed generating pixel data for all or part of an image. The pixel engine can also sort fragments in cases where it rejects incoming pixel data. Since the pixel engine does not have to write to the fragment buffer when the incoming pixel data is rejected, it can then perform a sort of fragments before the next incoming pixel arrives. We refer to this latter approach as "background sorting" of fragments.

An insertion sort refers to depth sorting an incoming fragment with other fragments in the fragment buffer. In a real time system, an insertion sort may not be preferred because it can potentially slow down the process of generating pixel data. Searching the fragment buffer to find the proper insertion point for an incoming fragment can cause undesirable overhead. Additionally, in hardware implementations, it requires additional hardware and complicates the design of the pixel engine.

As an alternative to an insertion sort, fragments can be sorted after the image processor has completed pixel generation for a portion of an image. Some systems render an entire frame of image data at once. In such systems, sorting fragments for every pixel location in the view space can require substantial processing time and add undesirable delay, especially for a real time system. The amount of time required to perform the sorting can vary depending on the number of fragments per pixel, and depending on the degree to which insertion sorting is already performed. The sorting operation, therefore, can hold up other pixel operations from occurring, thereby decreasing performance.

By rendering a portion of the view space at a time, the fragment sorting for one part of an image can occur while a next portion is being rasterized. In essence, the anti-aliasing engine can perform fragment sorting in a post-processing step. In one embodiment, the anti-aliasing engine sorts fragments for one chunk as fragments for the next chunk are being generated.

Even in cases where pixel generation and resolution are overlapped in this manner, it still may be advantageous to perform some sorting of fragments for part of an image as the pixel engine generates pixels for that part of the image. Background sorting of pixel fragments reduces the overhead of sorting fragments after the pixel engine completes generating pixels for a set of primitives.

In one embodiment, background sorting is performed concurrently with pixel operations being performed on the pixels to reduce, and in some cases eliminate the latency required for sorting of fragments. The design takes advantage of the fact that many of the pixels are not partially covered, and therefore do not make use of the fragment buffer. The background sorting uses this spare bandwidth to perform a sort of a set of fragments in the fragment buffer.

Figure 16:
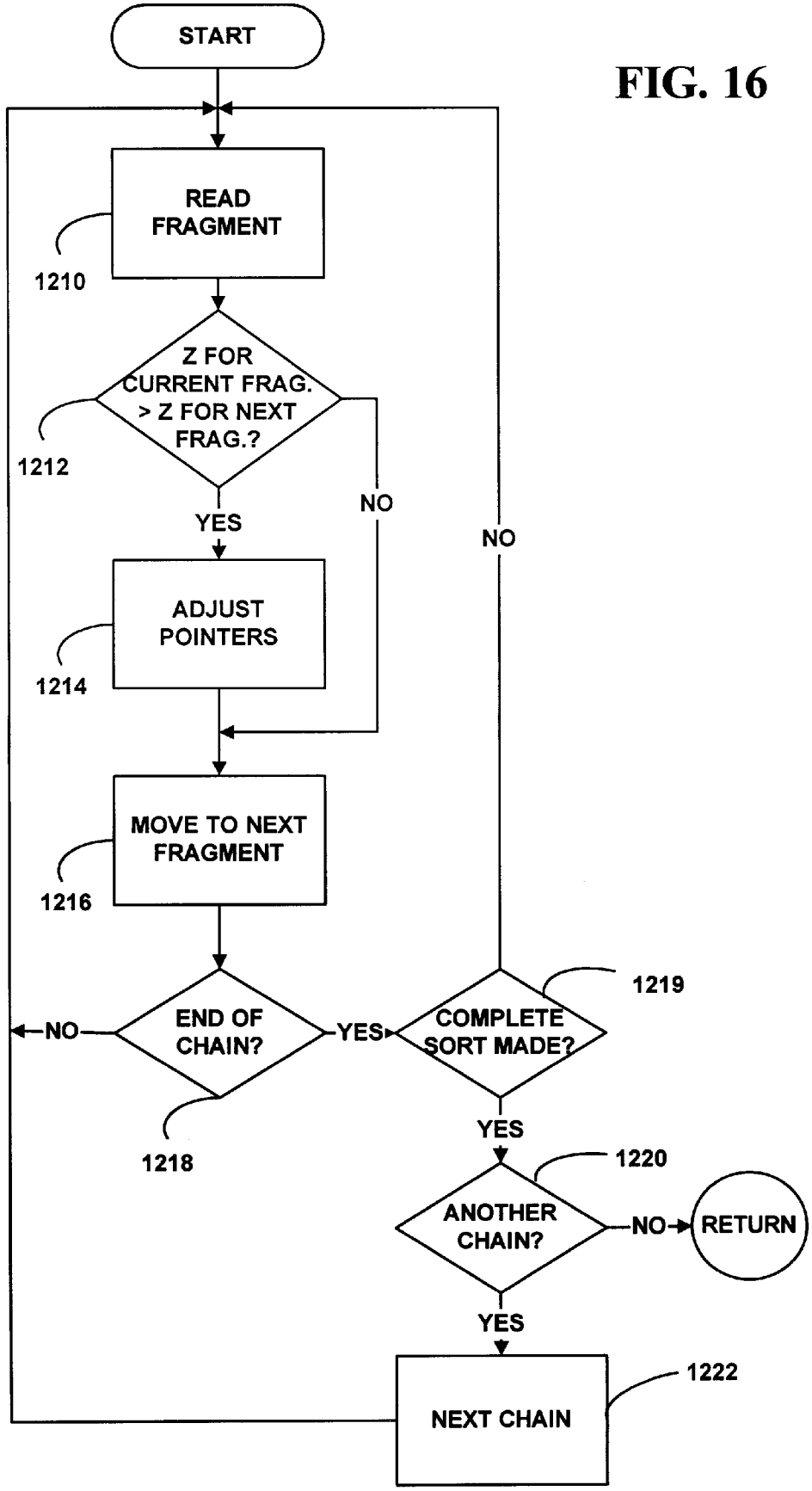
FIG. 16 is a flow diagram illustrating background sorting of fragments in an embodiment.

One way to implement background sorting is to perform a bubble sort. The pixel engine performs a bubble sort of the fragments, by walking each chain of fragments (1210) and comparing the Z-values between two adjacent fragments. FIG. 16 is a flow diagram illustrating this approach.

If the current fragment has a larger Z (is further away) than the next fragment it points to in the fragment chain (1212), the two are swapped in order by readjusting their pointers (1214) accordingly. If the Z-values are already in sorted order, the sort logic continues marching down the chain comparing the previous next fragment with the new next fragment (1216). The sort logic continues walking the chain (1218) until it reaches the end of the current chain. If the sort logic has completely sorted the chain (1219), then the logic moves to the next chain. If not, the logic makes another pass through the chain. The sort logic continues passing through the chain until all of the fragments are in order for the current chain. The sort logic then moves to a next chain, if another exists and needs sorting (1220, 1222).

If a new fragment should come in that has the same address as one of the ones currently being sorted, the pipeline is stalled until the two fragments have been written. This is a rare case, and therefore is unlikely to hinder performance in a system employing background sorting.

An optimization can be employed whereby an extra n×1 bit RAM is used, where n is the total number of fragments allowed per chunked region. Whenever a new fragment is added to a fragment chain, the extra bit is set for the index to the first (foremost) fragment in the chain. This bit indicates a potentially unsorted fragment. When the fragment sort hardware gets ready to move to a new fragment chain, it clears the bit for that chain and proceeds to sort it. If in the meantime, a new fragment comes in that chain, then there is a chance that the fragment is unsorted again. Since the new fragment resets the new fragment bit, it means the sort operation will have to be performed again on the fragment chain. However, using this bit to tag the fragment chain that has received a new fragment eliminates the problem inherent in sorting a buffer that is being changed without the knowledge of the sort logic. The extra bit also prevents the background sort from spending time attempting to sort buffers that have already been sorted, are not the first in a chain, or which have not been allocated yet.

If there are less total fragments available than pixels, it maybe less costly in gates to use an individual RAM since there are fewer bits, and the sort is done based on the total number of fragments, not the total number of pixels.

A hardware implementation of the sort logic includes comparators for comparing Z information, data routing multiplexers for routing the pointers (used for swapping pointers in the sort process), a 1 bit×n RAM, and the logic for setting/clearing the bit in the RAM based on the offset. It also includes a state machine that controls the compare, routing, and fragment visited, as well as the sort process. This state machine is responsible for shutting down the incoming pipeline if the new fragment needs the same fragment as is currently being sorted. The fragment buffer and fragment index RAM should be multi-ported so the sort logic can read or write independent of pixel generation operations performed in the pixel engine. Alternatively, the fragment buffer is double buffered.

This implementation can be extended to alternative approaches using fewer ports on the RAM. This approach may require greater control for identifying when an incoming pixel is not a fragment so the same ports can be shared between incoming pixels and the sort logic.

After sorting, the image processor resolves the fragments for a pixel location to determine the color for that pixel location. If alpha is not considered, the image processor computes color accumulation based on the color and coverage data for fragments in a depth sorted list for a pixel location. If alpha is considered in addition to coverage data, the image processor computes color accumulation based on color, coverage, and alpha of the fragments in a depth sorted list for a pixel location.

In general, the image processor can resolve fragments for pixel locations corresponding to the entire view space or for only part of the view space at a time. In the embodiment described above, the image processor resolves pixel locations in a portion of the view space called a chunk. Fragment resolution occurs after fragments have been generated and sorted.

Fragment resolution is the process during which all of the fragments for a pixel are combined to compute a single color and alpha value. This single color and alpha are written into the color buffer (and then compressed and stored to a gsprite).

Computing the resolved color includes accumulating a correctly scaled color contribution from each layer while computing and maintaining coverage information with which to scale subsequent layers. This accumulation can be performed in front-to-back, or in back-to-front depth order. In a front-to-back approach, as opposed to back-to-front, spatial coverage data can be used to determine coverage for succeeding layers. Unlike coverage, alpha data applies equally to the entire pixel area.

For front to back, the equations for computing color and alpha for sorted fragment records are:

Alpha initialized to maximum value (inverse alpha). Color initialized to 0.

Anew=Aold−(Aold*Ain);

Cnew=Cold+(Cin*(Aold*Ain));

For back to front, the equations for computing color and alpha for sorted fragment records are:

Alpha and Color initialized to 0.

Anew=Ain+((1−Ain)*Aold);

Cnew=(Cin*Ain)+((1−Ain)*Cold);

For a hardware implementation, front to back is preferable because the resolve process is less hardware intensive.

A pseudocode example of accumulating fragments with depth, color, and coverage only (no alpha), is set-forth below:

```
NUM_CVG_BITS is the number of bits in the coverage mask
MAX_ALPHA is the maximum alpha value
for (each fragmented pixel location) {
    ColorAccum = 0;
    CoverageAccum = 0;
    while (fragment list is not empty) {
        scan fragment list and extract closest fragment (coverage, color);
        ColorScale = CountSetBits(coverage & ~(CoverageAccum))/NUM_CVG_BITS;
        ColorAccum += ColorScale * color;
        CoverageAccum |= coverage
    }
    ColorAccum is pixel color
}
```

Accumulating fragments with depth, color, coverage, and alpha requires that an alpha value be computed and maintained for each subsample. This is due to the combination of coverage masks and alpha values for each fragment. It is generally the case that the accumulated alpha at any layer during accumulation is a function of all of the alpha values of previous layers. With coverage masks, each subsample can potentially have a different set of 'previous' alpha values, since a layer for which the coverage bit is clear does not contribute to that subsample.

One approach to resolving fragments with both alpha and coverage is to compute color for each subpixel in a layer separately, and then add the contribution from each subpixel location to determine the total color contribution. The alpha scale for each subpixel is determined from the alpha at that layer in addition to the alpha accumulated from other layers. This alpha scale is then multiplied by the color for the subpixel to determine the color contribution of the subpixel. The color for a layer is then determined by summing the color contributions from the subpixels.

One example of accumulating color and alpha for subpixels separately is:

```
for (each fragmented pixel location) {
    ColorAccum = 0;
    AlphaAccum[NUM_CVG_BITS] = { MAX_ALPHA, MAX_ALPHA, ...,
MAX_ALPHA};
    while (fragment list is not empty) {
        scan fragment list and extract closest fragment (coverage, color, alpha);
        for (i=0; i<NUM_CVG_BITS; i++) {
            //  if this bit is set in coverage mask
            if(coverage >> I) & 0x1 {
                //  compute alpha scale value - contribution for this color.
                AlphaScale = (alpha * AlphaAccum[i]);
                //  add color scaled by alpha
                ColorAccum += (color*AlphaScale)*(1/NUM_CVG_BITS));
                //  compute accumulated alpha for the subsample
                //  AlphaAccum = AlphaAccum*(MAX_ALPHA-alpha) =
                //  AlphaAccum - AlphaAccum*alpha
                AlphaAccum[i] −= AlphaScale;
            }
        }
    }
    ColorAccum is pixel color
}
```

An example using 4 sub-pixel locations will help illustrate fragment resolution. In this example, we consider three fragments, each having a coverage mask, alpha and color value. The initial state is illustrated in table below. In this example, we accumulate color and alpha using a front to back approach. The initial alpha is set to 1 meaning full transparency. The data for each layer is as follows: fragment 0, alpha=0.5, coverage mask (cm)=0011, and color=$C_0$; fragment 1, alpha=0.3, cm=000, color=$C_1$; fragment 2, alpha=0.8, cm=0101, color=$C_2$. The data for each fragment is provided in tables below.

With the alpha values initialized to one, the alpha coverage array is shown below.

| | |
|---|---|
| 1 | 1 |
| 1 | 1 |

To compute color, the color values for each subpixel location are multiplied by the new alpha and the alpha from the coverage array. The result for the subpixel locations is then divided by four (one divided by the number of subpixel locations). Finally, the contribution from all of the subpixel locations is summed to find the accumulated color.

| coverage mask | color | alpha for new frag. | alpha from coverage array alpha | subpixel contribution |
|---|---|---|---|---|
| 1 | $C_0$ | 0.5 | 1 | ¼ |
| 1 | $C_0$ | 0.5 | 1 | ¼ |
| 0 | $C_0$ | 0.5 | 1 | ¼ |
| 0 | $C_0$ | 0.5 | 1 | ¼ |

Using the formula, Alpha'=Alpha*(Max_alpha−new_alpha), the image processor computes the new alpha separately for each pixel location and stores it in the alpha coverage array in the table below.

| | |
|---|---|
| 0.5 | 0.5 |
| 1 | 1 |

The contribution of fragment 1 is set forth in the table below.

| coverage mask | color | alpha for new frag. | alpha from coverage array alpha | subpixel contribution |
|---|---|---|---|---|
| 0 | $C_1$ | 0.3 | 0.5 | ¼ |
| 0 | $C_1$ | 0.3 | 0.5 | ¼ |
| 0 | $C_1$ | 0.3 | 1 | ¼ |
| 1 | $C_1$ | 0.3 | 1 | ¼ |

The new alpha coverage array is as follows:

| | |
|---|---|
| 0.5 | 0.5 |
| 0.7 | 1 |

The contribution of fragment 2 is set forth in the table below.

| coverage mask | color | alpha for new frag. | alpha from coverage array alpha | subpixel contribution |
|---|---|---|---|---|
| 1 | $C_2$ | 0.8 | 0.5 | ¼ |
| 0 | $C_2$ | 0.8 | 0.5 | ¼ |
| 1 | $C_2$ | 0.8 | 1 | ¼ |
| 0 | $C_2$ | 0.8 | 0.7 | ¼ |

The alpha coverage array for the fragments after fragment 2 is as follows:

| | |
|---|---|
| 0.5 | 0.1 |
| 0.7 | 0.2 |

This method requires 2*NUM_CVG_BITS multiplies (2*16=48 in the 4×4 case) per fragment for the computation of alpha and the color contribution. Note that the (1/NUM_CVG_BITS) scaling can be done with a shift if the number of bits in the coverage mask is a $2^{**}n$ size (which is typically the case).

Figure 17:
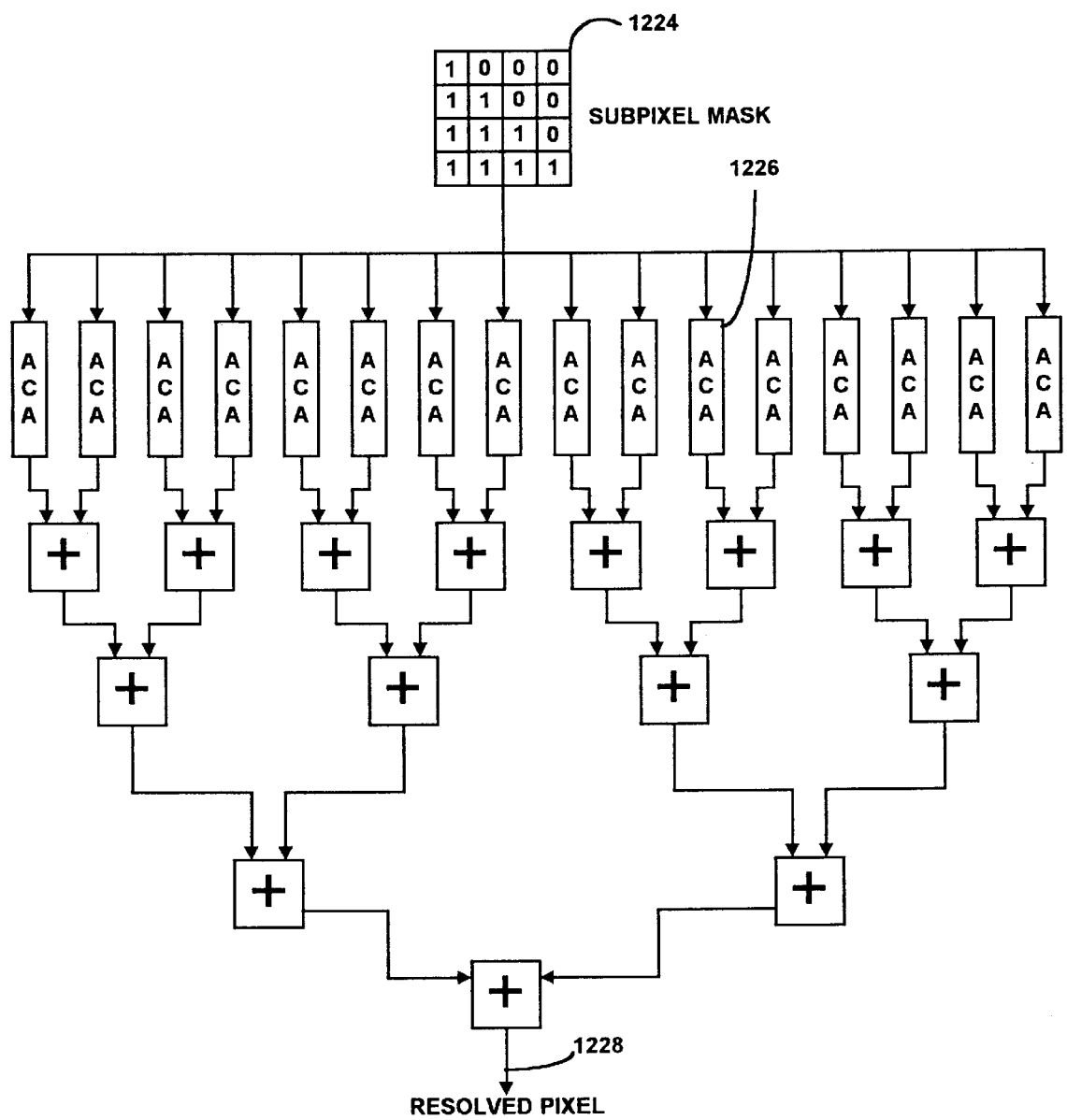
FIG. 17 is a block diagram illustrating a pixel resolution system in an embodiment.
Figure 18:
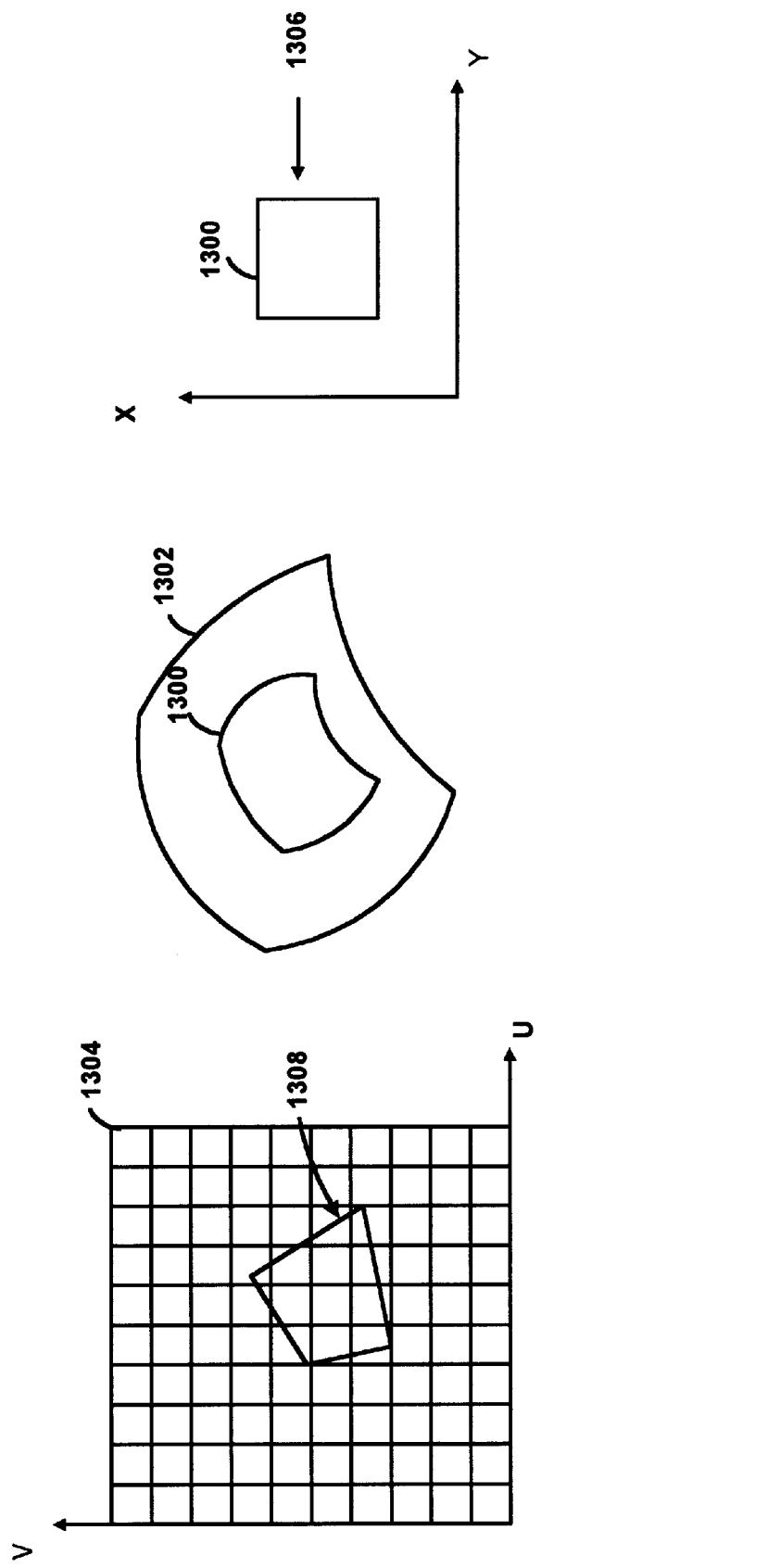
FIG. 18 is a diagram illustrating texture mapping.

FIG. 17 is a schematic diagram illustrating a hardware implementation of the approach described above for a pixel divided in 4×4 subpixel regions (1224). The resolve hardware includes a set of 16 identical processing and storage units called alpha and color accumulators (ACA) (1226), each ACA dedicated to one subpixel region of the pixel. During processing of the fragment list for each pixel location, the coverage masks of each fragment are used as a processing mask for the resolve hardware. The ACA performs a multiply for the alpha scale, color accumulation, and alpha accumulation. The (1/NUM_CVG_BITS) scaling is performed with a shift as set forth above. Once all fragments have been processed for a given pixel location, the output section combines the color and alpha values for all of the 16 subpixels in a hierarchical fashion (1228). The processors in the output combine the two incoming values and divide by 2. With hardware pipelining, the pixel resolve process uses only a single hardware clock per fragment entry.

An alternative technique reduces hardware requirements by treating subpixels having the same accumulated alpha similarly at each layer. This technique is based on the observation that the state in which subsamples have unique accumulated alpha values occurs gradually. Initially, all of the subsample alphas are set to zero (transparent). The first fragment accumulation can add at most one unique alpha value, resulting in one group of subsamples retaining the initial alpha value and the other group having the same new alpha value. The second fragment accumulation can result in no more than four unique alpha values. Overall, the number of unique subsample alpha values possible after 'n' fragment accumulations is $2^{}n$ (or, more accurately, MIN($2^{}n$, NUM_CVG_BITS)).

This alternate technique uses this characteristic to reduce the number of accumulations required by only performing the color scale and accumulation for each unique alpha value within the subsamples rather than for every subsample. With this technique, at most one accumulate needs to occur for the first fragment, two for the second fragment, four for the third fragment, and so on, up to the number of subsamples in the pixel (e.g., with a 4×4 subsample array the worst case is 16 accumulations per fragment).

The foundation of the technique is to maintain the set of unique alpha values and their associated coverage masks during fragment accumulation, the intent of which is to perform a minimum number of color accumulations.

The alpha and coverage masks are stored in NUM_CVG_BITS element arrays of which some subset of these entries is actually valid (or 'in-use') at any time. The 'in-use' entries are those which hold the current set of unique alpha values. The in-use entries are identified by a NUM_CVG_BITS bit mask where a set bit indicates that the array element at that bit index is in-use. A convention is used in which the first set bit in the coverage mask of a {unique alpha, coverage mask} pair defines which array element that pair is stored in. Consider the following example of how the array is initialized and updated with the accumulation of three fragments (using 4 subsamples):

```
Initial state (X implies a 'don't care' value):
    0b0001    // in-use mask
    { 1., 0b1111 } // alpha, coverage pairs
    { X, 0bXXXX }
    { X, 0bXXXX }
    { X, 0bXXXX }
Accumulate fragment { .5 /* alpha */, 0b0011 /* coverage mask */}
    0b0101    //in-use mask
    { .5, 0b0011 } // alpha, coverage pairs
    { X, 0bXXXX}
    { 1., 0b1100 }
    { X, 0bXXXX }
Accumulate fragment { .3, 0b1000 }
    0b1101    // in-use mask
    { .5, 0b0011 } // alpha, coverage pairs
    { X, 0bXXXX}
    { 1., 0b0100 }
    { .7, 0b1000 }
Accumulate fragment { .8, 0b0101 }
    0b1111    // in-use mask
    . { .1, 0b0001 } // alpha, coverage pairs
    { .5, 0b0010 }
    { .2, 0b0100 }
    { .7, 0b1000 }
```

The initial alpha coverage array is set forth below:

| | |
|---|---|
| x | 1 |
| x | x |

The in use mask is 0001, which specifies the location where the array mask is stored. The corresponding array mask is as follows:

| | |
|---|---|
| xxxx | 1111 |
| xxxx | xxxx |

After fragment 0, the alpha coverage mask appears as follows.

| | |
|---|---|
| x | 0.5 |
| x | 1 |

The in use mask is 0101, and the array mask is as follows:

| | |
|---|---|
| XXXX | 0011 |
| XXXX | 1100 |

For elements in the in use mask that are set, the array mask is ANDed with the coverage mask for the new fragment to determine whether there is a change in alpha value. If there is a new alpha, the new value for the array mask is computed by: array mask AND NOT coverage mask. If there is a new value for the array mask, it is stored in the appropriate location.

After fragment 1, the alpha coverage mask appears as follows.

| | |
|---|---|
| x | 0.5 |
| 0.7 | 1 |

The in-use mask is 1101, and the array mask is as follows:

| | |
|---|---|
| XXXX | 0011 |
| 1000 | 0100 |

After fragment 2, the alpha coverage mask appears as follows.

| | |
|---|---|
| 0.5 | 0.1 |
| 0.7 | 0.2 |

The in-use mask is 1111, and the array mask is as follows:

| | |
|---|---|
| 0010 | 0001 |
| 1000 | 0100 |

The number of unique alpha values at any time is equal to the number of set bits in the in-use mask. The complete solution includes two steps. The first step is performing the necessary color accumulations, where one accumulation is required per 'in-use' entry in the coverage/alpha array. The second step is to update the coverage/alpha array with the new fragment's values.

A complete implementation of this technique (for 4×4 subsamples) is as follows.

```
for (each fragmented pixel location) {
    // initial state (per pixel)
    InUseMask = 0x0001;
    CoverageArrayMask[16] = { 0xffff, 0, . . . , 0};
    CoverageArrayAlpha[16] { MAX_ALPHA, MAX_ALPHA, . . . , MAX_ALPHA};
    ColorAccum = 0;
    while (fragment list is not empty) {
        scan fragment list and extract closest fragment (coverage,
          color, alpha);
        // accumulate this fragment's color into ColorAccum for
          each in-use element
        InUseMaskScratch = InUseMask;
        while (InUseMaskScratch != 0x0000) {
            //  find first set bit in scratch in-use mask
            Index = FindFirstSetBit(InUseMaskScratch);
            //  clear this bit in scratch mask
            InUseMaskScratch &= ~(0x1 << Index);
            //  read old (or current) alpha for this entry - this is used
            //  in updating the non-covered area (which may be newly 'in-use')
            AlphaOld = CoverageArrayAlpha[Index];
            //  alpha scale factor - used for scaling color for accumulation and
            //  to compute alpha for subsequent layers
            AlphaScale = AlphaOld * alpha;
            //  compute alpha for next layer - use this for updating alpha array
            //  AlphaNext = AlphaOld*(MAX_ALPHA-alpha) = AlphaOld-AlphaOld*alpha
            AlphaNext = AlphaOld - AlphaScale;
            //  compute mask for overlapped coverage - this is the portion of this
            //  array entry which is covered by the new fragment, so accumulate the
            //  color and update the array with new alpha value
            AccumCvgMask = coverage & CoverageArrayMask[Index];
            if(AccumCvgMask != 0x0000) {
                //  accumulate the color
                nCoverageBits = CountSetBits(AccumCvgMask);
                ColorAccum += color*(AlphaScale *
                  nCoverageBits/NUM_CVG_BITS));
                // update alpha for covered portion (this may result in a 'new'
                //  in-use element or just overwrite the old one)
                Index2 = FindFirstSetBit(AccumCvgMask);
                InUseMask |= (0x1 << Index2);
                CoverageArrayMask[Index2] = AccumCvgMask;
                CoverageArrayAlpha[Index2] = AlphaNext;
            }
            //  compute the mask for the non-covered area - this is the
            //  of this array entry which is unobscured by the new
            //  fragment, so
            //  just update the coverage (the alpha stays the same)
            UpdateCvgMask = ~coverage & CoverageArrayMask[Index];
            if(UpdateCvgMask!= 0x0000) {
                Index2 = FindFirstSetBit(UpdateCvgMask);
                InUseMask |= (0x1 << Index2);
                //  update for the non-covered area - this may result
                  in a 'new'
                //  in-use element or just overwrite the old
                  one (thus copy the
                //  alpha value in case it is new . . .)
                CoverageArrayMask[Index2] = UpdateCvgMask;
                CoverageArrayAlpha[Index2] = AlphaOld;
            }
        }
    }
    ColorAccum is pixel color
}
```

The core arithmetic operation is the color accumulation, which requires a total of three multiplies per unique alpha value:

ColorAccum+=color*(alpha*AlphaOld*(nCoverageBits/ NUM_CVG_BITS));

Note that the third multiply may be somewhat simplified by the number of subsamples. For 16 subsamples, the third multiply involves 0.4 fixed point value, thus this multiplier can be a 8×4 (where the other multipliers are likely to be 8×8). Also note that, for 2**n sized coverage masks, the division shown above is merely a shift.

This technique requires a worst case total of:

$$\sum_{n=1}^{NumFrags} MIN(2^n, 16)$$

accumulations. The typical case can be much less than this because the worst case occurs only when a new fragment's coverage has both set and unset values in each 'in-use' array element.

One useful optimization is to track coverage mask locations which have fully opaque alpha value. This is useful in the case in which fragments are being generated due to partial geometric coverage and not due to non-opaque transparency values. These fragments will normally have a fully opaque transparency value. Implementing this optimization is done by maintaining an additional mask value, the OpaqueAlphaMask. The OpaqueAlphaMask is set by O-Ring in coverage masks of fragments for which the alpha is fully opaque (this is done after accumulating the fragment's contribution). This mask is then used to disregard bits in the masks of subsequent fragments, since there can be no further color contribution to the corresponding subsamples.

Another possible optimization is to consolidate locations with identical alpha values, but this is significantly more expensive to implement, and the occurrence of identical alpha values which are not either 0 or MAX_ALPHA is not likely.

The example and pseudocode given above use a front-to-back depth sorting. It is equally possible to perform the same computations in a back-to-front depth sorting. Also, the computations given above use color components which have not been pre-multiplied by the alpha component. The same technique applies to pre-multiplied color components, with slightly different arithmetic computations (and identical control flow).

Texture Mapping

The image processing system includes a number of advanced texture mapping features. Its support for texture mapping includes anisotropic filtering of texture data. The system can perform anisotropic filtering of texture data in real time. Its support for texture mapping also includes the capability to render an image to texture memory and then use rendered image as a texture. We describe these features in more detail below.

We begin by describing some concepts that form the foundation for our approach for anisotropic filtering, and then describe an implementation in more detail.

Texture mapping refers to mapping an image onto a surface. Intricate detail at the surface of an object is very difficult to model using polygons or other geometric primitives, and doing so can greatly increase the computational cost of the object. Texture mapping enables an image processing system to represent fine detail efficiently on the surface of an object. A texture map is a digital image, which we will also refer to as the "source image." The texture map is typically rectangular in shape and has its own (u, v) coordinate space. Individual elements of the texture map are referred to as "texels." In texture mapping, a texture or "source image" is mapped to a target image.

As digital images, the source and the target images are sampled at discrete points, usually on a grid of points with integer coordinates. In the source image, texels are located at integer coordinates in the (u,v) coordinate system. Similarly, in the target image, pixels are located at integer coordinates in the (x,y) coordinate system.

A geometric transformation describes how a point from the source image maps into the target image. The inverse of this transformation describes how a point in the target maps back into the source image. The image processor can use this inverse transform to determine where in the source array of texels a pixel intensity should come from. The intensity at this point in the source image can then be determined based on neighboring texel data. A point in the target mapped back into the source image will not necessarily fall exactly on the integer coordinates of a texel. To find the intensity at this point, the image data is computed from neighboring texels.

Since the source image intensities are only known at discrete values, values from neighboring texels are interpolated and the resulting data then is passed through a low pass filter. In general, the approach occurs as follows. First, a point is mapped from the target image into the source image. Then, texel data is interpolated to reconstruct the intensity at the point mapped into the source image. Finally, a low pass filter is applied to remove spatial frequencies in the source image that will transform to too high a range to be resampled properly in the discrete target image. This low pass filter is sometimes referred to as an anti-aliasing filter because it removes high frequencies that will masquerade or "alias" as waves of lower frequency in the target because of resampling. We describe this concept in more detail below.

FIG. 180 is a example illustrating how a pixel 1300 on the surface 1302 of the target image maps to the surface of the texture map 1304. In this example, the pixel from the target image is represented as a square 1306. The backward mapping of this pixel 1300 onto the texture map 1304 is a quadrilateral 1308 that approximates the more complex shape into which the pixel may map due to the curvature of the destination surface 1302. After mapping the pixel 1300 to the texture, an intensity value is computed from texel samples within the quadrilateral. For instance in one approach, the intensity value of a pixel is computed by taking a weighted sum of texels in the quadrilateral.

Both the interpolation and low-pass filtering functions can be combined into a single filter that is implemented by taking a weighted average of points surrounding each inverse transformation point in the source that maps to a discrete point in the target. We refer to the region of points that contribute to that weighted average as the footprint of the filter. In general, the footprint will have a different shape in the source for each target point. Since the footprint can vary for each point, it is difficult to find the correct shape of the footprint and the weighting factors to apply to the points inside the footprint. Some conventional systems make the approximation of using the same shape for the filter at every point, although they may allow the size of the filter to vary. This approach, however, can lead to distortion in the final image.

We refer to filters that produce either square or circular footprints of variable size as isotropic filters. A circle is truly isotropic since it has the same length in all directions. We also consider a square to be essentially isotropic, since it has equal dimension horizontally and vertically.

Isotropic filtering can produce distortion because it uses rather rough approximations. In areas of the source image where the actual footprint is highly elongated, an essentially isotropic shape such as a square or a circle is a poor substitute for the footprint, even if the size is adjustable. Since an isotropic filter only has one shape, it can not accurately capture texels in an elongated footprint. For example, a square filter cannot accurately sample texel values from a quadrilateral footprint elongated in one direction. Sampling texels outside the actual footprint can cause blurring. Not sampling texels in the footprint, on the other hand, can cause the final image to sparkle due to aliasing.

In one approach called MIP (multum in parvo—many things in a small place) mapping, a number of texture maps are stored at different resolutions. For example, if the one texture is at 512×512 texels, the system also stores textures at 256×256, 128×128, 64×64, etc. An image processing system can use these texture maps at varying resolution to find the best fit for an isotropic filter on the footprint of the pixel mapped into the texture. The image processor first finds the two textures where the footprint is closest in size to the size of the filter. It then performs interpolation for the two textures that fit the footprint most closely to compute two intermediate values. Finally, it interpolates between the two intermediate values to find a value for the pixel.

While MIP mapping can provide improved results for isotropic filters, it will still produce distortion, especially where the footprint is elongated in one direction.

We have developed a system and method for performing anisotropic filtering. The approach can be used to perform texture mapping with anisotropic filtering in real time.

A more accurate filter for the actual footprint at each point can be produced by the cascade of an essentially isotropic reconstruction filter convolved with an essentially isotropic resampling filter whose shape has been distorted by the inverse of the geometric transform. This distortion can produce a high degree of anisotropy of a filter. If the transformation contracts the image in one direction much more than in another direction, then the inverse transformation will expand or elongate the footprint in the source along the direction of maximum contraction in the target. This can occur when viewing a planar surface from a perspective close to the edge. In isotropic filtering, the final image would appear distorted in this example because the filter cannot properly sample texel values in the elongated footprint.

To describe our approach for supporting anisotropic filtering, we begin with a background description of the theory underlying our approach.

In providing this background, we will be dealing with two types of images, analog and digital. Analog images are defined on a continuous domain and digital images on a discrete one. Analog images typically are a distribution of light falling on or emitted from a surface, e.g. an image projected by a lens onto film or the pattern of light emanating from a CRT. Digital images are collections of numbers that approximate analog images and are the form used for representing images in computers.

We will use as our model of an analog image a real valued function defined on a two dimensional plane. A color image is a vector valued function, but we can consider each component independently. More specifically, an analog image will be a bounded, differentiable function $f:R^2 \to R$, where R is the set of real numbers.

A digital image is a bounded function $f_d:Z^2 \to R$, where $Z^2$ is the integer lattice in two dimensions. Digital images are also quantized in range as well, being functions from $Z^2 \to Z$. We assume that they are quantized sufficiently accurately to be represented by real valued functions.

Figure 19:
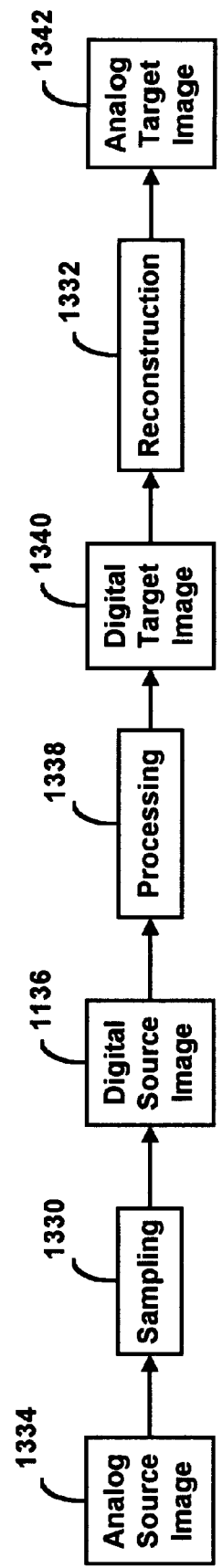
FIG. 19 is a diagram illustrating a method for processing an analog source image to produce an analog target image.

FIG. 19 illustrates a conventional sequence of operation in image processing. Digital images are derived from analog ones by a process called sampling (1330). Analog images are formed from digital ones by a process called reconstruction (1332). In this diagram, an analog source image 1334 is converted to a digital source image 1336 by sampling 1330. The digital source image is then processed (1338) in the digital domain to create the digital target image 1340. The digital target image is then reconstructed (1332) to get the analog target image.

To describe the inter-conversion of digital and analog images, we first need to express them on a common domain. Since $Z^2 \subset R^2$, we need a way of extending the definition of the discrete image to all of $R^2$.

The solution is to express the digital image as a weighted sum of Dirac impulses. Thus a discrete image $f_d(k):k \epsilon Z^2$ is given on the larger domain $R^2$ as $$f_a(x) = \sum_{k \in Z^2} f_d(k) \delta(x - k).$$

Although impulses are not functions in the classical sense, we use the standard engineering shorthand for generalized functions. The grid of impulses, modulated by the values of $f_d$ contains all the information in the digital image. The discrete image is now in a form where we can use integral operators such as the Fourier transform and convolution the same as we can with an analog image. This form also gives us a trivial "reconstruction" of the digital image in analog form using the grid of impulses as a reconstruction filter. This "filter" does nothing, it passes all frequency components allowing us to observe the distortions produced by sampling Now looking at the destination image, $f_s$ the sampled version of analog image $f$ is $$f_s(x) = f(x) \sum_{k \in Z^2} \delta(x - k) = \sum_{k \in Z^2} f(k) \delta(x - k).$$

To describe the effect of sampling, we use the Fourier transform. This operator analyzes a signal into a sum of complex exponentials. These are the eigenfunctions of linear shift invariant systems, meaning that they pass through these systems unchanged except for multiplication by a complex constant. Linear constant coefficient differential equations are shift invariant and are useful models for many phenomena. Convolution, the operation used to solve these equations, is converted by the Fourier transform into multiplication. Conversely, multiplication is converted into convolution. Thus a multiplicative process like sampling can be described by the transform.

The Fourier transform of an image $f$ is $$F(v) = \int_{x \in R^2} f(x) e^{-i2\pi v \cdot x} dx.$$

Using the convolution theorem, the spectrum of a sampled image $f_s$ is given by $$F_s(v) = F(v) * \sum_{j \in Z^2} \delta(v - j) = \sum_{j \in Z^2} F(v - j)$$

where the frequency variable $v \epsilon R^2$ has units of fractions of the sampling rate and * is convolution operator $$(f*g)(x) = \int_{R^2} f(x-\xi)g(\xi)d\xi.$$

From this we see that the spectrum of the sampled image is composed of a sum of replicas of the spectrum of the original translated to all the integer lattice points in the frequency domain. The overlap of the frequencies in the replicas with those of the original spectrum is called aliasing because high frequencies masquerade or alias as low ones and vice versa.

Once the aliases are added to the original signal, it is impossible to recover it without distortion. The only signals that can be represented exactly by a digital system are those whose frequency content is limited to half the sampling frequency, the so called Nyquist rate.

Nyquist band limiting can be produced by multiplying the spectrum of the original signal by a box of unit height and unit length sides centered at zero. This filter passes all frequencies below the Nyquist perfectly and absolutely rejects all others. Using the convolution theorem again, this filtering can be accomplished in the spatial domain by convolving the image to be sampled with the Fourier transform of the box, which is the Sinc function. In two dimensions the Sinc function is given as the product of two one dimensional Sinc functions $$\text{Sinc}(x, y) = \text{Sinc}(x)\text{Sinc}(y) = \frac{\sin(\pi x)}{\pi x}\frac{\sin(\pi y)}{\pi y}$$

Practical bandlimiting filters are approximations to this infinite length function.

Having provided a background in signal theory, we now describe image transforms. We define an image transformation as a one to one differentiable mapping $T:R^2 \to R^2$. Given T an $f:R^2 \to R$, we can compute a transformed image g by $$g(T(x)) = f(x) \quad (1)$$

Since T is invertable we have $$g(y) = f(T^{-1}(y)) \quad (2)$$

for $y \in R^2$.

Equation (1) is the normal parametric definition of an image transformation, each point x is mapped through T to another point T(x) where the value of g is assigned that of $f(x)$. We refer to this point of view as "forward mapping". To compute g at a particular point y, you would use eq. (2). This is "backward mapping".

Figure 20:
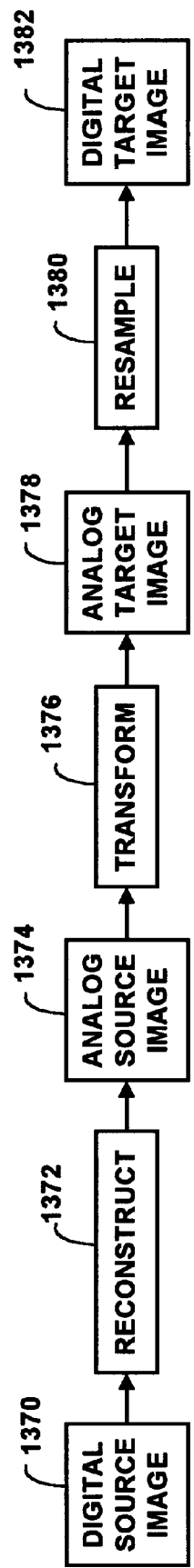
FIG. 20 is a diagram illustrating a method for processing a digital source image to produce a digital target image.

Since the images in computers are discrete we can't use eqs. (1) or (2) directly. We need to "fill in the blanks" between the lattice points. To accomplish this, we reverse the order of the blocks in FIG. 19. Reversing the order of FIG. 19, we obtain the block diagram of FIG. 20.

Starting with the digital source image $f_d$ (1370) the analog source is obtained by convolving it with a reconstruction filter r (1372) to remove the sampling replicas. This yields the analog target image (1374):

$$f(x) = (f_d * r)(x) = \int f_d(x-\xi)r(\xi)d\xi.$$

The transformed analog target (1376, 1378) is $$g(y) = f(T^{-1}(y)) = \int f_d(T^{-1}(y)-\xi)r(\xi)d\xi.$$

The analog target (1378) is next convolved with a resampling filter s (1380) to remove any frequencies that the transformation carried out of the Nyquist box to give the digital target image (1382):

$$g_s(y) = (g*s)(y) = \int g(y-\eta)s(\eta)d\eta = \int (\int f_d(T^{-1}(y-\eta)-\xi)r(\xi)d\xi)s(\eta)d\eta = \int\int f_d(T^{-1}(y-\eta)-\xi)r(\xi)s(\eta)d\xi d\eta.$$

In the above equation $\eta$ is inside $T^{-1}$ and $\xi$ is outside. To place $\eta$ and $\xi$ on the same level we can pull $\eta$ out from $T^{-1}$ by applying the change of variables transformation $$\eta \to y - T(T^{-1}(y) - \eta).$$

This gives $$g_s(y) = \int\int f_d(T^{-1}(y)-\eta-\xi)r(\xi)s(y-T(T^{-1}(y)-\eta))|T'(T^{-1}(y)-\eta)|d\xi d\eta$$

where T', the Jacobian matrix, is the derivative $\partial T/\partial x$ of T. Changing the order of integration and converting to an iterated integral we have $$g_s(y) = \int(\int f_d(T^{-1}(y)-\eta-\xi)r(\xi)s(y-T(T^{-1}(y)-\eta))|T'(T^{-1}(y)-\eta)|d\eta)d\xi.$$

Make the change $\eta \to \eta - \xi$ which is possible since $\xi$ is external to the inner integral and get $$g_s(y) = \int(\int f_d(T^{-1}(y)-\eta)r(\xi)s(y-T(T^{-1}(y)-\eta-\xi))|T'(T^{-1}(y)-\eta-\xi)|d\eta)d\xi$$

Reversing the order of integration again and extracting $f_d$ as constant on the inner integral gives $$g_s(y) = \int f_d(T^{-1}(y)-\eta)(\int r(\xi)(s(y-T(T^{-1}(y)-\eta-\xi))|T'(T^{-1}(y)-\eta-\xi)|d\xi)d\eta \quad (3)$$

We can write this as $$g_s(y) = \int f_d(T^{-1}(y)-\eta)k(\eta,y)d\eta \quad (4)$$

where $$k(\eta,y) = \int r(\xi)s(y-T(T^{-1}(y)-\eta-\xi))|T'(T^{-1}(y)-\eta-\xi)|d\xi. \quad (5)$$

This is the primary result. It tells us that the cascade of reconstruction filter, transformation and resampling filter is equivalent to operating on the source image with a single composite filter $k(\eta,y)$.

Since $f_d$ is composed of impulses at the lattice points, the outer integral in equation (3) becomes a summation of those points where $T^{-1}(y)-\eta$, the argument of $f_d$, is an integer. We can write this as $\eta = T^{-1}(y)-i$ for any integer $i \in Z^2$. Since any practical filter will have finite support, we will specify that both r and s are zero outside of regions $W_r$ and $W_s$ respectively. This will restrict the possible values of i. Since $y-T(T^{-1}(y)-\eta-\xi) \in W_s$, $\xi \in W_r$ and $\eta = T^{-1}(y)-i$ we can determine i by $$y - T(T^{-1}(y) - T^{-1}(y) + i - \xi) \in W_s$$

$$y - T(i - \xi) \in W_s$$

$$y - T(i - W_r) \in W_s$$

$$T(i - W_r) \in y - W_s$$

$$i - W_r \in T^{-1}(y - W_s)$$

$$i \in T^{-1}(y - W_s) + W_r$$

The variable i is seen to be any two dimensional integer that can be expressed as the sum of a point in $W_r$ and a point contained in the inverse image under T of $W_s$ centered on the output point y. Thus we have $$g_s(y) = \sum_{i \in T^{-1}(y-W_r)+W_r} f_d(i) \int_{W_r} r(\xi)s(y-T(i-\xi))\,|\,T'(i-\xi)\,|\,d\xi. \qquad (6)$$

This takes an average of the source elements in a region surrounding $T^{-1}(y)$ weighted by the convolution of the reconstruction filter r and the resampling filter s whose shape has been distorted by the mapping T.

We now seek ways to simplify the integral. The first step is to approximate T by a first order Taylor series around a given point $$T(x)=T(x_0)+(\partial T|\partial x)_{x_0}(x-x_0).$$

In equation (6) we will use $T^{-1}(y)$ as the center point of the Taylor series. Substituting in the argument of s we get $y-T(i-\xi)$ $y-(T(T^{-1}(y))+T'(T^{-1}(y))(i-\xi-T^{-1}(y)))$ $y-y-T'(T^{-1}(y))(i-\xi-T^{-1}(y))$ $T'(T^{-1}(y))(\xi-i+T^{-1}(y))$ The determinant of the Jacobian in (6) reduces to just $T'(T^{-1}(y))$ after the linearization of T by the Taylor series. The integrand in (6) then becomes $r(\xi)|T'(T^{-1}(y))|s(T'(T^{-1}(y))(\xi-i+T^{-1}(y)))$ We now have a convolution of r with a version of s that has been scaled and distorted by the matrix $T'(T^{-1}(y))$ and offset by the vector $T^{-1}(y)$. If s has a square shape, it will be distorted by T' into a parallelogram whose axes are the columns of $(T')^{-1}$.

The next stage of the approximation is to realize that we only need to convolve with a one dimensional version of s directed along the longer axis of the parallelogram. The other dimension of filtering by s can be done enlarging the area of coverage of r. Finally, we can take a discrete approximation of the integral, replacing it with a summation.

Applying the principles above, we derive a method for performing anisotropic filtering in an image processing system. To compute the value of a pixel from a texture map, the image processor applies a general interpolating filter along the line of anisotropy. We explain the line anisotropy and anisotropic filtering along this line in further detail below.

One embodiment of our anisotropic filtering method includes the following two steps: 1) finding an approximate direction of maximum elongation of the filter footprint; and 2) applying a resampling filter along that direction to the output of a reconstruction filter to produce a composite filter that more closely matches the actual footprint.

The direction of maximum elongation can be derived from the backward mapping of a filter from the target image to the texture map. For example in perspective mapping (where an object fades toward the vanishing point), the mapping of an n×n pixel footprint from the target image to the texture is a quadrilateral. The line of anisotropy is defined as a line having the direction of maximum elongation and passing through a point from the target mapped back into the source image.

In this embodiment, the image processor backward maps the filter footprint to the texture to find the direction of maximum elongation. It then sweeps an interpolating filter (the reconstruction filter outlined above) along the direction of maximum elongation. To compute a pixel value for the target image, it applies a resampling filter to the output of the interpolating filter.

In one implementation, the resampling filter is a one dimensional digital filter applied along the line of anisotropy. A variety of one dimensional filters can be used for this filter. Therefore, we do not intend to limit the scope of our invention to a specific one-dimensional filter.

In this implementation, the interpolating filter is a two dimensional isotropic filter. As with the resampling filter, we do not intend to limit the scope of our invention to a specific type of interpolating filter. The two dimensional isotropic filter is only one possible implementation. The interpolating filter provides values at positions along the line of anisotropy by interpolating these values from neighboring texel data. The discrete positions at which the interpolating filter is applied to the source image can be determined by stepping either vertically or horizontally in increments and interpolating a value at the line of anisotropy at each position. For instance, if the line of anisotropy is more vertical than horizontal, one approach would be to step in the vertical or V direction in the (u, v) coordinate system of the texture. Similarly, if the line of anisotropy is more horizontal than vertical, another approach would be to step in the horizontal or U direction in the (u, v) coordinate system of the texture.

One possible method for stepping along the line of anisotropy is to apply the interpolating filter at discrete locations along this line, evenly spaced at approximately the length of minimum elongation. Specifically, the sample locations along the line of anisotropy can be evenly spaced at a distance approximately equal to the length of minimum elongation with the center sample located at the point where the pixel center maps into the texture map. Once these sample locations are computed, an isotropic filter can be repetitively applied at each location. For example, an isotropic filter can be applied at the sample locations to perform interpolation on neighboring texture samples to each sample, with the size of the filter dependent on the length of minimum elongation. One specific way to implement this method is to perform tri-linear interpolation at each discrete location along the line of anisotropy.

After applying the outputs of the interpolating filter to the digital filter, the resulting pixel value is a weighted average of the outputs of the interpolating filter along the line of anisotropy. While we describe specific types of filters here, the types of filters used to approximate the reconstruction and resampling functions can vary.

FIGS. 21A–D illustrate an example the process of anisotropic filtering. FIGS. 21A–D illustrate the texels in a texture map (1400A–D) and show how an anisotropic filter can be generated. The first step is to compute a filter footprint in the source image by performing an inverse transform on the filter footprint for a pixel location in the target image. In this example, the filter footprint in the texture 1400A is illustrated as a quadrilateral 1402.

The next step is to approximate the inverse transformation matrix at a point mapped into the source image. In this example shown in FIG. 21B, this approximation is represented by a parallelogram 1404. This parallelogram approximates the quadrilateral-shaped footprint. In general, this approximation can be found by computing the Jacobian matrix for the inverse geometric transform. While we have simplified the example for purposes of illustration, the same concept can be extended to cases where the inverse transformation is more complex. This will become apparent from additional detail provided below.

Referring again to the example in FIG. 21, the size of the reconstruction and resampling filters can be derived from the Jacobian matrix. In FIG. 21B, we represent the Jacobian matrix as a parallelogram 1404. The length of the parallelogram can be used to determine the size of the resampling filter. In this example, the length is measured along the direction of maximum elongation 1406, which we also refer to as the direction of anisotropy. Similarly, the height of the parallelogram can be used to determine the size of the reconstruction filter. The height is the direction of minimum elongation 1408.

FIG. 21C shows a rectangle 1406 that approximates the parallelogram. The dimensions of this rectangle correspond to the height and length of the parallelogram. The rectangle represents the "bar shaped" filter used to approximate the anisotropy of the actual filter footprint.

FIG. 21D illustrates how this "bar shaped" filter can be computed. The footprint of the reconstruction filter is represented by the square 1408. In this example, the reconstruction filter has a square footprint, and is thus essentially an isotropic filter. To compute values along the line of anisotropy represented by the line 1410 in FIG. 21D, values are interpolated from texels (1400D) surrounding the line of anisotropy 1410. The reconstruction filter is, therefore, an interpolating filter as noted above. The output of this filter is then applied to a one dimensional filter, which represents the resampling filter. The line of anisotropy 1410 represents the orientation of the resampling filter. The values computed as the reconstruction filter is passed along the line of anisotropy are summed to compute the pixel value for the target image.

The approach described above can be implemented in a variety of ways. It can be implemented in hardware or software. To support real time anisotropic filtering, the method is preferably implemented in hardware. One embodiment of this approach is implemented on the Tiler chip.

In the tiler illustrated in FIGS. 9A–C, anisotropic filtering is supported in the scan convert block and texture filter engine. The scan convert block computes control parameters for the resampling and reconstruction filters by taking the Jacobian matrix of partial derivatives of the inverse geometric transformation at a point in the source image. The Jacobian matrix represents the linear part of the best locally affine approximation to the inverse transformation. More specifically, it is the first order portion of the Taylor series in two dimensions of the inverse transformation centered around the desired source point.

The linear part of the affine transformation from texture coordinates to screen coordinates has a two-by-two Jacobian matrix J; the inverse transformation from screen coordinates to texture coordinates has a Jacobian matrix $J^{-1}$. The lengths of the two column-vectors of the matrix $J^{-1}$ are the lengths of the two sides of the parallelogram for a unit-sized pixel. The components of the two column-vectors in the inverse Jacobian matrix determine the lengths of the two sides of the parallelogram.

The transformations take the form of attribute edge equations that the scan convert block evaluates as it scans each primitive. The following equation is typical:

$$F_{s/w} = A_{s/w} x + B_{s/w} y$$

where, at pixel location (x, y):

1) $F_{s/w}$ is the value of the texture coordinate (s) divided by the homogeneous coordinate (w).
2) $A_{s/w}$ is the value of the gradient of the texture coordinate (s) divided by the homogeneous coordinate (w) with respect to the x coordinate.
3) $B_{s/w}$ is the value of the gradient of the texture coordinate (s) divided by the homogeneous coordinate (w) with respect to the y coordinate. F, A, and B are all normalized relative to the scan start point of the primitive. The scan convert block evaluates edge equations for 1/w, s/w, and t/w.

The inverse Jacobian matrix elements yield the lengths of the sides and the area of the parallelogram. The area of the approximating rectangle and the long side of the rectangle are the same; the short side of the rectangle is the short side of the parallelogram multiplied by the sine of the angle between the x and y axis in the (s, t) coordinate system.

The derivatives for the inverse Jacobian matrix derive directly from the As, As, and Bs of the edge equations at each texture coordinate (s, t).

$$w = \frac{1}{1/w} = \frac{1}{F_{1/w}}$$

$$s = w(s/w) = wF_{s/w} \qquad t = w(t/w) = wF_{t/w}$$

$$\frac{\partial s}{\partial x} = w\left(\frac{\partial(s/w)}{\partial x} - s\left(\frac{\partial(1/w)}{\partial x}\right)\right) \quad \frac{\partial s}{\partial y} = w\left(\frac{\partial(s/w)}{\partial y} - s\left(\frac{\partial(1/w)}{\partial y}\right)\right)$$

$$= w(A_{s/w} - sA_{1/w}) \qquad\qquad\qquad = w(B_{s/w} - sB_{1/w})$$

$$\frac{\partial t}{\partial x} = w\left(\frac{\partial(t/w)}{\partial x} - t\left(\frac{\partial(1/w)}{\partial x}\right)\right) \quad \frac{\partial t}{\partial y} = w\left(\frac{\partial(t/w)}{\partial y} - t\left(\frac{\partial(1/w)}{\partial y}\right)\right)$$

$$= w(A_{t/w} - tA_{1/w}) \qquad\qquad\qquad = w(B_{t/w} - tB_{1/w})$$

$$LengthXSquared = \left(\frac{\partial s}{\partial x}\right)^2 + \left(\frac{\partial t}{\partial x}\right)^2$$

$$LengthYSquared = \left(\frac{\partial s}{\partial y}\right)^2 + \left(\frac{\partial t}{\partial y}\right)^2$$

$$Area = \text{Abs}\left(\left(\frac{\partial s}{\partial x}\right)\left(\frac{\partial t}{\partial y}\right) - \left(\frac{\partial s}{\partial y}\right)\left(\frac{\partial t}{\partial x}\right)\right) = L \times S \sin\theta$$

After finding the Jacobian matrix, the scan convert block finds the longer of the two column vectors. The direction of this vector represents the direction of the line of maximum elongation or line of anisotropy. The ratio of the length of this column vector to the length of the other is referred to as the ratio of anisotropy. The length of the one dimensional anisotropic filter is determined from this ratio. The length of the longer vector divided by the anisotropy ratio controls the width of the reconstruction filter.

The longer side becomes the major axis and can be used to determine the screen coordinate to be incremented when stepping (clocking) in texture coordinates. It can also be used to determine the sizes of the increments.

```
// DsDx is the partial derivative of s with respect to x, etc.
// (DsDc, DtDc) are steps in (s, t) along axis of anisotropy.
if (LenqthXSquared >= LengthYSquared) {
    MajorSquared = LengthXSquared
    InverseMajor = 1./sqrt(MajorSquared)
    DsDc = DsDx * InverseMajor
    DtDc = DtDx * InverseMajor
} else {
    MajorSquared = LengthYSquared
    InverseMajor = 1./sqrt (MajorSquared)
    DsDc = DsDy * InverseMajor
    DtDc = DtDy * InverseMajor
}
```

The step sizes DsDc and DtDc are basic inputs to the texture filter engine, which performs the sampling and filtering. These steps produce an orientation that is incorrect by (at most) seven degrees, which occurs in the case of an equilateral parallelogram.

In this implementation, the length of the shorter vector usually approximates the width of the reconstruction filter, unless the anisotropy ratio exceeds a preset limit. If the limit is exceeded, then the anisotropy ratio is replaced by this preset limit in the calculation. Limiting the ratio in this manner prevents the filter from using more than a predetermined number of texel points to compute a value. Thus, the limit on the ratio places a bound on how long the reconstruction filter requires to compute an output value.

Another limiting case occurs if the length of either vector is less than one. In this case, the actual length of the vector is replaced by a length of one. This insures that the filter lengths are never too short to perform interpolation.

After the scan convert block computes the control parameters for the filters, it then computes a pixel value. The one dimensional digital filter computes a weighted average of the output from the interpolating filter. The interpolating filter computes this output by interpolating texel data from the source image that neighbors the line of anisotropy.

The size of the interpolating filter can be adjusted to approximate the true footprint width measured in a direction perpendicular to that of maximum elongation. When the footprint is large, which occurs in areas of the image that the transformation is shrinking, many points of the source image must be multiplied by filter weighting coefficients to produce a single output point, which results in a very slow or costly implementation.

As introduced above, existing isotropic filtering systems reduce computation time by using MIP mapping. MIP mapping refers to forming an image pyramid based on the source image, and then using the images in this pyramid to find the best fit for an isotropic filter on a source image. Each level of the pyramid is reduced in sampling density by a factor of two in each dimension compared to the one below it. The bottom of the pyramid is the original source image. Interpolating an image of reduced sampling density produces a similar effect to filtering the original image with an isotropic filter whose footprint is enlarged relative to that of the interpolator by the ratio of the original sampling density to the reduced density. Thus, power of two enlargements of the footprint can be achieved by selecting the proper level of the pyramid to interpolate. Any ratio of enlargement can be obtained by blending the results of interpolations of the two pyramid levels that bracket the desired ratio.

In one embodiment, the size of the isotropic filter can be modified to more closely fit the length of minimum elongation by using a MIP mapping approach. The isotropic filter size determined from analyzing the Jacobian matrix can be used to select the bracketing pyramid levels and blend factor. In one implementation, the base pyramid level is the integer part of the log base 2 of the filter size, and the blend factor is the fractional part.

A specific example will help illustrate the operation of the specific implementation described above. If the desired isotropic size is 3, then $\log_2 3$ equals 1.585. The integer part of the result is 1, which selects levels 1 and 2 with a density reductions of 2 and 4 respectively. Level 0 is the original source image with no reduction. The blend factor is 0.585.

In one implementation, the texture filter engine postpones the blending. First, the texture filter engine applies 1-D filters of length proportional to the anisotropy ratio centered on the desired point at each level. It then blends the output from each level.

In an alternative implementation, the texture filter engine steps along the line of anisotropy and performs a tri-linear interpolation at discrete samples along this line. The texture filter engine then applies the one dimensional filter to the result of tri-linear interpolation at each sample.

In addition to controlling the size of the interpolating filter, the size of the resampling filter can also be controlled. In one implementation, the texture filter engine uses tables of coefficients for 1-D resampling filters of various sizes and blends between them to make a filter of a size between those specified in the table. An especially useful implementation for high speed hardware is to choose the filter lengths as powers of two and the filter impulse profiles to have a triangular or trapezoidal shape. The individual filters then have very simple coefficients and the effort of multiplication is reduced to a few adds and shifts in hardware.

The following is a table of coefficients for these filters for the first four powers of 2:

| 0 |   |   |   |   |   |   |   | 1 |   |   |   |   |   |   |   | /1 |
|---|---|---|---|---|---|---|---|---|---|---|---|---|---|---|---|----|
| 1 |   |   |   |   |   |   | 1 | 2 | 1 |   |   |   |   |   |   | /4 |
| 2 |   |   |   |   | 1 | 2 | 3 | 4 | 3 | 2 | 1 |   |   |   |   | /16 |
| 3 | 1 | 2 | 3 | 4 | 5 | 6 | 7 | 8 | 7 | 6 | 5 | 4 | 3 | 2 | 1 | /64 |
| 4 | 1 | 1 | 1 | 1 | 1 | 1 | 1 | 1 | 1 | 1 | 1 | 1 | 1 | 1 | 1 | /15 |

In this example, the log base 2 of the anisotropy ratio is used to select a level and blend factor. If the level goes beyond 4, then the texture filter engine uses the last filter and does not blend. In this example, all the filters have unity gain, meaning all their coefficients add to one. Multiplication by 1, 2, 4 and 8 can be performed by shift operations. Multiplication by 3, 5 and 6 can be performed by a single addition plus a shift operation. Finally, multiplication by 7 can be performed by a single subtraction and shift operations. The divisions by the powers of two are just shifts. The division by 15 can be approximated very closely by multiplication by 1.00010001 base 2 followed by a shift of 4 places (division by 16). The multiplication is just two additions.

The approach described above enables two degrees of freedom in the control of the composite filter. In the embodiment described above, the degrees of freedom are the sizes of the filter in the directions of minimum and maximum elongation. This approach produces an image with much less aliasing and blurring without the expense of calculating the true footprint at each point, which may be the result of a highly non-linear mapping. This approach approximates a continuous filter that sweeps the actual footprint filter along the line of anisotropy. It achieves a much better fit of the actual footprint than a circle or square because it yields a "bar-shaped" filter along the line of anisotropy.

Figure 22:
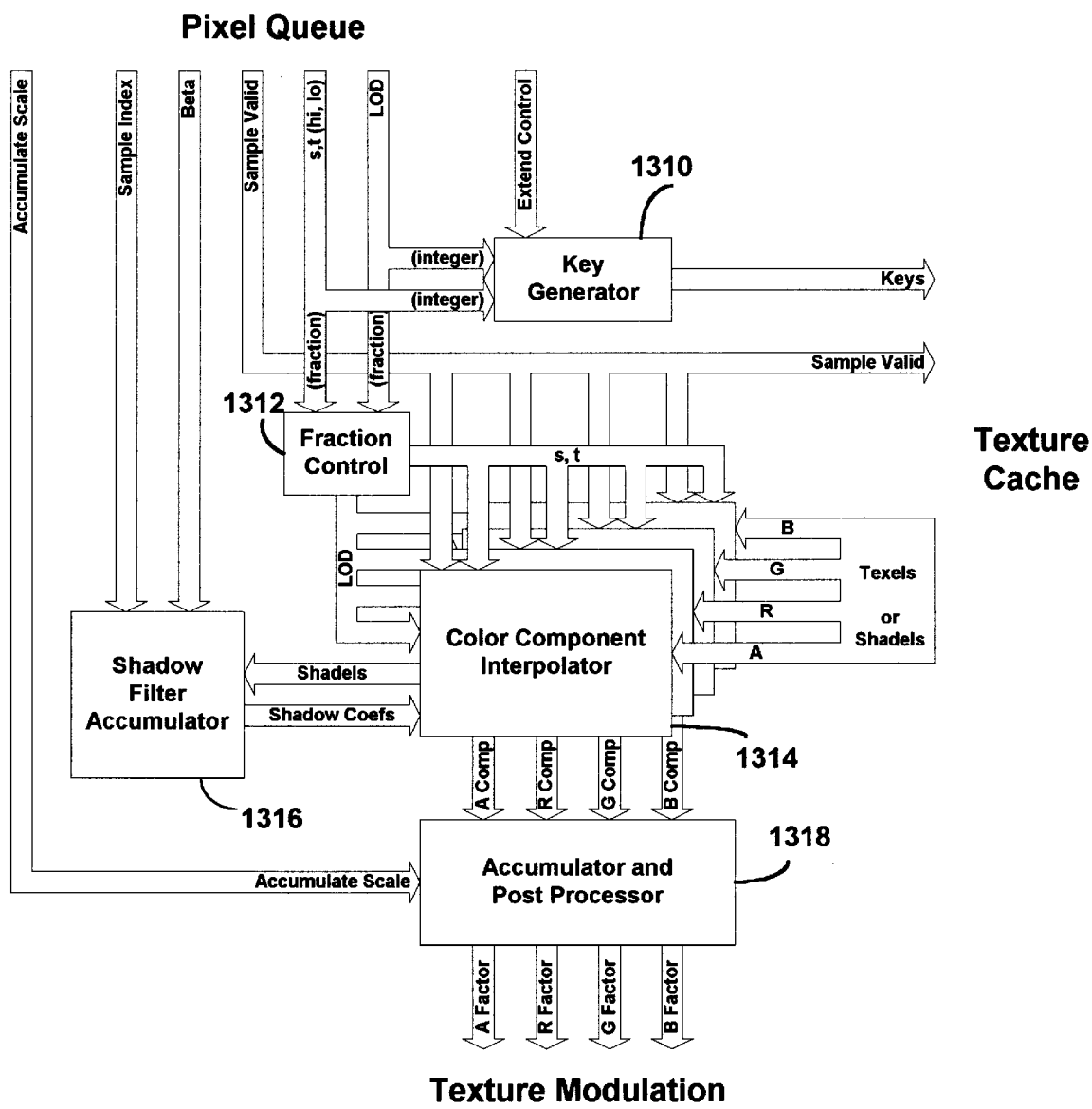
FIG. 22 is a block diagram illustrating an implementation of a texture and shadow filter.

FIG. 22 is a block diagram illustrating one implementation of the texture filter engine (401, FIG. 9B). The texture filter engine reads instances of texture reference data from a pixel queue (texture reference data queue 399 in FIG. 9B) and computes alpha and color values (alpha, and RGB color factors) or shadow coefficients for these instances. This implementation supports both texture and shadow filtering. For texture mapping operations, the texture filter engine computes texture colors and alpha, and filters the texture colors to compute alpha and color factors. For shadowing operations, the texture filter engine performs depth compares and filters the resulting values to compute shadow attenuation coefficients (s).

The pixel queue receives texture reference data from a rasterizer (such as the scan convert block 395 in FIG. 9B) and acts as a FIFO buffer to the texture filter engine 401. The "sample valid" data specifies which samples in a set of texture or shadow map elements fetched from the texture cache are valid for the current filtering operation.

For a texture mapping operation, the texture reference data includes the coordinates of a pixel location mapped into the texture, (s,t). To support tri-linear MIP-mapping, the inputs include the (s,t) coordinates for the two closest MIP map levels (hi, lo) and the level of detail (LOD). The "accumulate scale" data is used to control weighting factors applied to the output of the color component interpolators. The "extend control" data are data bits that control texture extend modes. The texture extend modes instruct the texture filter engine to perform either a clamp, wrap, or reflect operation when a texture request is outside the texture map area.

For shadowing operations, the inputs include a sample index, (s,t) coordinates of a pixel location mapped into the shadow map, and a beta, which represents the depth of the geometric primitive from the light source for a given pixel location. The sample index relates to the specific manner in which the shadow filter operates on shadow map elements or "samples." In this specific implementation, the texture filter engine operates on 8 samples per clock cycle. In the case of shadow filtering, these samples correspond to a 4×2 grid. For example, the shadow filter operates on a total of 2 sets of samples for 4×4 mode (4×2+4×2=4×4) and 8 sets for the 8×8 mode. In the case of 4×4 mode, the filter applies a 3×3 filter four times, one each to the upper left, upper right, lower left, and lower right 3×3 blocks in the 4×4 overall footprint. In the first clock cycle, it processes the upper 4×2 grid and in the second clock it processes the lower 4×2 grid in the 4×4 block. The sample index is an index used to identify the set of 8 samples currently being processed. The sample index steps through 2 clock cycles for the 4×4 case and 8 clock cycles for the 8×8 case and identifies which 4×2 subset is currently being processed.

As shown in FIG. 22, the texture filter engine includes a key generator 1310, fraction control 1312, color component interpolator 1314, shadow filter accumulator 1316, and accumulator and post-processor 1318.

In a texture mapping operation, the key generator 1310 reads the (s,t) coordinates and LOD and generates the cache keys to fetch corresponding texture data from the texture cache. The texture cache returns alpha and the RGB components in response to the texture requests. The fraction control 1312 receives the (s,t) coordinates as input and controls the operation of bi-linear and/or tri-linear interpolators in the color component interpolator 1314. The color component interpolator 1314 interpolates the texel samples to compute interpolated alpha and RGB components. The accumulator and post-post processor 1318 then scales the alpha and RGB components, accumulates the scaled components, and outputs alpha and color factors corresponding to a pixel location currently being processed. These alpha and color factors are color and alpha values input to the pixel engine, as input to the texture modulation process.

In anisotropic texture mapping, the color component interpolators 1314 walk along the line of anisotropy and perform tri-linear interpolation at each step. The accumulator 1318 acts as a one dimensional filter, scaling the alpha and color components and then accumulating the scaled components. In one specific embodiment, the accumulator 1318 scales the alpha and color components using trapezoidal or triangle filtering based on the ratio of anisotropy. In either case, the accumulator scales components at the far edges of the resampling filter to approximate a roll-off at the filter edges. To achieve trapezoidal filtering, the scale factor corresponds to a linear roll-off at the filter edges and is a constant at steps between the filter edges.

In one specific implementation, the scale factors for steps along the line of anisotropy are computed as follows. For an anisotropy ratio from 1 to 1 up to 2 to 1, the accumulator applies a weighting factor of 0.5 at each step of the anisotropic walker. For an anisotropy ratio of 2 to 1 and greater: the accumulator weights components by 1./anisotropy for steps n<(anisotropy-1)/2; and weights components by 0.5 (anisotropy-2n)/anisotropy for n greater than or equal to (anisotropy-1)/2. The anisotropy ratio in this specific example is the ratio of the long to the short side of the best fit rectangle for an inverse Jacobian matrix. The inverse Jacobian matrix is a matrix of partial derivatives of the geometric transform from view space coordinates to texture coordinates (i.e., from (x,y) to (s,t) coordinates). The line of anisotropy is a line through the (s,t) coordinates in the direction of the longer column vector of the inverse Jacobian matrix.

For shadowing operations, the key generator 1310 reads the (s,t) coordinates of the pixel location mapped into the shadow map and generates cache keys. The texture cache returns shadow map elements (shadels) to the shadow filter accumulator 1316. The shadow filter receives the shadow index and beta as input, and compares the depth of the current instance of pixel data in light space with the depth values in the filter footprint to generate a shadow mask. The shadow filter accumulator sums elements in the shadow mask and divides the sum by the number of samples. In this implementation, the texture filter engine achieves the smooth roll off at the edges of the filter footprint by applying a trapezoidal filter to the result of the depth compare step. To implement the trapezoidal filter, the shadow accumulation filter computes four preliminary shadow coefficients by applying a 3×3, or 7×7 box filter four times to a 4×4 or 8×8 filter footprint, respectively and passes the four preliminary coefficients to one of the color interpolators 1314. This color interpolator 1314 performs bilinear interpolation on the preliminary coefficients to compute a final shadow coefficient.

Figure 23:
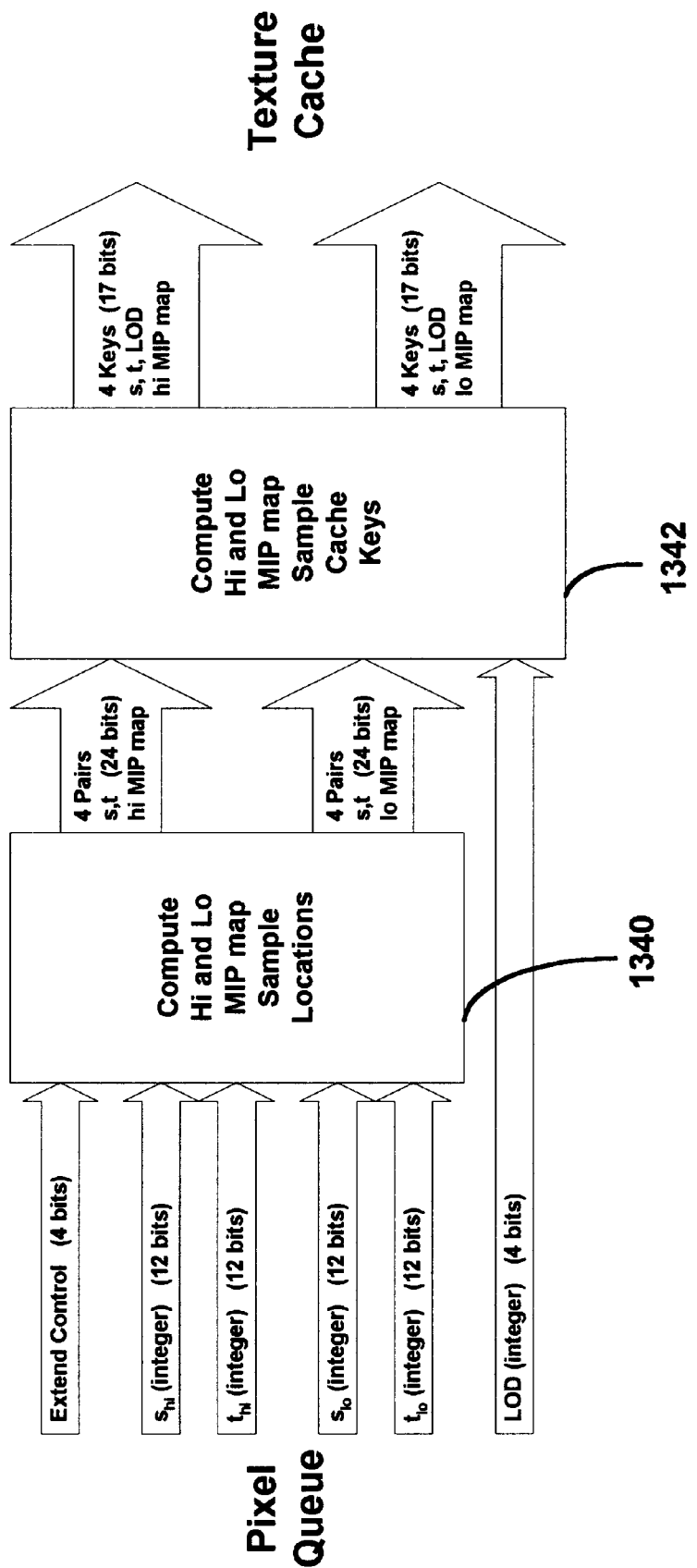
FIG. 23 is a block diagram illustrating an implementation of the key generator in FIG. 36.

As introduced above, the key generator 1310 reads (s,t) coordinates from the pixel queue and generates cache keys to fetch texture data from the texture cache. FIG. 23 is a block diagram illustrating the key generator in more detail. Based on the (s,t) coordinates in the hi and lo MIP maps (the two closest MIP maps), the key generator computes the texture sample locations in the hi and lo MIP maps (1340). The key generator then computes the cache keys from these samples (1342). The key generator transfers the cache keys, (s,t) coordinates and LOD for the hi and lo MIP map levels to the texture cache, which returns the requested texture samples. Of course, if only one texture map level of detail is used, the key generator only generates keys for one texture map.

The fraction control 1312 in FIG. 22 controls the interpolation between samples in a texture or shadow map, and between MIP map levels for tri-linear interpolation. To support bi-linear interpolation, the fraction control controls weighting between samples in a texture or shadow map. To support tri-linear interpolation, the fraction control instructs the interpolators to interpolate between the four nearest samples to a point mapped into the two closest MIP map levels (bi-linear interpolation) and then instructs a linear interpolator to blend the result from the two MIP map levels. The fraction control receives the LOD and (s,t) coordinates for the hi and lo MIP map levels as input and controls interpolation between samples at each MIP level and between MIP map levels.

Figure 24:
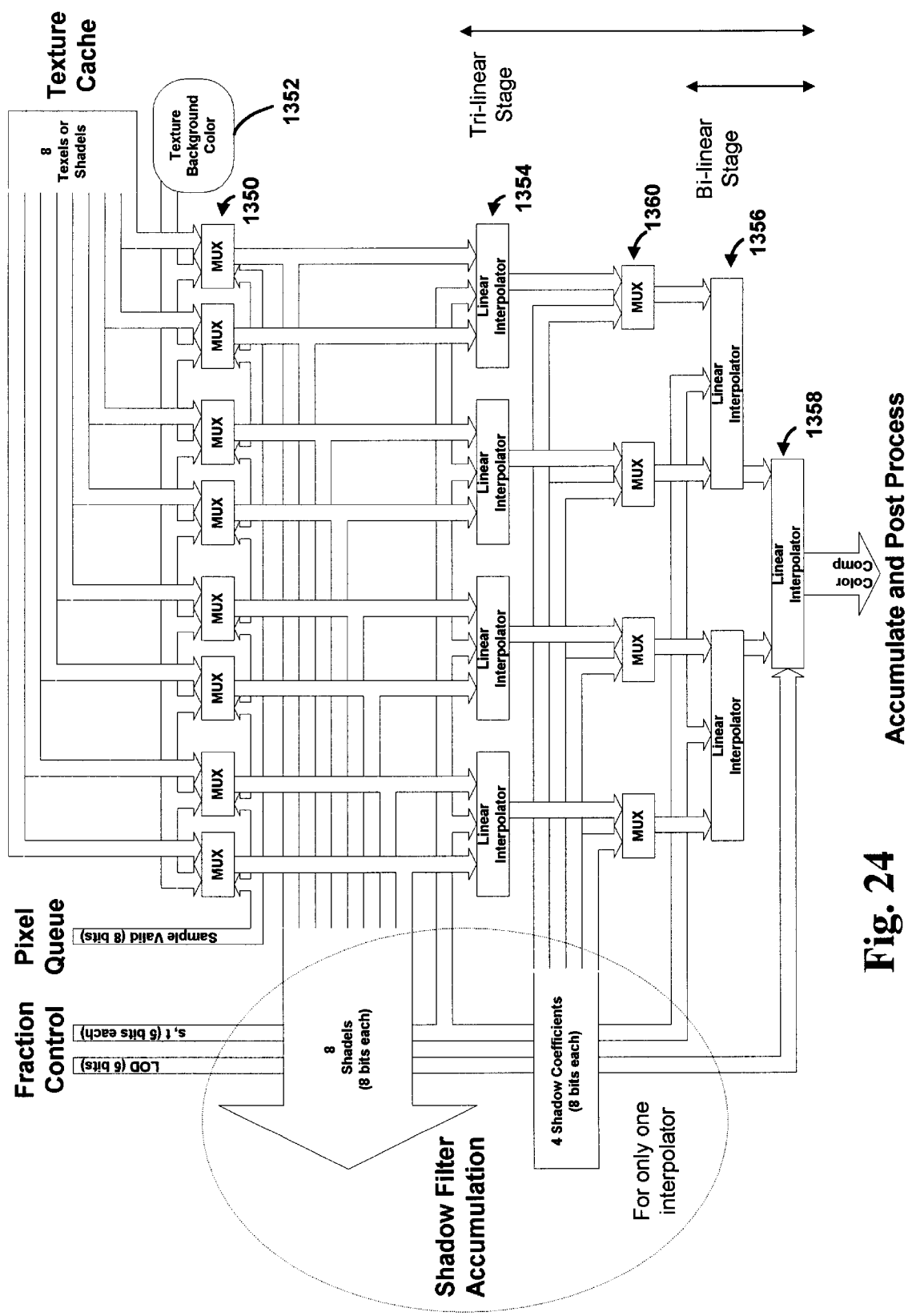
FIG. 24 is a block diagram illustrating an implementation of the color interpolators in FIG. 22.

The color component interpolator 1314 includes interpolators for alpha and RGB color components. FIG. 24 is a block diagram illustrating one of the four interpolators in more detail. This interpolator handles color component interpolation for one component and performs bi-linear interpolation on shadow coefficients. The other color component interpolators handle only a color component.

The color component interpolator receives texels or shadow map elements from the texture cache and applies them to a bank of multiplexers 1350. When input to the bank of multiplexers 1350, the sample valid data specifies which of the samples are valid, i.e. those that should be used for the current texture or shadowing operation. Based on the sample valid control signals, the multiplexers select either the incoming sample or a texture background color 1352. For shadowing operations, the color component interpolator 1314 passes shadow elements to the shadow filter accumulator 1316. The three color channels are used to form a single 24 bit wide shadow map element, and the alpha channel is ignored in shadowing operations. For texture mapping operations, the color component interpolator transfers texture samples to the stages of linear interpolators 1354, 1356 and 1358.

In tri-linear interpolation, the color component interpolator uses three stages of linear interpolators, two to interpolate between samples at each MIP map level (1354 and 1356), and another to blend the result from each MIP level (1358). The color component interpolator performs bi-linear interpolation to combine shadow coefficients computed from 4 filter footprints. As shown in FIG. 24, it uses the last two stages (1356 and 1358) to perform this bi-linear interpolation. A second bank of multiplexers 1360 selects between four shadow coefficients and the output of the first stage of linear interpolators 1354. In both texture mapping and shadowing operations, the color component interpolator transfers the output of the interpolator stages to the accumulator and post-processor 1318.

Figure 25:
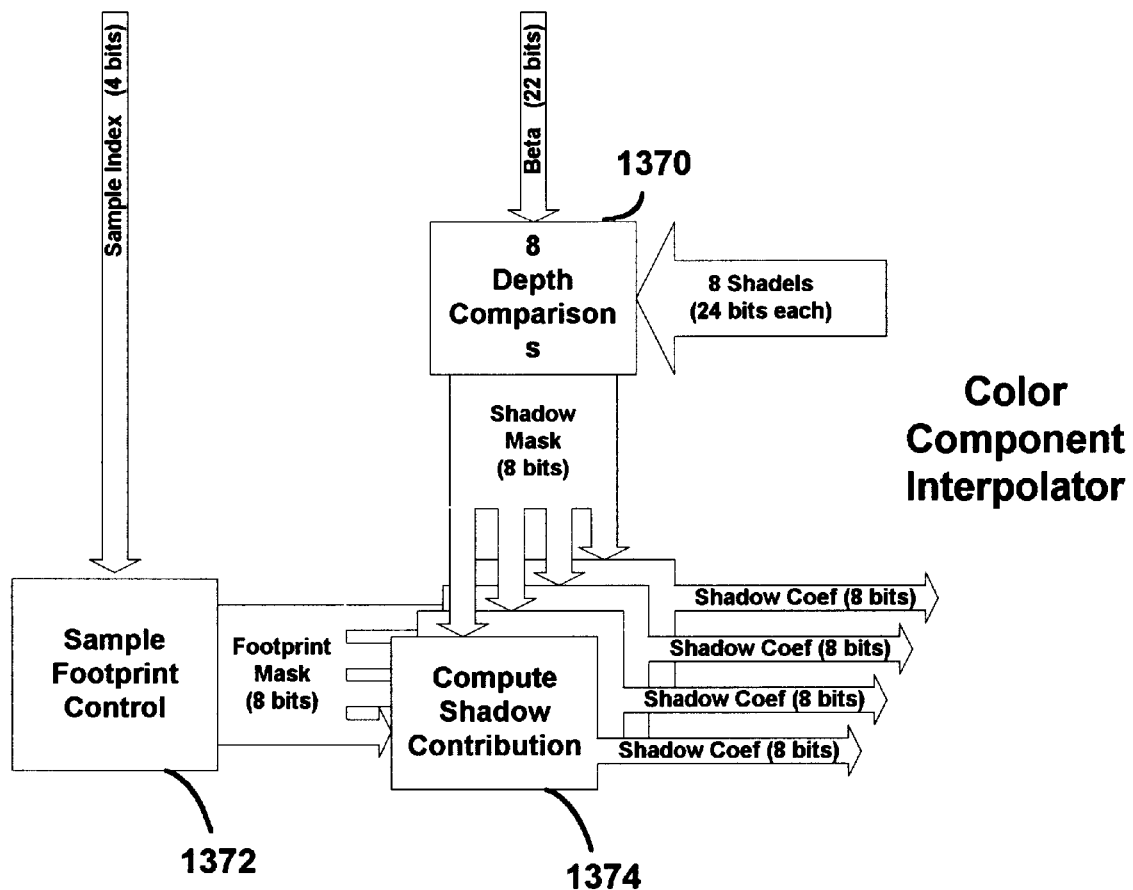
FIG. 25 is a block diagram illustrating an implementation of the shadow filter accumulator in FIG. 22.

The shadow filter accumulator 1316 receives a sample index and light depth value (beta) from the pixel queue, compares the light depth value with shadow map elements returned from the texture cache to generate shadow masks, and filters the shadow masks to compute preliminary shadow coefficients. FIG. 25. is a block diagram illustrating the shadow filter accumulator in more detail. Depth comparators in the shadow filter accumulator compare the depth of the shadow elements in the filter footprint and generate a shadow mask. In this particular case, the shadow mask is 8 bits with boolean values corresponding to a 4×2 section of the filter footprint.

The footprint control 1372 selects the current 4×2 section of the overall footprint based on the sample index value from the pixel queue. The footprint control transfers a footprint mask to each of four shadow contribution blocks based on the clock cycle and the filtering mode (2×2, 4×4 or 8×8). The footprint mask indicates which of the 8 shadow mask elements are valid at the current clock cycle for each of four box filters, in the 4×4 and 8×8 modes. In the two by two mode, the shadow filter accumulator outputs four booleans indicating whether each of the four nearest samples are in shadow or not.

As noted above, the shadow filter accumulator applies four box filters (3×3 or 7×7, e.g.) to the samples in the filter footprint. Each of the shadow contribution blocks combine the footprint mask and the shadow mask to determine which elements of the shadow mask are valid for the current clock cycle and then sum the valid elements. After accumulating the valid elements in the shadow mask for the entire filter footprint, the shadow contribution blocks divide the sum by the number of samples to compute preliminary shadow coefficients, which are transferred to a bi-linear interpolation stage in the color interpolator. The color interpolator then interpolates between the four preliminary shadow coefficients to compute a final shadow coefficient.

Figure 26:
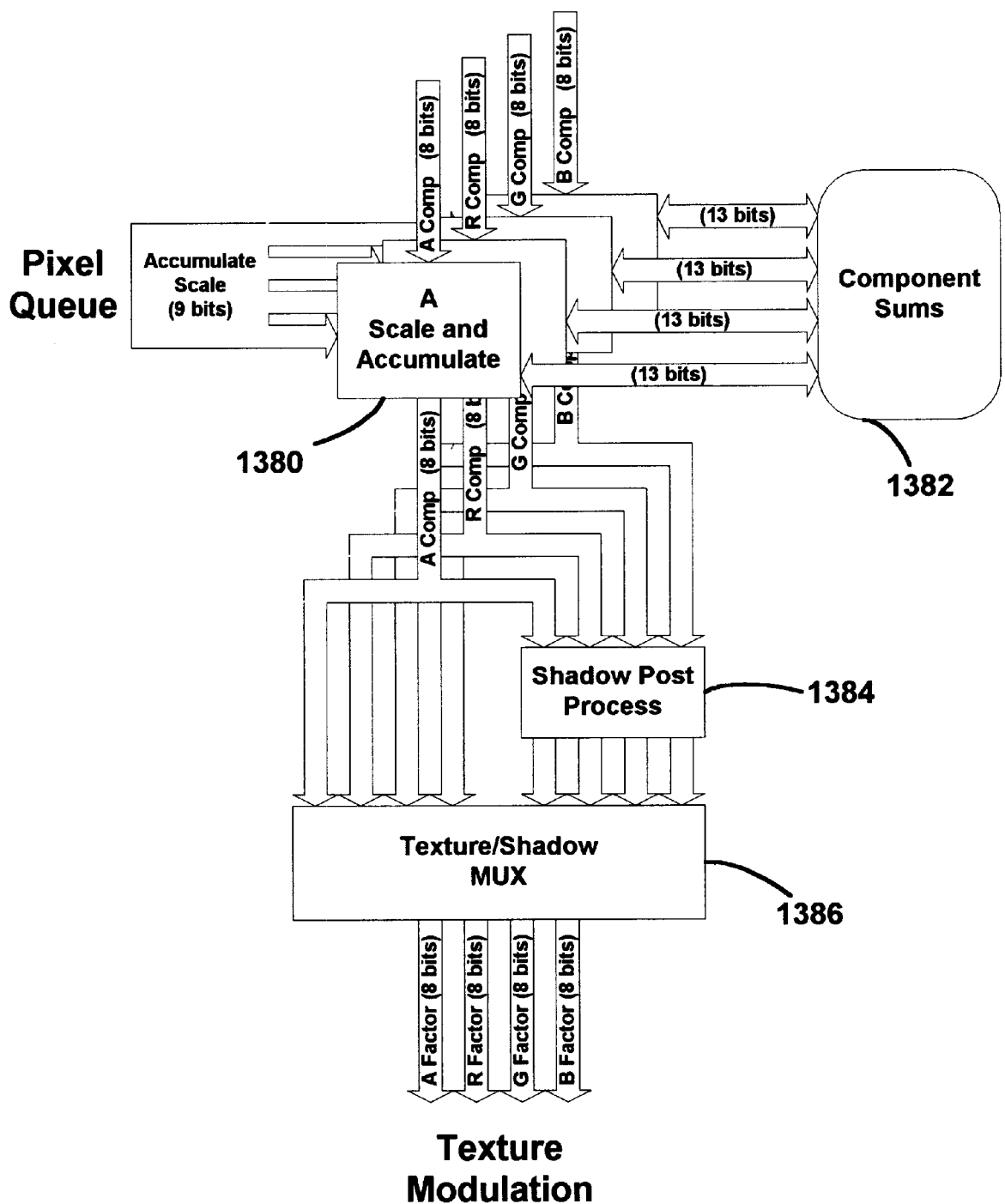
FIG. 26 is a block diagram illustrating an implementation of the accumulator and post processor in FIG. 22.

The accumulator and post-processor 1318 receives alpha and color components from the color component interpolator 1314 and computes color and alpha factors for each instance of texture reference data. For shadowing operations, the texture filter engine uses one channel (alpha or RGB) to compute a shadow attenuation coefficient. The shadow filtering logic can also be implemented separately. FIG. 26 is a block diagram illustrating the accumulator and post-processor in more detail. As shown, each color component (alpha and RGB) has a scale and accumulator. The scale and accumulator 1380 for each component receives the accumulation scale and a color component as input, and in response, scales the color component and adds it to an accumulated component value in the component sum block 1382. For example, in anisotropic filtering, the scale and accumulate blocks 1380 weight the output of the reconstruction filter (tri-linear interpolator), as the texture filter engine walks along the line of anisotropy. After the last step, the scale and accumulators for alpha and RGB components output the final color component factors.

For shadowing operations, the scale and accumulate block bypasses the multiply operation but adds an ambient offset. The ambient offset ensures that even objects totally in shadow will still be visible. For example, a shadow coefficient of 1 means totally illuminated, a shadow coefficient of 0 means totally in shadow. If colors were multiplied by a coefficient of zero, the object would not be visible at that pixel location. Thus, an offset is added and the shadow coefficients are clamped to 1 such that the offset shadow coefficients range from the offset value to 1.

The shadow post processor 1384 does the replication of the scalar shadow attenuation 's' to all 3 color channels and (conditionally) to the alpha channel. There is also a conditional complimenting (s=1−s) of the shadow attenuation for to compute a shadow image. A shadow image is an array of shadow coefficients or an array of the compliments of shadow coefficients which may be used to shadow a gsprite.

Finally, the multiplexer stage 1386 selects either the shadow coefficients, for a shadowing operations, or RGB and alpha components for texture mapping operations. In sum, the texture filter engine 401 performs both shadowing and texturing operations. It passes the result of texture mapping operations to a texture modulation stage. Texture modulation typically includes multiplying the RGB color values from the texture filter by an interpolated color or color values computed in the scan convert block. In addition for graphical objects with translucency, texture modulation can also include multiplying the alpha value from the texture filter by an interpolated alpha value from the scan convert block. Depending on the implementation, texture modulation can be implemented in the texture filter engine (element 401 in FIG. 9B) or the pixel engine (element 406 in FIG. 9B). It may also be implemented in the scan convert block (element 394 in FIG. 9A or element 397 in FIG. 9C). In one implementation, the texture filter engine 401 combines an interpolated value with the filtered value to compute a composed value. The pixel engine 406 then determines whether to store or combine a composed value with a corresponding RGB component or alpha component stored in the pixel or fragment buffers for a corresponding pixel location.

In the case of shadowing operations, the shadow coefficients can be applied to the RGB and alpha values at corresponding pixel locations in the pixel or fragment buffers, or to interpolated RGB or alpha values generated during the current pass and buffered in a queue. For example, if an object does not have a texture associated with it, the texture modulator in the texture filter engine 401 can multiply interpolated and un-resolved RGB and alpha values representing the lit image and stored in the texture reference data queue 391 (FIG. 9B) by the shadow attenuation coefficients from the accumulator and post processor.

While we have described anisotropic filtering with reference to specific embodiments, we do not intend to limit our invention to the specific implementation of these embodiments. The interpolating filter repetitively applied along the line of anisotropy can be implemented in a variety of ways. The implementation of the resampling filter can vary as well. A variety of different filter shapes and weighting can be applied to approximate the actual footprint along the line of anisotropy.

When a rendered gsprite is used as a texture, the DSP provides the address in shared memory where the compressed gsprite is stored. As described above, the gsprite control block includes references to location in shared memory where its constituent chunks or blocks are stored. The gsprite is fetched from share memory as needed, decompressed, and stored in the texture cache 402. The texture filter engine 400 then filters the gsprite data to generate pixel values. Processing of pixel data continues as described above with reference to the Tiler.

Using this approach, rendered image data can be used as a texture for subsequent rendering of objects. Subsequent rendering applies to objects in the same or subsequent frames. To support reflection mapping, an object can be rendered and then mapped to a surface of another object in the same frame. For example, a mountain reflecting in a lake can be generated as follows. First, the Tiler renders the mountain to a gsprite and stores this gsprite in shared memory. Then in rendering the lake, the Tiler retrieves the gsprite representing the rendered image of the mountain and maps it to the surface of an object representing the lake. In addition to reflection mapping, a variety of the other sophisticated image processing features can be supported as well.

The novel architectures, systems, and methods described above can produce high quality images in real time at a cost that is about 100 times less than existing "high-performance" graphics workstations. Using a combination of the techniques described above, an image processing system can compute a frame of image data including roughly 20000 polygons at a 75 Hz computational frame rate. This performance translates to 1.5–2 million polygons per second. Without sacrificing this performance, a number of sophisticated graphics techniques can be incorporated such as advanced anti-aliasing, translucency computations, shadowing, multi-pass rendering, texture mapping, to name a few. This performance can be achieved with significantly less memory than a typical graphics workstation.

We have described various aspects of an image processing system, its architecture, and associated methods with references to several embodiments. While we have described several embodiments in detail, we do not intend to limit our invention to these specific embodiments. For example, our novel architecture can be applied to a variety of hardware implementations, including but not limited to: computer systems ranging from hand held devices to workstations, game platforms, set-top boxes, graphics processing hardware, graphics processing software, and video editing devices. Variation of our systems and methods can be implemented in hardware or software or a combination of both.

In view of the many possible embodiments to which the principles of our invention may be put, we emphasize that the detailed embodiments described above are illustrative only and should not be taken as limiting the scope of our invention. Rather, we claim as our invention all such embodiments as may come within the scope and spirit of the following claims and equivalents to these claims.

We claim:

1. In an image processing system, a method for texture mapping a source image to a destination image where a mapping of a point from the destination image to the source image is described by an inverse transform, the method comprising:

at a pixel location in the destination image, determining a change in texture coordinates with respect to view space coordinates;

determining a line of anisotropy and a ratio of anisotropy for the pixel location, including deriving a direction of the line and the ratio of anisotropy from the change in texture coordinates with respect to view space coordinates at the pixel location;

repetitively applying a filter at steps along the line of anisotropy to sample texel values from the source image, wherein the filter is an interpolating filter and applying the filter comprises applying the interpolating filter at the steps along the line of anisotropy to interpolate texel values from the source image, including sampling for each step two or more texel values from the source image at a first level of detail and blending the two or more texels values for each step; and filtering outputs of the repetitive filtering step to compute a pixel value for the destination image, including applying a resampling filter to the outputs of the interpolating filter and summing outputs of the resampling filter to compute the pixel value for the destination image, wherein the resampling filter scales the outputs of the interpolating filter with scale factors computed from the ratio of anisotropy.

2. The method of claim 1 wherein the resampling filter is a one dimensional filter along the line of anisotropy.

3. The method of claim 1 including:

computing a Jacobian matrix for the inverse transform to to determine partial derivatives of the texture space coordinates (s, t) with respect to the view space coordinates (x, y), where the partial derivatives include a first vector representing change in the texture space coordinates with respect to the x direction and a second vector representing the change in the texture space coordinates with respect to the y direction at the pixel location;

deriving the direction of the line of anisotropy as the direction of the longer of the first and second vectors.

4. The method of claim 3 wherein the step of filtering the outputs along the line of anisotropy includes scaling the outputs by selectively choosing scale factors for each of the steps based on a ratio of anisotropy computed as a ratio of the first and second vectors.

5. The method of claim 1 wherein
the number of steps along the line of anisotropy is derived from the change in texture coordinates with respect to view space coordinates at the pixel location.

6. The method of claim 1 including:
computing the Jacobian matrix of partial derivatives of the inverse transform corresponding to the pixel location and deriving size of the filter, the direction of the line of anisotropy, and the number of steps along the line of anisotropy from the partial derivatives.

7. The method of claim 1 wherein a footprint of the interpolating filter is two dimensional, and further including:
adjusting size of the footprint of the interpolating filter at the pixel location based on the change in texture coordinates with respect to view space coordinates at the pixel location.

8. The method of claim 7 wherein the adjusting step includes using MIP mapping of the source image to adjust the size of the footprint of the interpolating filter.

9. The method of claim 1 wherein the filter is an interpolating filter, and further including:
computing a Jacobian matrix of the inverse transform at a point mapped into the source image, the Jacobian matrix including a first and second vector representing partial derivatives of texture coordinates with respect to view space coordinates at the pixel location;
determining the direction of maximum elongation from a direction of one of the first or second vectors and selecting the line of anisotropy to correspond to the direction of maximum elongation; and
applying a resampling filter to the outputs of the interpolating filter and summing outputs of the resampling filter to compute the pixel value for the destination image, wherein scale factors used in the resampling filter are selected based on a ratio of the first and second vectors.

10. The method of claim 9 including:
determining size of the interpolating filter from a length of one of the first or second vectors; and
using MIP mapping of the source image to adjust the size of the interpolating filter relative to the source image.

11. The method of claim 9 including:
determining size of the resampling filter from a length of the first or second vector; and
adjusting the size of the resampling filter based on the length of the first or second vector.

12. A method for texture mapping a source image to a destination image where a mapping of points from the destination image to the source image is described by an inverse transform, comprising:
deriving a line of anisotropy using the inverse transform;
computing a weighted sum of texel values from the source image sampled along the line of anisotropy, wherein scale factors used to compute the weighted sum are selected for each pixel location depending on a degree of anisotropy calculated from a change in texture coordinates with respect to view space coordinates at the pixel location;
applying a reconstruction filter along the line of anisotropy to sample texel values from the source image and produce output values;
processing the output values to compute a pixel value for the destination image, including applying a resampling filter to the output values and summing outputs of the resampling filter to compute the pixel value for the destination image, wherein the resampling filter scales the output values with the scale factors selected based on the degree of anisotropy.

13. The method of claim 12 wherein the deriving step includes:
mapping a filter footprint into the source image using the inverse transform to find a mapped filter footprint; and
determining a direction of maximum elongation of the mapped filter footprint, where the direction of maximum elongation is a direction of the line of anisotropy.

14. The method of claim 12 wherein the deriving step includes:
approximating the inverse transform at a point in the source image by computing a first order approximation matrix of the inverse transform at the point; and
determining a direction of the line of anisotropy from a direction of a vector in the first order approximation matrix.

15. The method of claim 12 wherein the computing step includes:
MIP mapping the source image.

16. The method of claim 12 wherein the computing step includes:
applying a reconstruction filter along the line of anisotropy to sample texel values from the source image and produce output values for pixel locations in the destination image, where the line of anisotropy approximately passes through a point representing the pixel location mapped into the source image;
applying a resampling filter to the output values; and
summing outputs of the resampling filter to compute the pixel value for the destination image, where the scale factors are selected such that the re-sampling filter has a linear or higher order roll-off and a texel located farther away from the point is given less weight than a texel located closer to the point.

17. The method of claim 16 wherein the reconstruction filter is an interpolating filter, and the resampling filter is a one dimensional filter provided a weighting coefficient to the output values.

18. A system for performing texture mapping of a texture to surfaces of geometric primitives, the system comprising:
texture memory;
a set-up processor for receiving commands and the geometric primitives, for parsing the commands, for computing inverse transform data from the geometric primitives, for computing texture addresses from the geometric primitives, and for retrieving texture data into the texture memory corresponding to the texture addresses; and
a texture filter engine in communication with the set-up processor and the texture memory for receiving the inverse transform data and the texture addresses and computing a line of anisotropy through a point mapped into the texture and a ratio of anisotropy based on the inverse transform data, the texture filter engine including a first filter for sampling and blending two or more samples from the texture at a selected level of detail at each of a series of steps along the line of anisotropy to compute intermediate texel values and a second filter for computing a weighted sum of the intermediate texel values sampled along the line of anisotropy; wherein the first filter includes an interpolating filter for sampling texel samples from the texture at each of the steps along the line of anisotropy and the second filter includes a one dimensional digital filter applied to outputs of the interpolating filter and the digital filter uses scale factors selected based on the ratio of anisotropy.

19. The system of claim 18 wherein the inverse transform data is a matrix representing an inverse transform of a point on a surface of a geometric primitive mapped to the texture, and wherein the texture filter engine includes circuitry for determining the direction of the line anisotropy from the matrix.

20. The system of claim 18 wherein the first filter includes interpolating filter circuitry for sampling the texture samples from the texture at each of the steps.

21. The system of claim 20 wherein the first filter comprises a two-dimensional interpolating filter for performing bi-linear interpolation in the texture at each step along the line of anisotropy.

22. Texture mapping circuitry comprising:
set-up circuitry for computing gradients representing derivatives of texture coordinates in texture space with respect to view space coordinates at pixel locations in an output image;

filter circuitry in communication with the set-up circuitry for determining a direction of maximum elongation and a ratio of anisotropy from the gradients; and for scaling and summing the scaled outputs of an interpolating filter at a plurality of locations in a texture along the direction of maximum elongation to compute a color data for a pixel location in the output image, wherein scale factors for the outputs of the interpolating filter are computed based on the ratio of anisotropy.

23. The texture mapping circuitry of claim 22 wherein the filter circuitry includes a one dimensional filter in communication with the interpolating filter for weighting outputs of the interpolating filter.

24. The texture mapping circuitry of claim 22 wherein the source image is MIP mapped, and wherein the filter circuitry includes circuitry for determining a level of detail for the source image from the gradients.

* * * * *

UNITED STATES PATENT AND TRADEMARK OFFICE
CERTIFICATE OF CORRECTION

PATENT NO.    : 6,005,582
DATED         : December 21, 1999
INVENTOR(S)   : Gabriel et al.

It is certified that error appears in the above-identified patent and that said Letters Patent is hereby corrected as shown below:

Title page,
The following should appear in the References Cited section, under U.S. PATENT DOCUMENTS:

| | | |
|---|---|---|
| -- 4,631,690 | 12/1986 | Corthout et al.....................364/518 |
| 4,645,459 | 2/1987 | Graf et al.........................434/43 |
| 5,363,475 | 11/1994 | Baker et al.......................345/422 |
| 5,522,018 | 5/1996 | Takeda et al......................345/422 |
| 5,563,989 | 10/1996 | Billyard et al....................345/426 |
| 5,596,686 | 1/1997 | Duluk, Jr..........................345/122 |
| 5,684,935 | 11/1997 | Demesa, III et al.................345/419 |
| 5,729,669 | 5/1998 | Appleton..........................345/422 |
| 5,673,401 | 9/1997 | Volk et al........................345/327 |
| 5,634,850 | 6/1997 | Kitahara et al....................463/33 |
| 5,598,517 | 1/1997 | Watkins...........................345/441 --. |

Column 1,
Line 25, "object" should read -- object. --.

Column 4,
Line 61, "for /applications ranging" should read -- for applications ranging --.

Column 22,
Line 4, "engine.403" should read -- engine 403 --.

Column 28,
Line 43, "216 FIG. 4A)" should read -- 216 (FIG. 4A) --.

Column 32,
Line 11, "the a component," should read -- the $\alpha$ component, --.
Line 46, "ax is the" should read -- $\alpha$ is the --.

Column 38,
Line 29, "cm=000" should read -- cm=1000 --.

Column 40,
Line 48, ".{.1, 0b0001}" should read -- {.1, 0b0001} --.

UNITED STATES PATENT AND TRADEMARK OFFICE
CERTIFICATE OF CORRECTION

PATENT NO.    : 6,005,582
DATED         : December 21, 1999
INVENTOR(S)   : Gabriel et al.

Page 2 of 3

It is certified that error appears in the above-identified patent and that said Letters Patent is hereby corrected as shown below:

Column 40,
Lines 55-56, "$\begin{array}{cc} x & 1 \\ x & x \end{array}$" should read -- $\begin{array}{|c|c|} \hline x & 1 \\ \hline x & x \\ \hline \end{array}$ --.

Lines 63-64, "$\begin{array}{cc} xxxx & 1111 \\ xxxx & xxxx \end{array}$" should read -- $\begin{array}{|c|c|} \hline xxxx & 1111 \\ \hline xxxx & xxxx \\ \hline \end{array}$ --.

Column 41,
Lines 1-2, "$\begin{array}{cc} x & 0.5 \\ x & 1 \end{array}$" should read -- $\begin{array}{|c|c|} \hline x & 0.5 \\ \hline x & 1 \\ \hline \end{array}$ --.

Column 48,
Line 55, "$y\text{-}T)1$" should read -- $y\text{-}T(i$ --.

Column 49,
Line 3, "$i \in T^{-i}(y\text{-}W_r)+W_r$" should read -- $i \in T^{-1}(y\text{-}W_s)+W_r$ --.

UNITED STATES PATENT AND TRADEMARK OFFICE
CERTIFICATE OF CORRECTION

PATENT NO. : 6,005,582
DATED : December 21, 1999
INVENTOR(S) : Gabriel et al.

It is certified that error appears in the above-identified patent and that said Letters Patent is hereby corrected as shown below:

<u>Column 49 (continued),</u>
Line 20, "$+T(T^{1}(y))$" should read -- $+T'(T^{1}(y))$ --.
Line 22, "$T(T^{1}(y))$" should read -- $T'(T^{1}(y))$ --.
Line 24, "$T(T^{1}(y))$" should read -- $T'(T^{1}(y))$ --.
Line 29, "$r(\xi)|T(T^{1}(y))|s(T(T^{1}(y))(\xi\text{-}I+T^{1}(y)))$" should read -- $r(\xi)|T'(T^{-1}(y))|s(T'(T^{-1}(y))(\xi\text{-}i+T^{1}(y)))$ --.

Signed and Sealed this

Eleventh Day of December, 2001

Attest:

NICHOLAS P. GODICI
Attesting Officer     Acting Director of the United States Patent and Trademark Office